US011370177B2

(12) United States Patent
Shartle et al.

(10) Patent No.: US 11,370,177 B2
(45) Date of Patent: Jun. 28, 2022

(54) SYSTEMS AND METHODS FOR MANUFACTURING A MICROFLUIDIC ROTOR DEVICE

(71) Applicant: ZOETIS SERVICES LLC, Parsippany, NJ (US)

(72) Inventors: Robert Justice Shartle, Livermore, CA (US); Gregory Trigub, Alameda, CA (US)

(73) Assignee: Zoetis Services LLC, Parsippany, NJ (US)

( * ) Notice: Subject to any disclaimer, the term of this patent is extended or adjusted under 35 U.S.C. 154(b) by 0 days.

(21) Appl. No.: 16/547,697

(22) Filed: Aug. 22, 2019

(65) Prior Publication Data

US 2020/0061930 A1  Feb. 27, 2020

Related U.S. Application Data

(60) Provisional application No. 62/722,449, filed on Aug. 24, 2018.

(51) Int. Cl.
*B29C 65/16* (2006.01)
*B29C 65/14* (2006.01)
(Continued)

(52) U.S. Cl.
CPC .... *B29C 65/1612* (2013.01); *B01L 3/502707* (2013.01); *B01L 3/502715* (2013.01);
(Continued)

(58) Field of Classification Search
CPC ........... B29C 65/1612; B29C 65/1412; B29C 65/1677; B29C 65/1696; B29C 66/73365;
(Continued)

(56) References Cited

U.S. PATENT DOCUMENTS 4,509,856 A   4/1985  Lee
5,061,381 A   10/1991 Burd
(Continued)

FOREIGN PATENT DOCUMENTS

CN   1741853 A    3/2006
CN   101137440 A  3/2008
(Continued)

OTHER PUBLICATIONS

PCT Search Report and Written Opinion, International Application No. PCT/US2019/047625, International filing date Aug. 22, 2019, dated Nov. 21, 2019.
(Continued)

*Primary Examiner* — Daniel McNally
(74) *Attorney, Agent, or Firm* — Scott C. Mayhew

(57) ABSTRACT

Described herein are various embodiments directed to rotor devices, methods, and systems. Embodiments of rotors disclosed herein may be used to characterize one or more analytes of a fluid. A method may include bonding a first layer and a second layer using two-shot injection molding. The first layer coupled to the second layer may collectively define a set of wells. The first layer may be substantially transparent. The second layer may define a channel. The second layer may be substantially absorbent to infrared radiation. A third layer may be bonded to the second layer using infrared radiation. The third layer may define an opening configured to receive a fluid. The third layer may be substantially transparent. The channel may establish a fluid communication path between the opening and the set of wells.

17 Claims, 31 Drawing Sheets

(51) Int. Cl.
  *B29C 65/00* (2006.01)
  *B01L 3/00* (2006.01)
  *B29C 45/14* (2006.01)
  *B29L 31/00* (2006.01)

(52) U.S. Cl.
  CPC .... *B29C 45/14467* (2013.01); *B29C 65/1412* (2013.01); *B29C 65/1677* (2013.01); *B29C 65/1696* (2013.01); *B29C 66/73361* (2013.01); *B29C 66/73365* (2013.01); *B01L 2200/12* (2013.01); *B01L 2300/06* (2013.01); *B01L 2300/0809* (2013.01); *B01L 2300/12* (2013.01); *B01L 2300/168* (2013.01); *B29L 2031/752* (2013.01)

(58) Field of Classification Search
  CPC ......... B29C 66/73361; B29C 45/14467; B01L 3/502715; B01L 3/502707; B01L 2200/12; B01L 2300/168
  See application file for complete search history.

(56) References Cited

U.S. PATENT DOCUMENTS

| | | | |
|---|---|---|---|
| 5,122,284 A | 6/1992 | Braynin et al. | |
| 5,173,193 A | 12/1992 | Schembri | |
| 5,242,606 A | 9/1993 | Braynin et al. | |
| 5,275,016 A | 1/1994 | Chatterjee et al. | |
| 5,304,348 A | 4/1994 | Burd et al. | |
| 5,409,665 A | 4/1995 | Burd | |
| 5,413,732 A | 5/1995 | Buhl et al. | |
| 5,472,603 A | 12/1995 | Schembri | |
| 5,478,750 A | 12/1995 | Bernstein et al. | |
| 5,478,751 A | 12/1995 | Oosta et al. | |
| 5,599,411 A | 2/1997 | Schembri | |
| 6,465,757 B1* | 10/2002 | Chen ................ | B29C 66/81266 219/121.63 |
| 8,679,853 B2 | 3/2014 | Bhullar et al. | |
| 9,186,668 B1 | 11/2015 | Schaff et al. | |
| 10,379,014 B2 | 8/2019 | Calatzis et al. | |
| 2002/0151078 A1 | 10/2002 | Kellogg et al. | |
| 2004/0209374 A1 | 10/2004 | Kopf-Sill et al. | |
| 2005/0047971 A1* | 3/2005 | Clements ............. | B29C 66/112 422/553 |
| 2006/0057245 A1 | 3/2006 | Haupt et al. | |
| 2006/0091015 A1 | 5/2006 | Lau | |
| 2007/0125489 A1 | 6/2007 | Paul et al. | |
| 2009/0111675 A1* | 4/2009 | Yokogawa ........... | B01L 3/5027 494/37 |
| 2009/0126568 A1 | 5/2009 | Karaki et al. | |
| 2009/0297403 A1 | 12/2009 | Franke et al. | |
| 2009/0298718 A1* | 12/2009 | Denman ............ | B01L 3/50851 506/33 |
| 2010/0261286 A1 | 10/2010 | Kim et al. | |
| 2011/0243813 A1* | 10/2011 | Jackinsky ............ | B29C 66/543 422/503 |
| 2012/0015828 A1* | 1/2012 | Ozawa ............ | G01N 35/00069 506/7 |
| 2012/0184046 A1* | 7/2012 | Atkin ............... | B01L 3/502707 436/161 |
| 2013/0302817 A1 | 11/2013 | Berthier et al. | |
| 2014/0134048 A1 | 5/2014 | Higashi et al. | |
| 2014/0233797 A1 | 8/2014 | Hodder et al. | |
| 2014/0234949 A1 | 8/2014 | Wasson et al. | |
| 2014/0255933 A1 | 9/2014 | Ozawa et al. | |
| 2015/0038379 A1 | 2/2015 | Kartalov et al. | |
| 2017/0023599 A1 | 1/2017 | Richards et al. | |
| 2017/0050185 A1 | 2/2017 | Boehm et al. | |
| 2017/0050881 A1 | 2/2017 | Abdolvand | |
| 2018/0059102 A1 | 3/2018 | Horii et al. | |

FOREIGN PATENT DOCUMENTS

| | | |
|---|---|---|
| CN | 101291736 A | 10/2008 |
| CN | 101500934 A | 8/2009 |
| CN | 101520454 A | 9/2009 |
| CN | 102369443 A | 3/2012 |
| CN | 102426259 A | 4/2012 |
| CN | 102721822 | 10/2012 |
| CN | 103403521 | 11/2013 |
| CN | 203432978 U | 2/2014 |
| CN | 103889582 B | 4/2015 |
| CN | 105917240 A | 8/2016 |
| CN | 106391151 A | 2/2017 |
| CN | 107398307 A | 11/2017 |
| DE | 112011105686 | 7/2014 |
| DE | 112011105686 T5 | 7/2014 |
| EP | 0844025 A2 | 5/1998 |
| EP | 1577010 A2 | 9/2005 |
| EP | 1586379 A1 | 10/2005 |
| EP | 2416160 A1 | 2/2012 |
| JP | 2003130883 A2 | 5/2003 |
| JP | 2014518509 T2 | 7/2014 |
| KR | 101528429 B1 | 6/2015 |
| TW | 239189 B | 1/1995 |
| WO | WO 02/059602 A2 | 8/2002 |
| WO | WO 2018/005464 A1 | 1/2018 |

OTHER PUBLICATIONS

ROC (Taiwan) Patent Application No. 108130154 Office Action and Search Report Non-English, Filing date Aug. 23, 2019, Date of completion of search Mar. 26, 2020.

ROC (Taiwan) Patent Application No. 108130154 Search Report English Translation, Filing date Aug. 23, 2019, Date of completion of search Mar. 26, 2020.

PCT Search Report and Written Opinion, International Application No. PCT/US2019/047626, International filing date Aug. 22, 2019, dated Jan. 30, 2020.

Schembri, Carol T. et al., 1992, "Portable Simultaneous Multiple Analyte Whole-Blood Analyzer for Point-of-Care", Clinical Chemistry, vol. 38, pp. 1665-1670.

PCT Search Report and Written Opinion, International Application No. PCT/US2019/047628, International filing date Aug. 22, 2019, dated Nov. 18, 2019.

ROC (Taiwan) Patent Application No. 108130156 Office Action and Search Report Non-English, Filing date Aug. 23, 2019, Date of completion of Search May 11, 2020.

ROC (Taiwan) Patent Application No. 108130156 Search Report English Translation, Filing date Aug. 23, 2019, Date of completion of Search May 11, 2020.

PCT Search Report and Written Opinion, International Application No. PCT/US2019/047633, International filing date Aug. 22, 2019, dated Nov. 8, 2019.

ROC (Taiwan) Patent Application No. 108130157 Office Action and Search Report Non-English, Filing date Aug. 23, 2019, Date of completion of Search Mar. 20, 2020.

ROC (Taiwan) Patent Application No. 108130157 Office Action and Search Report English-Translation, Filing date Aug. 23, 2019, Date of completion of Search Mar. 20, 2020.

PCT Search Report and Written Opinion, International Application No. PCT/US2019/047634, International filing date Aug. 22, 2019, dated Jan. 10, 2020.

ROC (Taiwan) Patent Application No. 108130158 Office Action and Search Report Non-English, Filing date Aug. 23, 2019, Date of completion of Search Jul. 20, 2020.

ROC (Taiwan) Patent Application No. 108130158 Office Action and Search Report English-Translation, Filing date Aug. 23, 2019, Date of completion of Search Jul. 20, 2020.

ROC (Taiwan) Patent Application No. 108130155 Office Action and Search Report Non-English, Filing date Aug. 23, 2019, dated Aug. 17, 2021.

ROC (Taiwan) Patent Application No. 108130155 Office Action English-Translation, Filing date Aug. 23, 2019, dated Aug. 17, 2021.

(56) References Cited

OTHER PUBLICATIONS

ROC (Taiwan) Patent Application No. 108130155 Search Report English-Translation, Filing date Aug. 23, 2019, Date of completion of Search Aug. 5, 2021.
ROC (Taiwan) Patent Application No. 108130155 Office Action and Search Report Non-English, Filing date Aug. 23, 2019, Date of completion of Search Dec. 6, 2021.
ROC (Taiwan) Patent Application No. 108130155 Search Report English-Translation, Filing date Aug. 23, 2019, Date of completion of Search Dec. 6, 2021.
China Patent Application No. 201980055555.7 Office Action and Search Report Non-English, Filing date Aug. 22, 2019, Date of completion of Search Nov. 9, 2021.
China-ApplicNo-201980055821.6 Office Action and Search Report Non-English, Filing date Aug. 22, 2019, Date of completion of Search Nov. 9, 2021.
China-ApplicNo-201980055580.5 Office Action and Search Report Non-English, Filing date Aug. 22, 2019, Date of completion of Search Dec. 6, 2021.
China Patent Application No. 201980055554.2 Office Action and Search Report Non-English Filing date Aug. 22, 2019, dated Mar. 9, 2022.

* cited by examiner

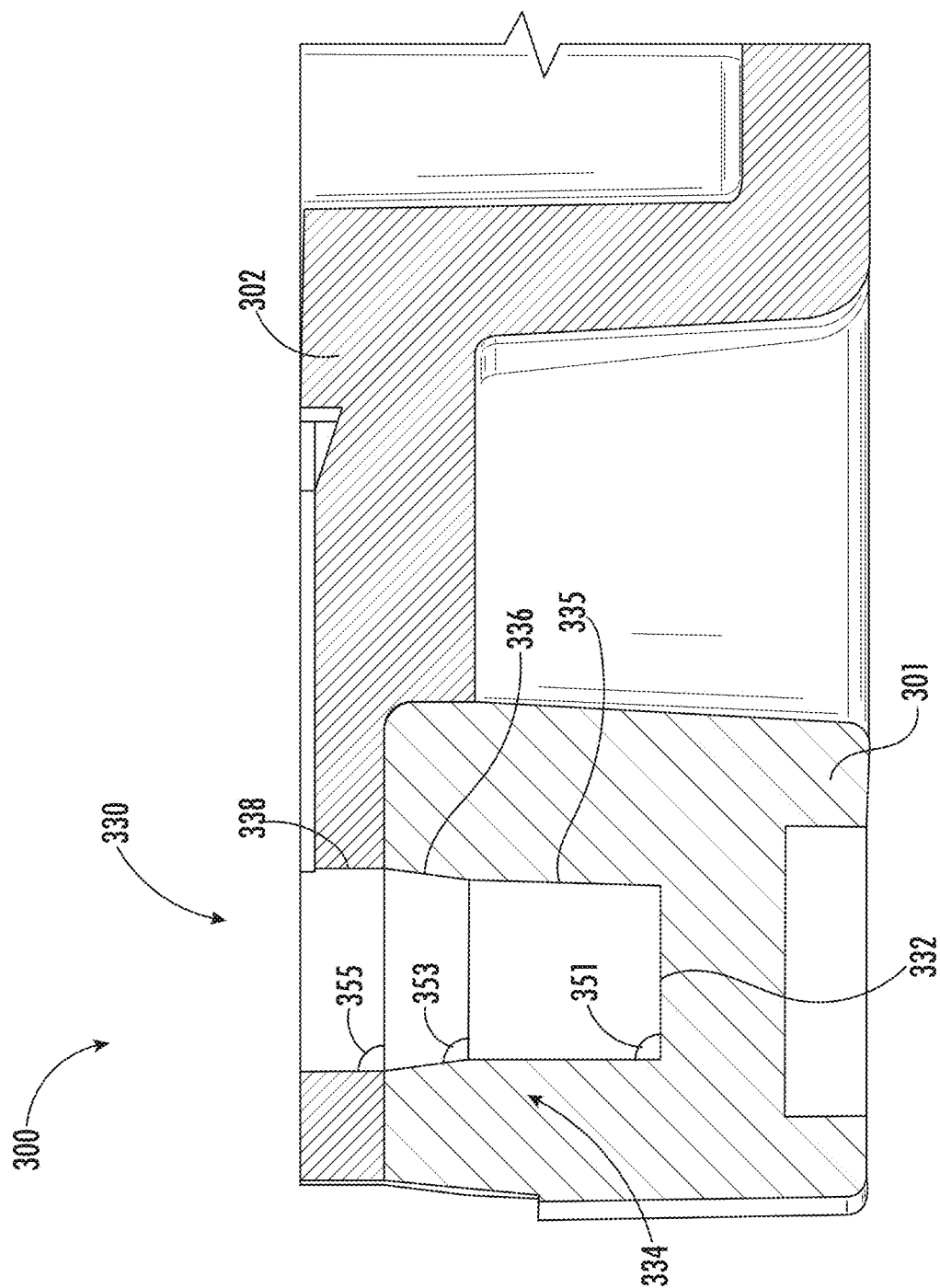

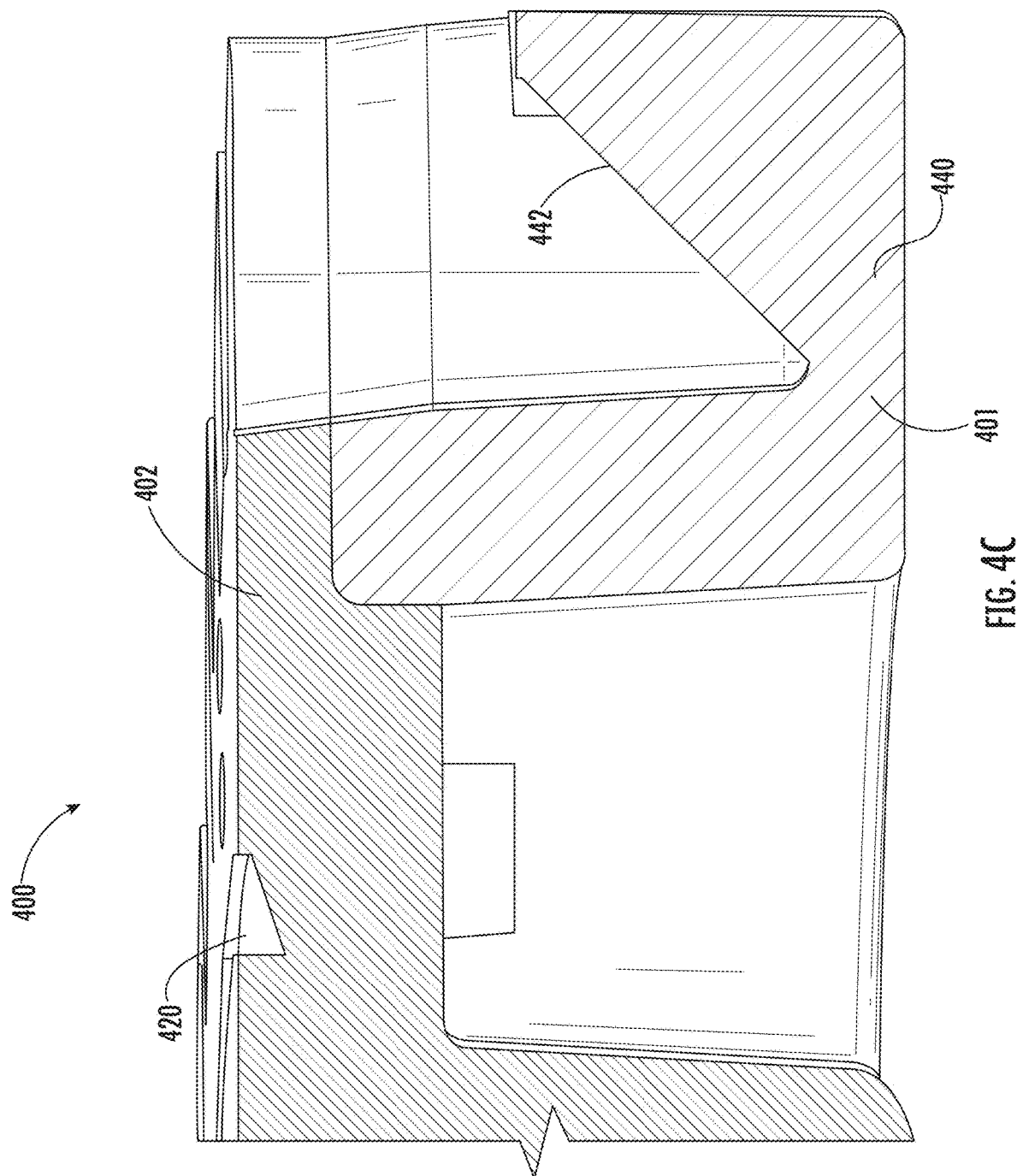

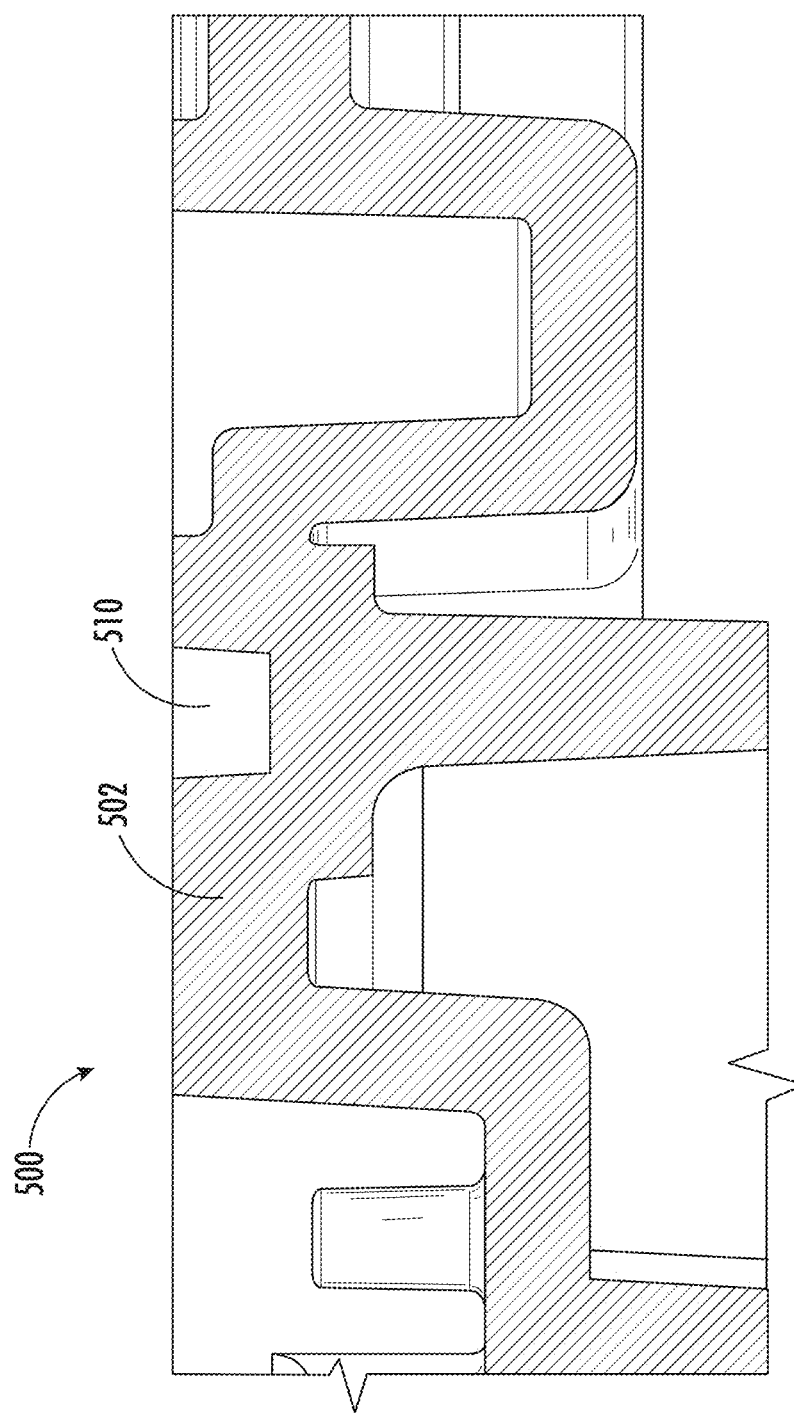

SYSTEMS AND METHODS FOR MANUFACTURING A MICROFLUIDIC ROTOR DEVICE

CROSS REFERENCE TO RELATED APPLICATION

This application claims the benefit of U.S. Provisional Patent Application No. 62/722,449, filed Aug. 24, 2018, which is expressly incorporated herein by reference in its entirety.

BACKGROUND

Analysis of fluids from a subject may be used as a diagnostic tool for disease and to monitor subject health. For example, analysis of a subject's blood sample may be used to diagnose a disease and/or used to quantify one or more analytes within the sample. Some systems optically analyze a blood sample applied to a rotor where the rotor includes a set of reagents disposed within a set of cuvettes. Inspection of one or more rotor welds, sample, and reagents within conventional rotors may be difficult and/or time consuming. Moreover, a rotor undergoing centrifugation may generate undesirable, high-decibel noise due to the unbalanced nature of asymmetric fluid flow within the rotor. Therefore, additional devices, systems, and methods for performing fluid analysis may be desirable.

SUMMARY

In general, a method may include bonding a first layer and a second layer using two-shot injection molding. The first layer coupled to the second layer may collectively define a set of wells. The first layer may be substantially transparent. The second layer may define a channel. The second layer may be substantially absorbent to infrared radiation. A third layer may be bonded to the second layer using infrared radiation. The third layer may define an opening configured to receive a fluid. The third layer may be substantially transparent. The channel may establish a fluid communication path between the opening and the set of wells.

In some embodiments, the infrared radiation may include a wavelength of about 940 nm. The first layer and the third layer may be each independently transparent. Substantially transparent may include light transmission of at least one of ultraviolet light, visible light, and infrared radiation. The second layer may be substantially absorbent to at least one of mid-infrared radiation and near-infrared radiation. Substantially absorbent to infrared radiation may include absorbing infrared radiation in a sufficient amount within a predetermined period of time to transition the second layer from a solid phase to a molten phase. The second layer may be substantially absorbent to at least 940 nm wavelength radiation. The first layer, the second layer, and the third layer may be independently composed of one or more of acrylic, polycarbonate, cyclic olefin copolymers (COC), and acrylonitrile butadiene styrene (ABS).

In some embodiments, the second layer may include at least about 0.1% by weight of carbon black. In some embodiments, the second layer may include between about 0.2% to about 0.4% by weight of carbon black. In some of these embodiments, the laser absorbing dye may be substantially absorbent to radiation between about 750 nm to about 3,000 nm.

In other of these embodiments, a lyophilized reagent may be disposed in one or more wells of the set of wells. The third layer may be bonded to the second layer and include using an infrared laser beam. The photomask may be configured to allow the infrared laser beam to pass over the lyophilized reagent. In other embodiments, the photomask may be configured to allow the infrared leaser beam to pass over the lyophilized reagent. In some embodiments, a set of shut offs may be formed by engaging a first half of a mold with the first layer disposed in a second half of the mold.

In some embodiments, the third layer may be formed using injection molding. In some embodiments, a fourth layer may be bonded to the third layer. The fourth layer may be at least partially opaque. In some of these embodiments, bonding the fourth layer to the third layer may include ultrasonically welding the fourth layer to the third layer. Bonding the fourth layer to the third layer may include one or more of laser welding, adhesive bonding, and solvent bonding.

BRIEF DESCRIPTION OF THE DRAWINGS

FIG. 3B is a detailed cross-sectional side view of a well of the rotor depicted in FIG. 3A.

FIG. 4C is a cross-sectional side view of the reflector depicted in FIG. 4A.

FIG. 5B is a detailed cross-sectional side view of the arcuate cavity depicted in FIG. 5A.

FIG. 11A depicts a mold closing and injection process, FIG. 11B depicts a mold opening process, FIG. 11C depicts a mold rotation process, FIG. 11D depicts a mold closing and injection process, FIG. 11E depicts a mold opening process, and FIG. 11F depicts a mold rotation and rotor ejection process.

DETAILED DESCRIPTION

Figure 1A:
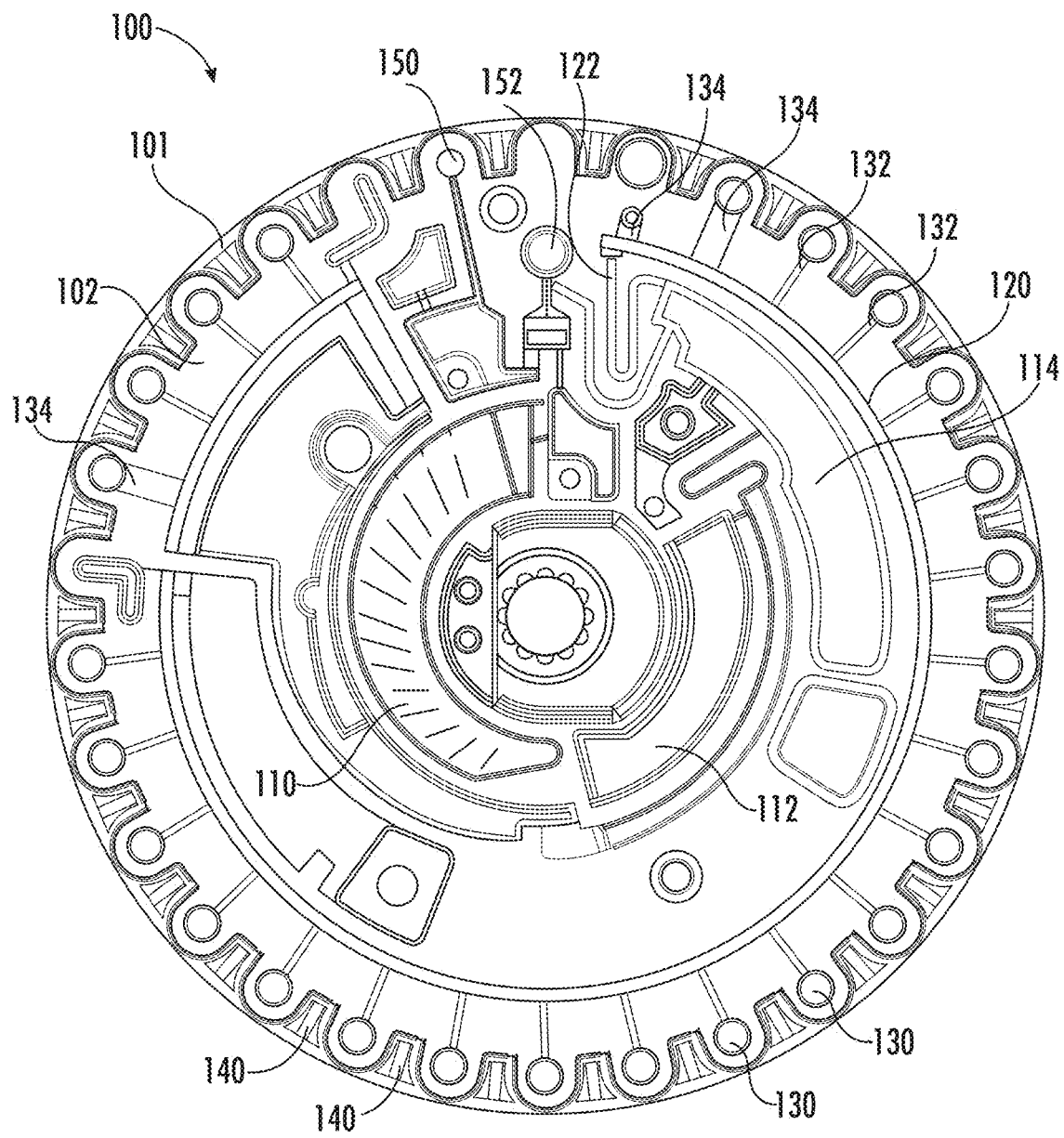
FIG. 1A is an illustrative plan view of a rotor, according to embodiments.

Described herein are embodiments of rotor devices, systems, and methods of use thereof. These systems and methods may be used to characterize and/or quantitate a biological sample and permit evaluation of subject health and/or diagnosis of a condition. For example, the rotors described herein may be configured for optical analysis of biological fluids, and in particular, for analyzing blood plasma after separating it from cellular material using the rotor. More particularly, a rotor may be configured to separate plasma from whole blood, and/or add diluent fluid to dilute the sample as desired, and distribute them into separate wells (e.g., cuvettes) configured for optical analysis of their contents. Each well may contain one or more substances that may aid biochemical analysis of the sample in the well. The sample may combine with one or more of the reagents within one or more of the wells. A biochemical reaction between the sample and reagent may produce an optical effect when exposed to a light beam which may be detected and analyzed. For example, by filling a set of wells with sample as the rotor spins while optically analyzing the fluid in each well, the sample may undergo a reaction or other change which results in a change in one or more of color, fluorescence, luminescence, combinations thereof, and the like, which may be measured by one or more of spectrophotometers, fluorometers, light detectors, combinations thereof and the like.

Each of the rotors (100, 200, 300, 400, 500, 600, 700) described in detail herein may receive a sample including, but not limited to, whole blood that may contain one or more of blood, serum, plasma, urine, sputum, semen, saliva, ocular lens fluid, cerebral fluid, spinal fluid, amniotic fluid, and tissue culture media, as well as food and industrial chemicals, combinations thereof, and the like. Any of the rotors (100, 200, 300, 400, 500, 600, 700) as described herein may be used with a suitable fluid analysis system (e.g., optical analyzer).

The devices disclosed herein may be suitable for performing a wide array of analytic procedures and assays. The analytic procedures may require that the sample be combined with one or more reagents so that some detectable change occurs which may be combined with one or more reagents so that some detectable change occurs which may be related to the presence and/or amount of a particular component (analyte) or characteristic of the sample. For example, the sample may undergo a reaction or other change which results in a change in color, fluorescence, luminescence, and the like, which may be measured by a spectrophotometer, fluorometer, light detector, and the like. In some cases, such assay procedures may be homogenous and not require a separation step. In other cases, assay procedures may separate the sample (e.g., blood plasma) from a cavity or well after an immunological reaction has occurred. Any number of analytical methods may be adapted for use in the centrifugal rotor devices disclosed herein, depending upon the particular sample being analyzed and component being detected.

In some embodiments, the rotor devices, reagents, systems, and methods may include one or more of the devices, systems, components, elements, compositions, and steps described in U.S. patent application Ser. No. 07/532,524, filed on Jun. 4, 1990, and titled "APPARATUS AND METHOD FOR SEPARATING CELLS FROM BIOLOGICAL FLUIDS," and/or U.S. patent application Ser. No. 07/678,824, filed on Apr. 1, 1991, and titled "APPARATUS AND METHOD FOR OPTICALLY ANALYZING BIOLOGICAL FLUIDS," and/or U.S. patent application Ser. No. 07/678,823, filed on Apr. 1, 1991, and titled "CENTRIFUGAL ROTOR HAVING FLOW PARTITION," and/or U.S. patent application Ser. No. 07/747,179, filed on Aug. 19, 1991, and titled "REAGENT COMPOSITIONS FOR ANALYTICAL TESTING," and/or patent application Ser. No. 07/833,689, filed on Feb. 11, 1992, and titled "REAGENT CONTAINER FOR ANALYTICAL ROTOR," and/or patent application Ser. No. 07/783,041, filed on Oct. 29, 1991, and titled "SAMPLE METERING PORT FOR ANALYTICAL ROTOR HAVING OVERFLOW CHAMBER," and/or U.S. patent application Ser. No. 07/873,327, filed Apr. 24, 1992, and titled "CRYOGENIC APPARATUS," and/or U.S. patent application Ser. No. 08/115,163, filed on Sep. 1, 1993, and titled "SIMULTANEOUS CUVETTES FILLING WITH MEANS TO ISOLATE CUVETTES," and/or U.S. patent application Ser. No. 08/124,525, filed on Sep. 20, 1993, and titled "ANALYTICAL ROTOR WITH DYE MIXING CHAMBER," and/or U.S. patent application Ser. No. 08/292,558, filed on Dec. 26, 1995, and titled "METHODS FOR PHOTOMETRIC ANALYSIS," and/or U.S. patent application Ser. No. 08/350,856, filed on Dec. 6, 1994, and titled "METHOD AND DEVICE FOR ULTRASONIC WELDING," and/or U.S. patent application Ser. No. 10/840,763, filed on May 5, 2004, and titled "MODIFIED SIPHONS FOR IMPROVING METERING PRECISION," and/or International Patent Application Serial No. PCTUS2017/039460, filed on Jun. 27, 2017, and titled "DEVICES WITH MODIFIED CONDUITS," each of which is hereby incorporated by reference in its entirety.

I. Devices

Described herein are devices that may be used in some embodiments of the various systems described. A rotor as described herein may include a set of cavities and wells. In some embodiments, one or more substances (e.g., reagent, lyophilized reagent) may be disposed in one or more wells of the rotor to facilitate sample analysis. For example, the reagents may be provided in dried form that may remain stable and intact during transportation and storage. In some embodiments, the rotor may define openings, channels, cavities, conduits, wells, and/or other structures configured to provide one or more of separating cellular components from the biological sample (e.g. whole blood), measuring predetermined volumes of liquid sample (e.g. plasma), mixing the sample with a predetermined diluent, and delivering the diluted sample to a set of wells for optical analysis. The fluid delivered to the set of wells may undergo one or more reactions within the set of wells that may aid characterization and quantification of one or more analytes within the fluid. The sample may be optically analyzed while present in the rotor, either with or without prior reaction.

The apparatus may be configured to be used with a fluid analysis system to quantify and analyze characteristics of the sample. For example, optical measurements (e.g., absorbance) of each well may be performed while the rotor is spinning. A light beam of predetermined wavelength may be directed to pass through the set of wells. This light may be partially absorbed by the products of the reaction between the reagents and components of the fluid sample. The degree to which the light is absorbed may depend on the concentration of the reaction product in the fluid sample. By comparing the intensity of the light transmitted through the well with a reference intensity, the concentration of a given reaction product between the fluid and the reagent may be calculated. The concentration of the reaction product may be used to calculate the concentration of a corresponding component in the sample fluid.

Rotor

In some embodiments, a rotor may include one or more features configured to aid sample analysis. In particular, a rotor may include one or more substantially transparent layers and another layer being substantially absorbent to infrared radiation (e.g., an opaque layer). For example, an opaque layer may be composed of a carbon black and acrylic compound that may be black in color. The opacity formed by this combination may provide a consistent contrasting background with a biological sample placed in the rotor, unlike a transparent rotor. This may aid a user (e.g., operator, technician) in applying and verifying the sample in the rotor, as well as inspection of the rotor welds of the different layers. Moreover, the rotor layers may be coupled together using laser welding techniques that may reduce manufacturing cycle times and improve rotor quality. For example, laser welding may increase weld consistency and improve rotor shape (e.g., flatness of the rotor).

Figure 1B:
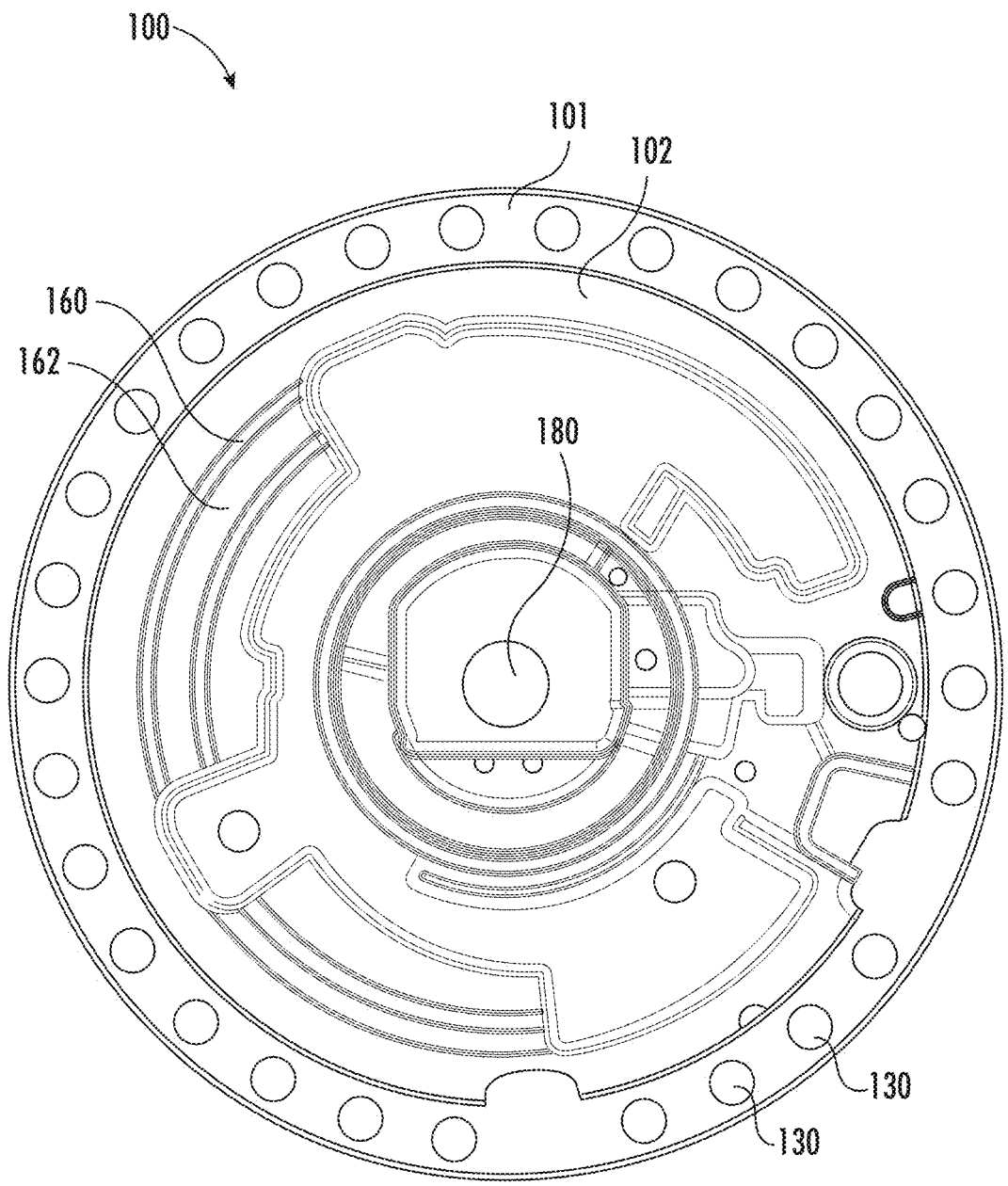
FIG. 1B is an illustrative bottom view of the rotor depicted in FIG. 1A.

FIG. 1A is an illustrative plan view of a rotor (100) while FIG. 1B is an illustrative bottom view of the rotor (100). The rotor (100) may include a substantially transparent first layer (101) with a first side (e.g., underside) of the second layer (102) coupled to the first layer (101). The first layer (101) and the second layer (102) may collectively define a set of wells (130). For example, at least a base portion (e.g., bottom portion) of each well of the set of wells (130) may be formed by the first layer (101). The opening (e.g., top portion) of each well opposite the base portion of the set of wells (130) may be defined by the second layer (102). Sidewalls of each well of the set of wells (130) may be generally cylindrical and may be formed by either the first layer (101), the second layer (102), or some combination thereof. In some embodiments, each well of the set of wells (130) may have a depth of between about 1.0 mm and about 10 mm, and a diameter of about 5 mm or less. In some embodiments, the rotor (100) may include between 5 wells and 50 wells. In some embodiments, each well of the set of wells (130) may define a volume of between about 1 µL and about 40 µL. In some embodiments, adjacent wells of the set of wells (130) may be spaced apart by between about 1 mm and about 30 mm. The set of wells of a rotor are described in more detail with respect to FIGS. 3A-3B. In FIG. 1A, the second layer (102) is shown disposed above the first layer (101).

In some embodiments, at least a portion of the second layer (102) may be substantially absorbent for infrared radiation. For example, the second layer (102) may be opaque (e.g., black), which is not illustrated in the figures for the sake of clarity. Likewise, the transparency of any transparent portion of a rotor described herein is not depicted for the sake of clarity. In some embodiments, at least a portion of the second layer (102) may be substantially absorbent to at least one of mid-infrared radiation and near-infrared radiation. Infrared radiation may have a wavelength between about 700 nm and about 1 mm. Mid-infrared radiation may have a wavelength between about 3 µm and about 8 µm. Near-infrared radiation may have a wavelength between about 0.75 µm and about 1.4 µm. Visible light may have a wavelength between about 400 nm and about 700 nm. Ultraviolet light may have a wavelength between about 10 nm and about 400 nm. In some embodiments, at least a portion of the second layer (102) may be substantially absorbent to at least 940 nm wavelength radiation.

As used herein, the terms 'transparent', 'transparency', and variants thereof may be understood as light transmission at a predetermined wavelength and/or range of wavelengths of chemical importance (such as for laser welding) of about 10% or more through its layer while the terms 'opaque', 'opacity', 'opaqueness', and variants thereof may include light transmission at the predetermined wavelength and/or range of wavelengths of about 10% or less through its layer. For example, acrylic may generally be considered transparent as it provides about 90% UV wavelength transmission. Transparent plastics formed using laser welding may retain their transparency in wavelengths. Furthermore, opaqueness of a material may correspond to energy absorption at a predetermined wavelength and/or predetermined range of wavelengths. As used herein, a material substantially absorbent to infrared radiation corresponds to a material that may absorb infrared radiation (of a predetermined range of wavelengths and power) to transition the material from a solid phase to a molten phase within a predetermined period of time.

The first layer (101) and the second layer (102) may further collectively define other structures of the rotor (100) (e.g., cavities, channels, holes, protrusions, projections) as described in more detail herein. For example, the second layer (134) may define one or more portions of a set of arcuate cavities (110, 112, 114), a set of channels (120, 122), a set of inlets (132, 134), and a set of reflectors (140). In some embodiments, the set of channels (120, 122) may establish a fluid communication path between the arcuate cavity (110) and the set of wells (130, 150, 152).

Each well of the set of wells (130) may be coupled to the channel (120) by a respective inlet (132, 134). Each well of the set of wells (130) may be configured to fill in series. That is, the rotor (100) may include a set of high density, series filled cuvettes. In some embodiments, each inlet of the set of inlets may have the same dimensions. In other embodiments, each inlet of the set of inlets may have different dimensions. For example, a width of a first set of inlets (132) may be less than a width of a second set of inlets (134). The different inlet dimensions may allow each of the wells (130) to fill with fluid at different velocities (i.e., due to acceleration) of the spinning rotor (100). The wider width of the second set of inlets (134) may be configured to accommodate bidirectional flow of liquid in one direction and gas in the opposite direction at relatively low revolutions per minute (e.g., under about 4,000 RPMs), as described in more detail herein. In some embodiments, a width of the set of inlets may be between about 0.25 mm and about 3.0 mm, a length of the set of inlets may be between about 0.5 mm and about 6.0 mm, and a depth of the set of inlets may be between about 0.1 mm and about 0.25 mm.

In some embodiments, arcuate cavities (112, 114) may correspond to a respective metering chamber and mix chamber. For example, diluent fluid may be received and held in the metering chamber (112) after a diluent cup has been opened. The mix chamber (114) may be configured to be coupled to the metering chamber (112) and the arcuate cavity (110) such that fluid from each of those cavities may combine within the mix chamber (114) (e.g., sample and diluent). In some embodiments, the set of wells may include a sample check well (150) and a red blood cell (RBC) well (152). The sample check well (150) may be used as a gauge of whether enough sample has been input into the rotor (100). For example, an unfilled or incompletely filled sample check well (150) may indicate that insufficient sample has been inserted into the rotor (100) to perform fluid analysis. The RBC well (152) may be configured to receive and hold red blood cells of the sample. For example, a whole blood sample may be separated into red blood cells held in the RBC well (152) and plasma that may fill the set of wells (130).

In some embodiments, the first layer (101) may be substantially transparent to one or more of ultraviolet light, visible light, and infrared radiation. In some embodiments, the first layer (101) and the second layer (102) may be independently composed of one or more of acrylic, polycarbonate, cyclic olefin copolymers (COC), polystyrene, acrylonitrile butadiene styrene (ABS), and other materials transparent to ultraviolet light.

In some embodiments, the second layer (102) may include at least about 0.1% by weight of at least one of an organic and inorganic pigment. For example, the second layer (102) may include between about 0.2% to about 0.4% by weight of carbon black.

Organic pigments may include carbon black and laser absorbing compositions. Carbon black may have an absorption range of between about 500 nm and about 2200 nm. Carbon black may have an optical penetration depth for near-infrared radiation wavelengths of between about 10 µm and about 100 µm based on concentration (e.g., about 0.1% and more by weight at 940 nm). In some embodiments, the laser absorbing composition may be substantially absorbent to radiation between about 700 nm to about 8 µm. For example, Clearweld® and Lumogen® may have an absorption range of between about 700 nm and about 1100 nm.

Inorganic pigments may include copper phosphates and indium tin oxide (ITO). Copper phosphates may have an absorption range of between about 900 nm and about 1600 nm. ITO may have an absorption range above about 1000 nm.

The rotor devices as described herein may include an opening (e.g., receptacle) configured to be mounted on a system, such as a centrifuge, for spinning. The centrifuge may include, for example, a vertical drive shaft on which the rotor may be mounted. However, a rotor may have inherent or residual imbalances due to one or more of rotor design and fluid flow within the rotor. For example, a biological sample may be configured to flow through different cavities, chambers, and channels of a rotor throughout a centrifugation process. In some cases, a rotor may be configured to be generally balanced when fluid fills a set of wells, but may be unbalanced when the sample is input and held in a holding chamber (e.g., arcuate cavity). Accordingly, the rotor may generate undesirable noise throughout a centrifugation process that may reduce the desirability of rotor use in point-of-care settings.

As shown in FIG. 1B, a first side (e.g., underside, bottom side) of the second layer (102) may include a set of arcuate protrusions (160) and a hole (180). The set of arcuate protrusions (160) may have a predetermined shape, number, position, and mass distribution configured to offset a center of mass of the rotor (100) from a center of the rotor (100). Additionally or alternatively, the second layer (102) may include a set of recessed portions (162) having a predetermined shape, number, position, and volume. For example, the set of recessed portions (162) and arcuate protrusions (160) may have one or more of an arcuate, radial, oblong, secant, and linear shape. In some embodiments, the set of recessed portions (162) may be parallel and arcuate. In some embodiments, a center of mass of a rotor may be configured to be between up to about 0.5 mm from a center of the rotor. In this manner, the center of mass of the rotor may be closer to the center of mass of the rotor having fluid flow throughout a centrifugation process. This may aid overall noise reduction during centrifugation of the rotor (100), especially under different centrifugation speeds.

In some embodiments, the first layer (101) and/or the second layer (102) may be formed using injection molding (e.g., multi-shot molding) and/or machining as described in more detail herein. In some embodiments, the first layer (101) and/or the second layer (102) may be bonded to the other layers of the rotor (100) using one or more of ultrasonic welding, laser welding, adhesives (e.g., adhesive tape), and/or solvent bonding.

For example, laser welding may use one or more of a semiconductor diode laser, solid-state Nd:YAG laser, and fiber laser. A diode laser may generate a light beam having a wavelength between about 800 nm and about 2000 nm (e.g., about 940 nm, about 980 nm). A Nd:YAG laser may generate a light beam having a wavelength at about 1064 nm. A fiber laser may generate a light beam having a wavelength between about 1030 nm and about 1620 nm.

In some embodiments, the rotor (100) may have a diameter of between about 40 mm and about 120 mm and a thickness of between about 10 mm and about 30 mm, including all values and sub ranges in-between.

Figure 2A:
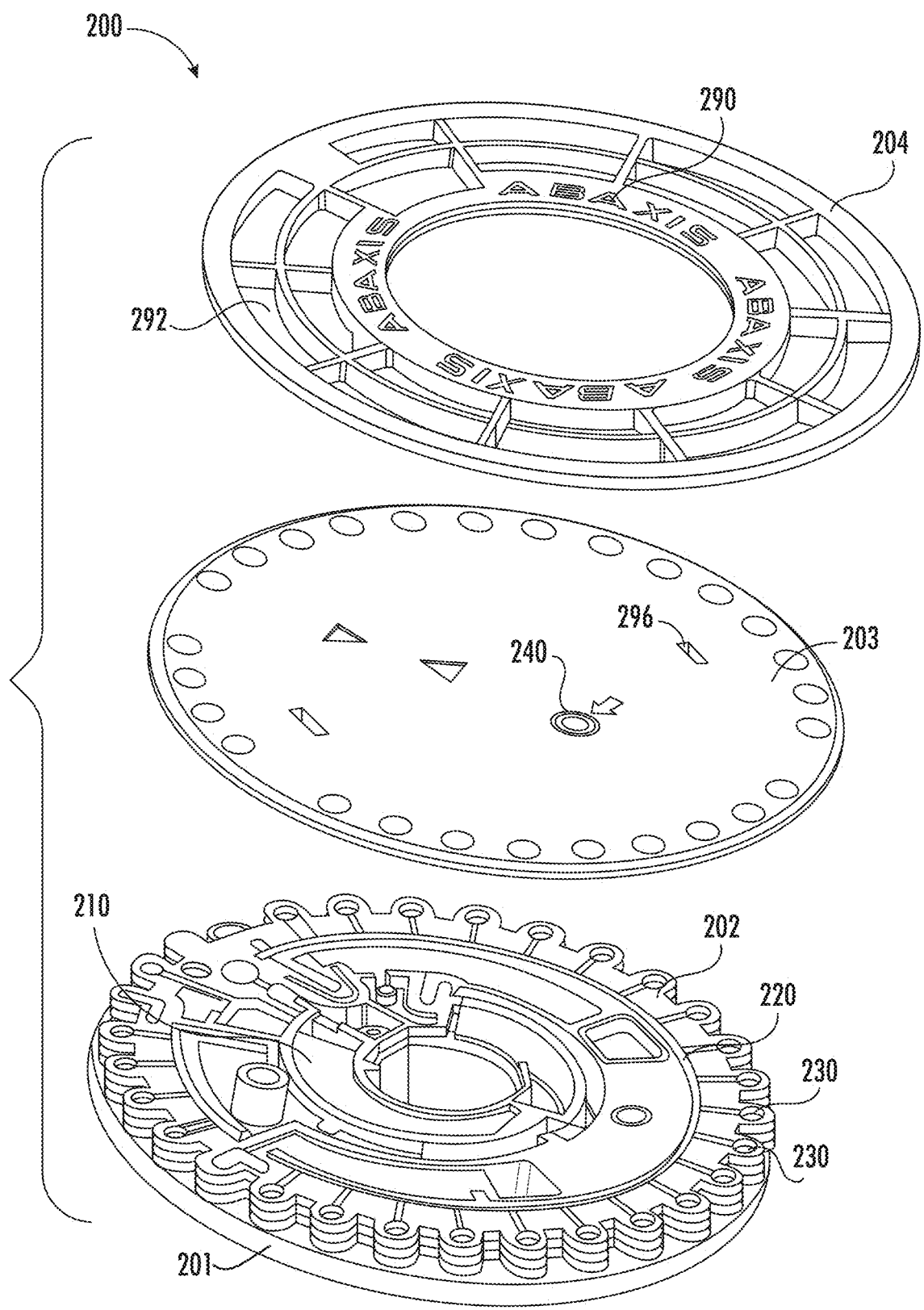
FIG. 2A is an illustrative exploded view of a rotor assembly, according to other embodiments.
Figure 2B:
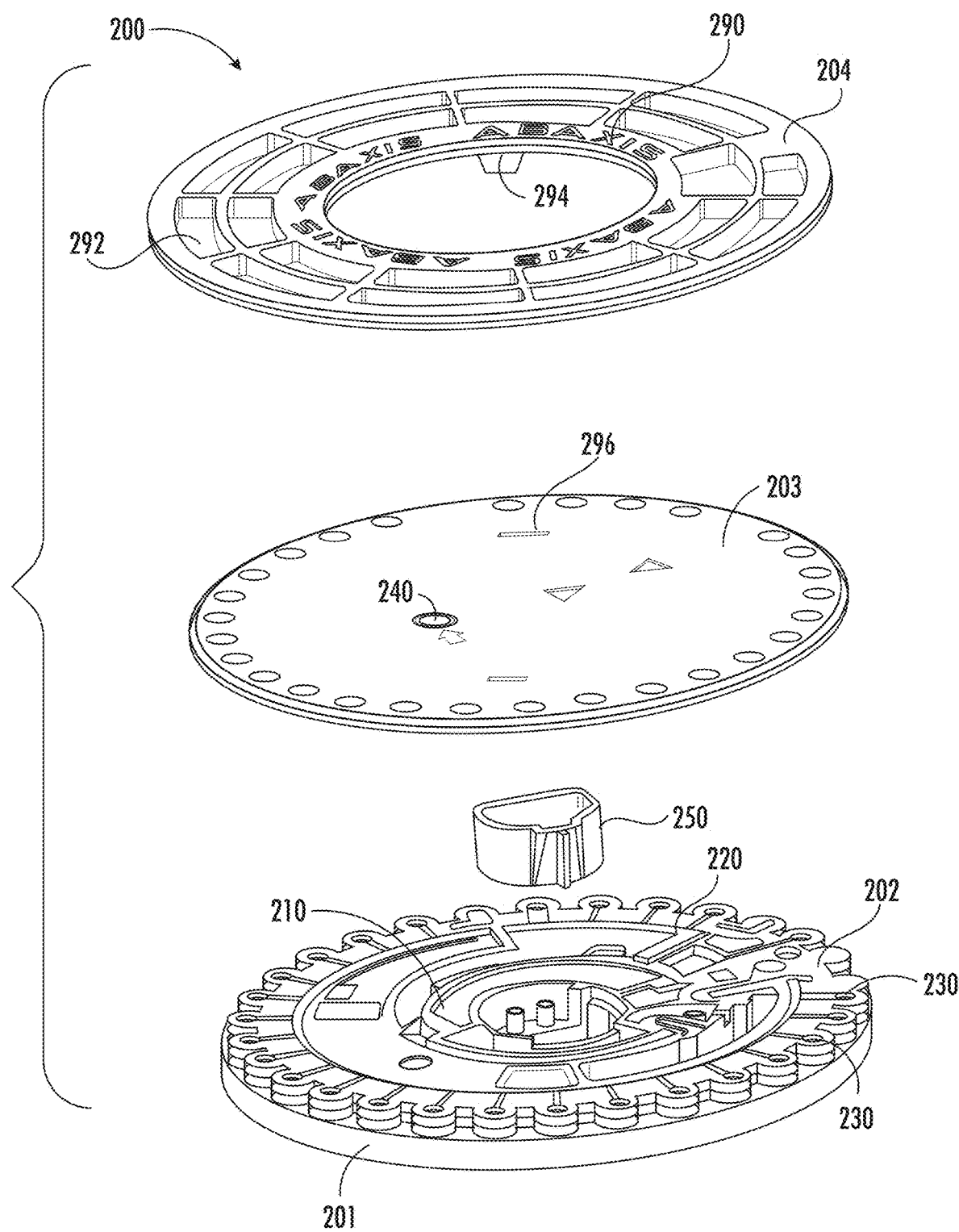
FIG. 2B is another illustrative exploded view of the rotor assembly depicted in FIG. 2A.

FIGS. 2A and 2B are illustrative exploded views of a rotor assembly (200), according to other embodiments. The rotor assembly (200) may include a rotor structurally and/or functionally similar to the rotors (100, 300, 400, 500, 600, 700) as described herein. For example, the rotor assembly (200) may include a substantially transparent first layer (201) coupled to a first side (e.g., underside) of the second layer (202). The first layer (201) and the second layer (202) may collectively define a set of wells (230). In some embodiments, at least a portion of the second layer (202) may be substantially absorbent to infrared radiation. In some embodiments, at least a portion of the second layer (202) may be substantially absorbent to one or more of mid-infrared radiation and near-infrared radiation. For example, at least a portion of the second layer (202) may be substantially absorbent to at least 940 nm wavelength radiation. The first layer (201) and the second layer (202) may further collectively define other structures of the rotor (200) (e.g., cavities, channels, holes, protrusions, projections) as described in more detail herein. For example, the second layer (102) may define one or more portions of an arcuate cavity (210) and a set of channels (220). In some embodiments, the set of channels (220) may establish a fluid communication path between the arcuate cavity (210) and the set of wells (230).

In some embodiments, the second layer (202) may include at least about 0.1% by weight of carbon black. For example, the second layer (202) may include between about 0.2% to about 0.4% by weight of carbon black. In some embodiments, the first layer (201) and/or the second layer (202) may be formed using injection molding (e.g., multi-shot molding) and/or machining as described in more detail herein. In some embodiments, the first layer (201) and/or the second layer (202) may be bonded to the other layers of the rotor (200) using one or more of ultrasonic welding, laser welding, adhesives (e.g., adhesive tape), and/or solvent bonding. For example, laser welding may use one or more of a semiconductor diode laser, solid-state Nd:YAG laser, and fiber laser.

The rotor assembly (200) may include a third layer (203) that may be coupled to a second side (e.g., top side) of the second layer (202). The third layer (203) may define an opening (240) configured to receive a fluid such as blood. The third layer (203) may be substantially transparent. The channel (220) may establish a fluid communication path between the opening (240) and the set of wells (230). The opening (240) of the third layer (203) may be configured to receive a sample. For example, the sample may be pipetted, injected through a membrane, and poured. The opening (240) may have any suitable shape and/or size to receive the sample. The third layer (203) may be coupled to the second layer (202) using laser welding. For example, laser welding may use one or more of a semiconductor diode laser, solid-state Nd:YAG laser, and fiber laser.

In some embodiments, the rotor assembly (200) may include a fourth layer (204) (e.g., sample holder). A rotor may be removably held by a fourth layer (204) to aid in handling, processing, and identification of a rotor and/or sample. The fourth layer (204) coupled to the rotor may be placed by a user into a fluid analysis system for automated processing of the sample. The fourth layer (204) may be useful in providing physical support and protection to the rotor.

Figure 2C:
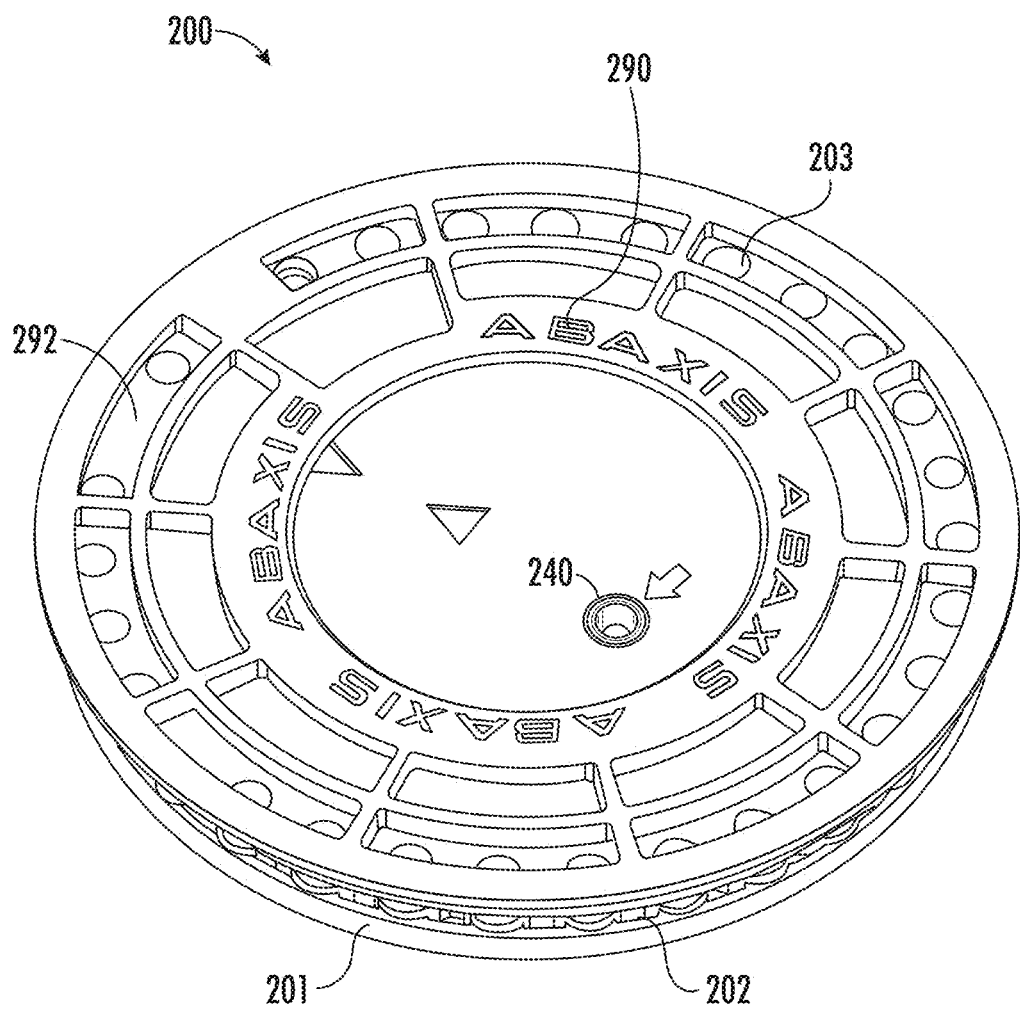
FIG. 2C is an illustrative assembled perspective view of the rotor assembly depicted in FIG. 2A.

The fourth layer (204) may be coupled to an external surface of a third layer (203). For example, the fourth layer (204) may include a set of protrusions (294) (see FIG. 2B) configured to fit within corresponding holes (296) of the third layer (203). The fourth layer (204) may include a set of portions (e.g., outer and inner circumference, edges) for a user to grasp without touching the other rotor layers (201, 202, 203) and potentially affecting the optical qualities of the rotor assembly (200). A diameter of the fourth layer (204) may be greater than a diameter of the rotor. The fourth layer (204) may define a set of openings (292) configured to allow unimpeded light transmission through the set of wells (230) and/or reduce weight. The fourth layer may further function as a shield against sample fluid that may spin out of the opening of a rotor during centrifugation. The fourth layer (204) may be configured to hold the rotor assembly (200) at a fixed position relative to the fourth layer (204) while allowing unimpeded light transmission through the set of wells (230). FIG. 2C depicts the assembled rotor assembly (200). The fourth layer (204) may be opaque.

In some embodiments, the fourth layer (204) may include one or more identifiers (290) such as a barcode, QR code, and one or more fiducials (e.g., colored/opaque points, ruler, slits, landmarks, markers), combinations thereof, and the like. For example, an arcuate barcode may be disposed along an outer circumference of the fourth layer (204) (e.g., on a side of the cover (204) facing away from the third layer (203)). The identifiers may be used for identification and processing of the rotor assembly (200).

In some embodiments, the first layer (201) and the third layer (203) may be substantially transparent to one or more of ultraviolet light, visible light, and infrared radiation. In some embodiments, the first layer (201), the second layer (202), the third layer (204), and the cover (204) may be independently composed of one or more of acrylic, polycarbonate, cyclic olefin copolymers (COC), polystyrene, and acrylonitrile butadiene styrene (ABS) and/or the like. Although the device (200) shown in FIGS. 2A-2C include three layers, it should be appreciated that any of the rotors described herein may be formed using more or less layers. In some embodiments, a layer substantially absorbent to infrared radiation may be printed on a transparent first layer. For example, a layer of carbon black or a laser absorbing composition may be printed over a surface of a transparent first layer (e.g., rotor base including the wells, channels, and cavities described herein).

Figure 3A:
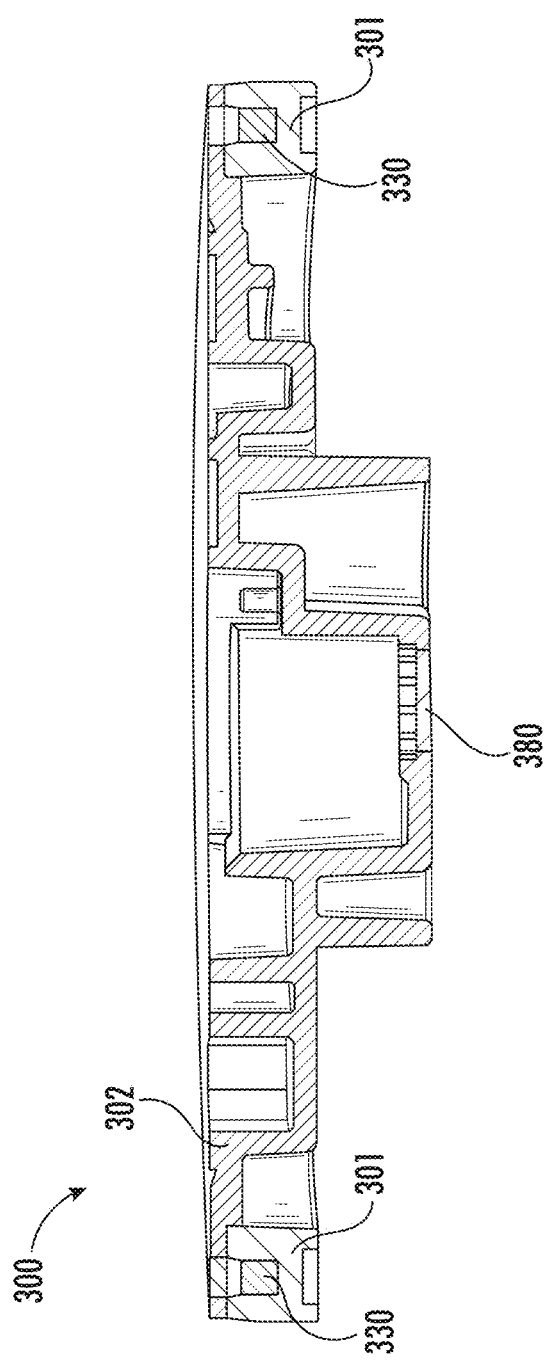
FIG. 3A is a cross-sectional side view of a rotor, according to other embodiments.

FIG. 3A is a cross-sectional side view and FIG. 3B is a detailed cross-sectional side view of a well (330) of a rotor (300). The rotor (300) may be structurally and/or functionally similar to the rotor (100, 200, 400, 500, 600, 700) as described herein. The rotor (300) may include a substantially transparent first layer (301) coupled to a second layer (302). The first layer (301) and the second layer (302) may collectively define a set of wells (330). Each well of the set of wells (330) may be formed along a periphery of the rotor (300). For example, the set of wells (330) may follow a circumference of the rotor (300). In some embodiments, the set of wells (330) may include a generally cylindrical shape as described in more detail herein. For example, as shown in FIG. 3B, each well (330) may be defined by an opening (338) in the second layer (302) while the sidewalls (334) and a base portion (332) may be formed in the first layer (301). Alternatively, in some embodiments, one or more portions of the sidewalls (334) may be formed by the second layer (302). As shown in the detailed cross-sectional side view of FIG. 3B, the sidewall (334) may include a first sidewall portion (335) and a second sidewall portion (336).

In some embodiments, a diameter of the opening for each well of the set of wells may be greater than a diameter of the base of each well of the set of wells. In some embodiments, the well (330) may taper inward from an opening (338) toward the base portion (332). In some embodiments, an intermediate portion of the well may taper more than the end portions of the well (330). For example, the first sidewall portion (335) may taper (351) up to about 2°. The second sidewall portion (335) may taper (353) between about 3° and about 9°. The opening (338) may taper (355) up to about 2°. This well (330) configuration may aid coupling between the first layer (301) and the second layer (302) when these layers are pressed together in an injection molding process. For example, the tapered sidewall surfaces may be configured as a shut off for a two-shot injection molding process that may prevent a carbon-filled material from infiltrating into a transparent material. That is, the shut off provided by the tapered surface may establishes a boundary between the second material and the first material.

An incident light beam may be configured to be transmitted through the well (330) without passing through the sidewalls (334). In some embodiments, the opening may have a depth between about 0.25 mm and 7 mm, and a diameter between about 1 mm and about 5 mm. In some embodiments, the first sidewall portion may have a depth between about 2 mm and about 6 mm.

In some embodiments, at least a portion of the second layer (302) may be substantially absorbent to infrared radiation. For example, the second layer (302) may be opaque (e.g., black). In some embodiments, at least a portion of the second layer (302) may be substantially absorbent to one or more of mid-infrared radiation and near-infrared radiation. For example, at least a portion of the second layer (302) may be substantially absorbent to at least 940 nm wavelength radiation.

The first layer (301) and the second layer (302) may further collectively define other structures of the rotor (300) (e.g., cavities, channels, holes, protrusions, projections) as described in more detail herein. For example, as shown in FIG. 3A, the second layer (302) may define a hole (380) within a center of the second layer (302). In some embodiments, the first layer (301) may be substantially transparent to one or more of ultraviolet light, visible light, and infrared radiation. In some embodiments, the first layer (301) and the second layer (302) may be independently composed of one or more of acrylic, polycarbonate, cyclic olefin copolymers (COC), polystyrene, acrylonitrile butadiene styrene (ABS), and the like. In some embodiments, the second layer (302) may include at least about 0.1% by weight of carbon black. For example, the second layer (302) may include between about 0.2% to about 0.4% by weight of carbon black.

In some embodiments, the first layer (301) and/or the second layer (302) may be formed using injection molding (e.g., multi-shot molding) and/or machining as described in more detail herein. In some embodiments, the first layer (301) and/or the second layer (302) may be bonded to the other layers of the rotor (100) using one or more of ultrasonic welding, laser welding, adhesives (e.g., adhesive tape), and/or solvent bonding. For example, laser welding may use one or more of a semiconductor diode laser, solid-state Nd:YAG laser, and fiber laser.

Inlet

Figure 4A:
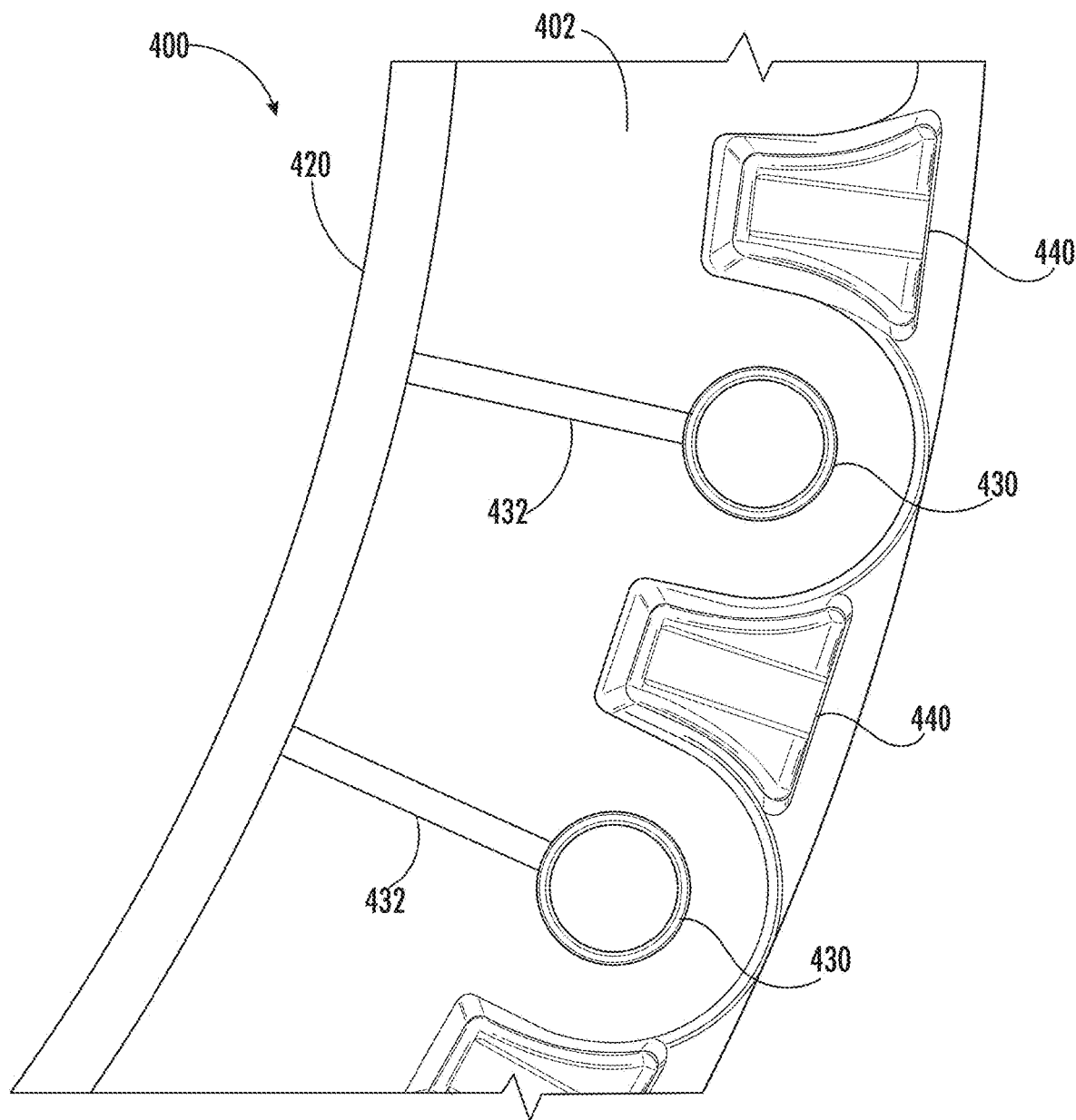
FIG. 4A is a detailed plan view of a set of wells and a set of reflectors of a rotor, according to embodiments.
Figure 4B:
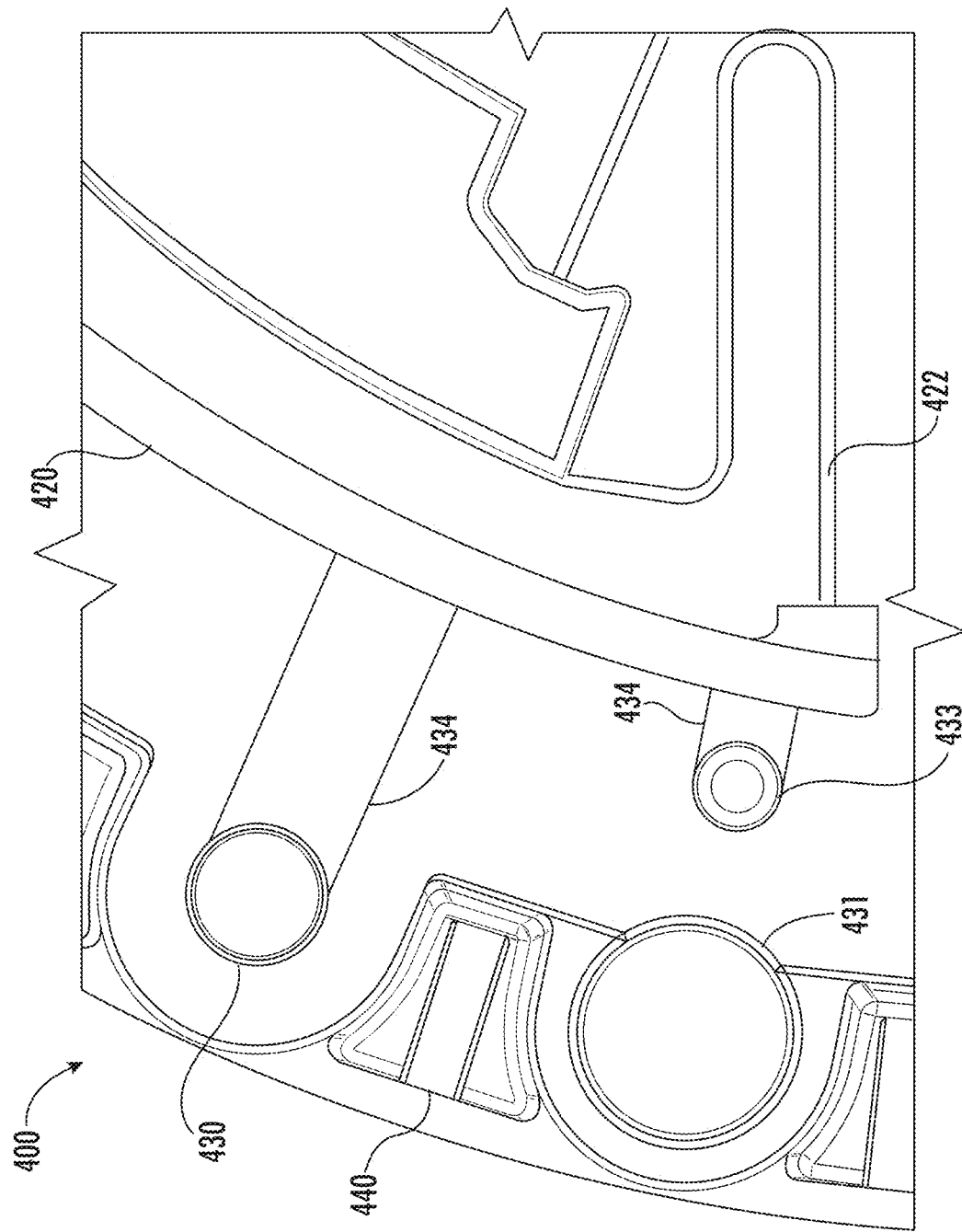
FIG. 4B is a detailed plan view of an inlet and channel of a rotor, according to embodiments.

FIGS. 4A-4B are detailed plan views of a set of wells, a set of inlets, and a set of reflectors of a rotor. In some embodiments, the rotors as described herein may define a set of generally radial inlets (e.g., channels) coupled between a respective well and a channel of the rotor. The inlets may be configured to allow liquid phase and gas phase communication between a well and the channel. For example, as the rotor is spun (e.g., by a centrifuge), fluid may enter the well through a respective inlet coupled to a channel and arcuate cavity (e.g., holding chamber, collection chamber). Some of the inlet channels may include a discrete first flow path for fluid to enter the well and a discrete second flow path for gas to exit the well. This may allow gas in the wells to escape, thus limiting the creation of bubbles in the well as the wells are filled.

As shown in the detailed plan view of the rotor (400) in FIG. 4A, the rotor (400) may include a layer (402) structurally and/or functionally similar to the second layer (102, 202, 302, 502, 702) as described herein such as a substantially opaque layer that may be absorbent to infrared radiation. The layer (402) may define a set of structures including one or more of a channel (420), a set of wells (430, 433), and a set of inlets (432, 434) coupled therebetween. Each inlet of the set of inlets (432, 434) may correspond to a different well of the set of wells (430, 433). Each inlet of the set of inlets (430, 433) may establish a fluid communication path between the channel (420) and its corresponding well. The layer (402) may further define a set of reflectors (440) with each reflector disposed between adjacent wells (430).

In some embodiments, a width of at least one inlet of the set of inlets (432, 434) may be greater than a width of the channel (420). In some embodiments, the set of inlets (432, 434) may include a first subset of inlets (432) (see FIG. 4A) and a second subset of inlets (434) (see FIG. 4B). A width of each inlet of the first subset of inlets (432) may differ from a width of each inlet of the second subset of inlets (434). The second subset of inlets (434) may be configured to allow venting of fluid (e.g., liquid phase and gas phase) within the channel (420) at low revolutions per minute (RPMs). For example, bidirectional flow of fluid within the second subset of inlets (434) may occur during spinning of the rotor (400) between about 500 RPMs and about 2500 RPMs. The inlets of the first subset of inlets (432) may accommodate bidirectional fluid flow for rotors spinning above about 4000 RPMs.

In some embodiments, a subset of the wells (430, 433) coupled to a second subset of inlets (434) may be located along the channel (420) adjacent to or near the channel (422) (e.g., conduit). The wells (430, 433) adjacent to or near the conduit (422) may be configured to fill before the other wells (430) disposed farther away from the conduit (422). When the rotor is spun at relatively low RPMs (e.g., under about 4000 RPMs), bidirectional fluid flow may not occur using inlets having a width of the first set of inlets (432). For example, fluid entering a well (430) coupled to a first subset of inlets (432) during spinning of the rotor at about 1000 RPM may trap air bubbles within the inlet (432) and result in incomplete filling of the well (430) because the inlet is not wide enough to allow simultaneous liquid phase and gas phase flow at that RPM. However, the wider inlets having a width of the second set of inlets (434) may be configured to accommodate bidirectional flow of liquid and gas at relatively low revolutions per minute, thereby allowing a greater number of wells (430) to be utilized in the rotor (400). In some embodiments, the set of inlets may include a set of different widths including 1, 2, 3, 4, 5, 6, or more widths corresponding to a set of spinning rotor RPMs. The inlets (432, 434) having different widths may be provided in any order along the channel (420).

In some embodiments, wells (430, 433) coupled to the second subset of inlets (434) do not include a reagent. In some embodiments, a width of the set of inlets may be between about 0.25 mm and about 3.0 mm, a length of the set of inlets may be between about 0.5 mm and about 6.0 mm, and a depth of the set of inlets may be between about 0.1 mm and about 0.25 mm.

It should be appreciated that relatively wide inlet widths for wells at any given RPM may require more sample volume to properly fill the wells and may increase the risk of cross-contamination of reagent and/or sample between wells. In some embodiments, each well including at least one reagent may have an inlet width of the first subset of inlets (432) and each well without a reagent may have an inlet width of the second subset of inlets (434).

Reflector(s)

In some embodiments, a rotor as described herein may include a set of reflectors (e.g., reflective surfaces) positioned radially inward from a set of wells. The set of reflectors may be configured to receive and reflect a light beam used as a timing signal for optical analysis of an adjacent well. A light beam received and reflected by the reflector may be received by a detector. A control device may process the light signal received from the reflector to activate a radiation source to guide a light beam configured to pass through an optical path of a well. For example, the light beam received from the reflector may indicate that the well may soon pass between the radiation source and detector (e.g., within a few microseconds). FIG. 4C is a cross-sectional side view of a reflector (440) depicted in FIG. 4A. Each reflector of the set of reflectors (440) may be disposed between adjacent wells of the set of wells (430). Each reflector of the set of reflectors (440) may define a prism-shaped cavity and may be formed in a substantially transparent layer of the rotor (e.g., first layer (101, 201, 301) as described in detail herein. Each prism-shaped cavity may include a reflective surface. Each reflector of the set of reflectors may be configured to receive and deflect a light beam by about 90° (although an angle different than 90° may be used as well). For example, the reflective surface may be oriented at about a 45° angle to a rotational axis of the rotor (e.g., an axis perpendicular to a plane of the rotor) and may be configured to generate total internal reflection at a rotor-air interface.

In some embodiments, a polish may be disposed over a reflective surface of each prism-shaped cavity of the set of reflectors (440). A reflective surface of the reflector may include a polish having a surface roughness averaging between about 0 and about 3. In some embodiments, a width of a reflector may be between about 0.5 mm and about 2.5 mm, a length of the reflector may be between about 2 mm and about 3 mm, and an angle of a reflective surface relative to a plane of the rotor may be between about 30 degrees and about 60 degrees.

Arcuate Cavity

Figure 5A:
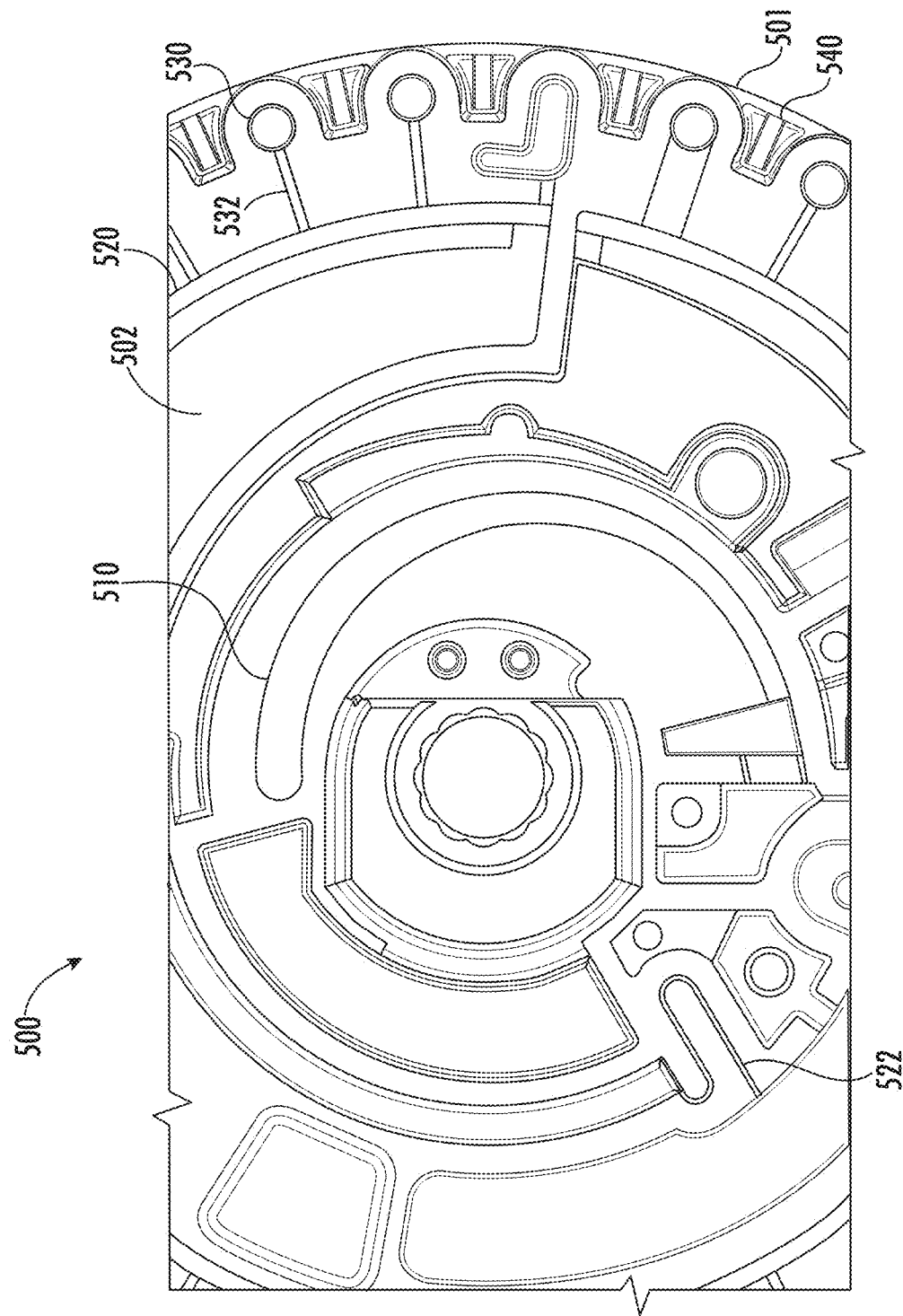
FIG. 5A is a detailed plan view of an arcuate cavity of a rotor, according to embodiments.

The rotors as described herein may be configured to receive a sample through an opening leading into a sample receiving chamber. For example, the sample may be input into the rotor using a pipette. A pipette may be configured to output a sample through a narrow tip at high velocity, which may generate one or more of air bubbles and sample overflow when input into some conventional rotors. FIG. 5A is a detailed plan view of an arcuate cavity (510) (e.g., sample receiving chamber) of a rotor (500). FIG. 5B is a detailed cross-sectional side view of the arcuate cavity (510) depicted in FIG. 5A. The rotor (500) may include a substantially transparent first layer (501) coupled to a substantially opaque (e.g., substantially absorbent to infrared radiation) second layer (502). The arcuate cavity (510) may be configured to receive and hold a fluid prior to delivery to a set of wells (530) of the rotor (500).

The second layer (502) may further define a channel (520). The first layer (501) and the second layer (502) may further collectively define other structures of the rotor (500) (e.g., cavities, channels, holes, protrusions, projections) as described in more detail herein. For example, the second layer (502) may define one or more portions of a set of channels (520, 522), a set of inlets (532), a set of wells (530), and a set of reflectors (540), as described in detail herein. A fluid communication path may be established between the opening in the rotor (500), the arcuate cavity (510), set of channels (520, 522), set of inlets (532), and set of wells (530). The arcuate cavity (510) may be configured for fluid communication between the opening and the set of channels (520).

As shown in FIG. 5A, a width of the arcuate cavity (510) may narrow in a proximal-to-distal direction (e.g., in a clockwise direction in FIG. 5A). In some embodiments, the arcuate cavity (511) may have a width-to-depth ratio between about 0.8 to about 1.2. In this configuration where the width and depth of the arcuate cavity (510) are generally similar, the arcuate cavity may reduce the generation of air bubbles and sample back-up when sample is introduced into the arcuate cavity (510) using a pipette. For example, a sample of whole blood may be pipetted into the arcuate cavity through a sample port of the sample receiving chamber.

Moreover, the second layer (502) of the rotor (500) may form a width of the arcuate cavity (510) such that a "floor" of the arcuate cavity (510) is substantially opaque. Consequently, an easily visible contrast may be formed when sample such as whole blood is received in the arcuate cavity (510) that may aid filling of the sample into the rotor (500).

A substantially transparent third layer (not shown for the sake of clarity) may be coupled to the second layer (502) and form a "ceiling" of the arcuate cavity (510). The third layer may define an opening (not shown) aligned with the arcuate cavity (510) such that the arcuate cavity (510) may receive fluid through the opening. In some embodiments, the arcuate cavity (510) may have a depth of between about 1.0 mm and about 10 mm and may define a volume of between about 50 µL and about 200 µL. This may aid even distribution and filling of the arcuate cavity (510) without overflow of sample out of an opening in the arcuate cavity.

In some embodiments, the arcuate cavity may be configured to hold a fluid, mix a fluid with another substance, generate one or more chemical reactions, and/or be used to characterize the fluid and/or other substances in the arcuate cavity. In some embodiments, fluid may be mixed with a reagent such as a diluent or a dye within the arcuate cavity. For example, a reagent may be disposed in the arcuate cavity in a liquid or solid form (e.g., bead, pellet, and the like). The reagent may be attached (e.g., coated) to a surface of the arcuate cavity such as a sidewall, and/or attached to a solid matrix. Chemical reactions within the arcuate cavity may include heterogeneous immunochemistry reactions and chemical reactions having discrete steps. For example, a precipitate may form and settle in the arcuate cavity. The supernatant may thereafter be decanted.

In some embodiments, the fluids in the arcuate cavity may be optically analyzed to characterize the fluid. For example, the fluid in the arcuate cavity exposed to a light beam may generate an optical effect that may be detected and analyzed in a manner analogous to optical analysis of the set of wells. In particular, one or more of fluid density, height, and volume may be measured. Characteristics of the fluid in the arcuate cavity may be compared to fluid in the set of wells.

Conduit

Figure 6:
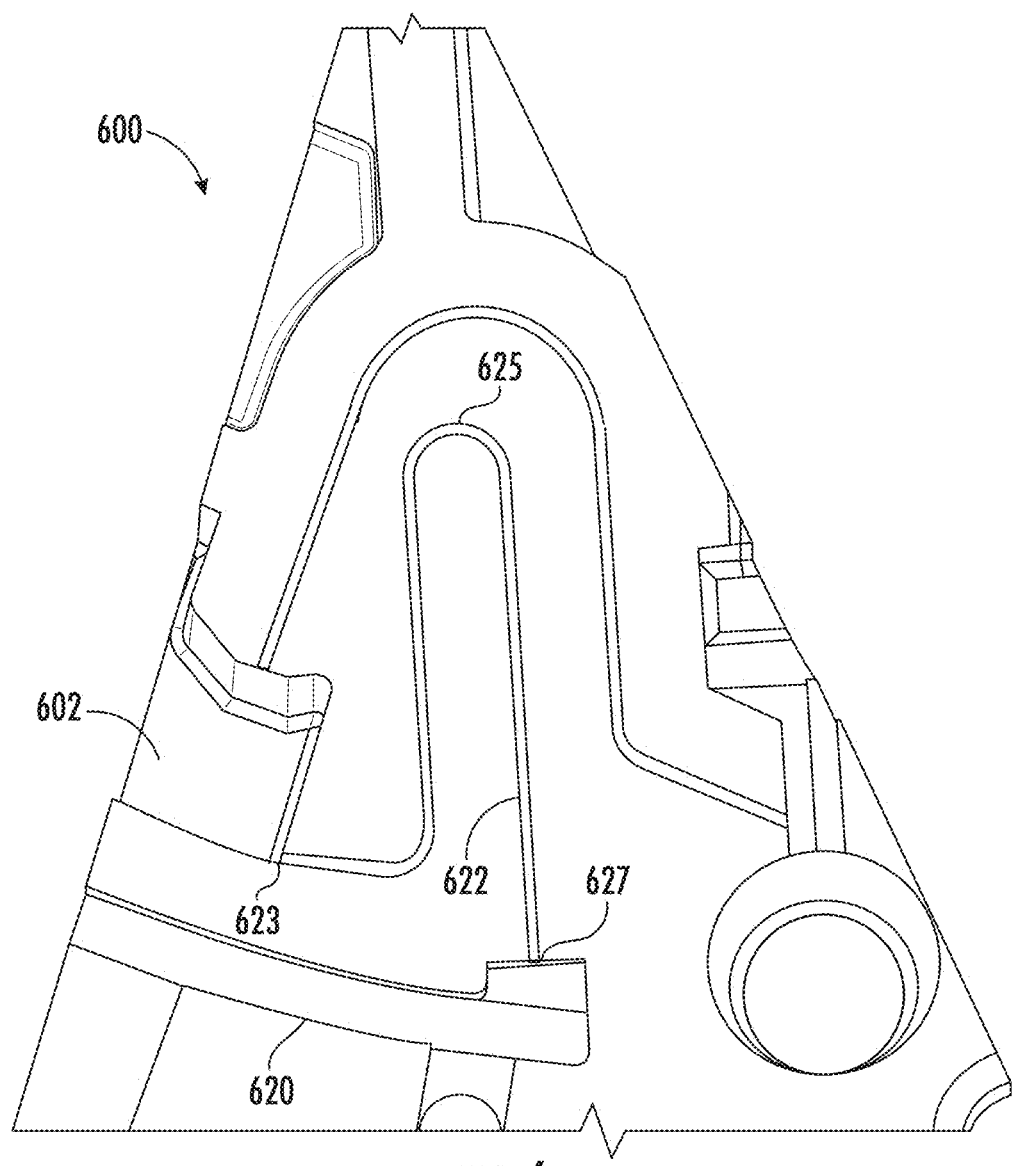
FIG. 6 is a detailed plan view of a channel of a rotor, according to embodiments.

FIG. 6 is a detailed plan view of a channel (622) of a rotor (600). The rotor (600) may define a set of channels such as a conduit (622) (e.g., siphon) including an inlet (623), U-shaped portion (625), and outlet (627). The conduit (622) may be configured to couple a sample receiving cavity to a mixing cavity. The conduit (622) may be configured to deliver a predetermined volume of fluid (e.g., plasma) through a fluid communication path (e.g., between an opening and a set of wells) when the rotor is stationary and to prevent fluid flow when the rotor is spinning. That is, one or more conduits of a rotor may be configured to deliver metered volumes of fluid to a desired cavity in the rotor.

In some embodiments, the conduit (622) may be configured such that fluid drawn into the conduit (625) through the inlet (623) does not flow through the U-shaped portion (625) (e.g., elbow) when the rotor is spinning. After the rotor stops spinning, capillary forces may draw fluid through the U-shaped portion (625). If the rotor is spun again, then centrifugal force may advance the fluid out of the outlet (627). The U-shaped portion (625) of the conduit (622) may be closer to a center of the rotor (600) (e.g., more radially inward) than the inlet (623) and outlet (627). The outlet (627) may extend closer to a periphery of the rotor (600) than the inlet (623) (e.g., more radially outward).

In some embodiments, the rotor may include at least one conduit. For example, the rotor may include three conduits configured to couple the sample receiving chamber to the mixing chamber, the metering chamber to the mixing chamber, and the mixing chamber to the channel.

Container Puncture Mechanism

Figure 7A:
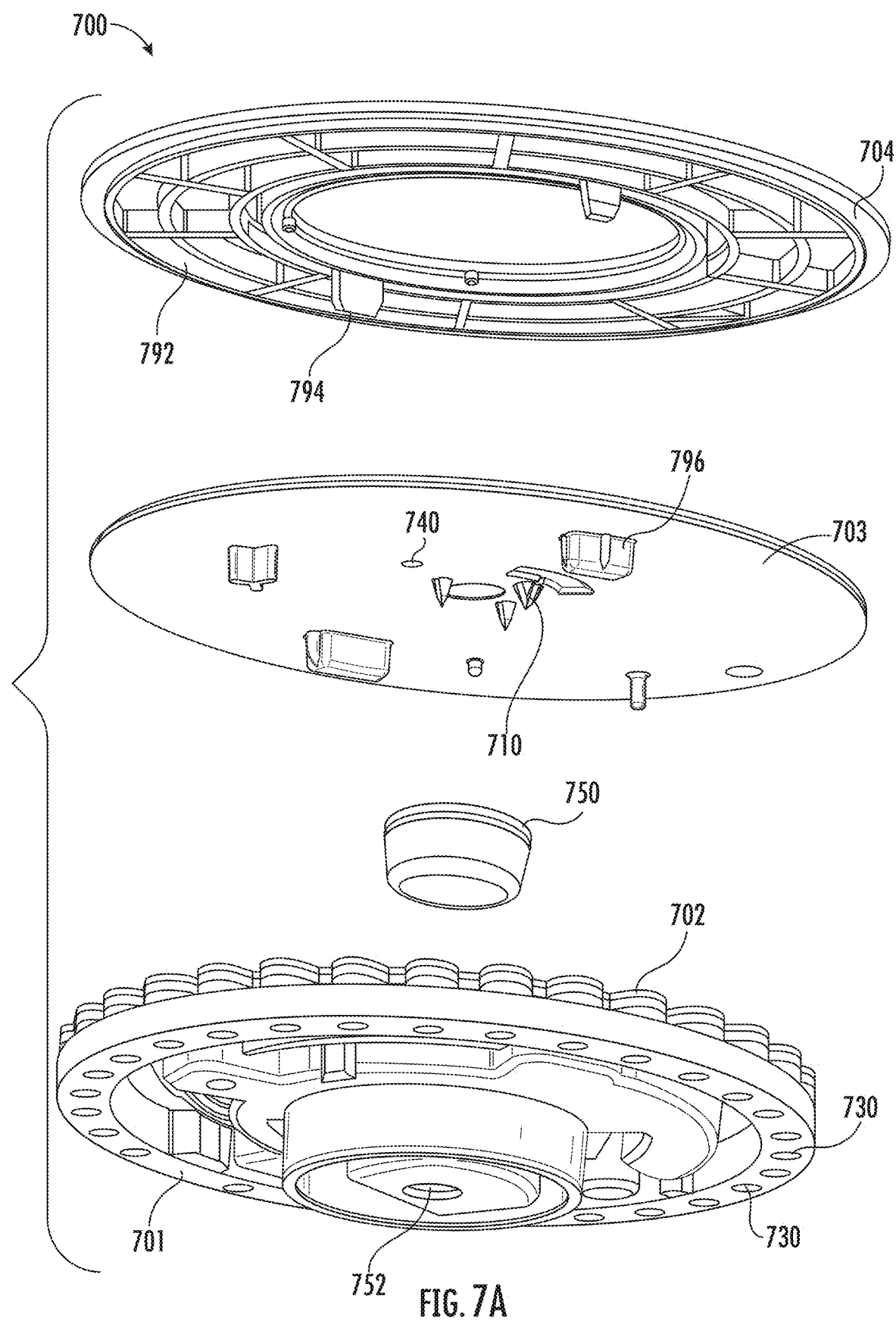
FIG. 7A is an illustrative exploded view of a rotor assembly, according to other embodiments.
Figure 7B:
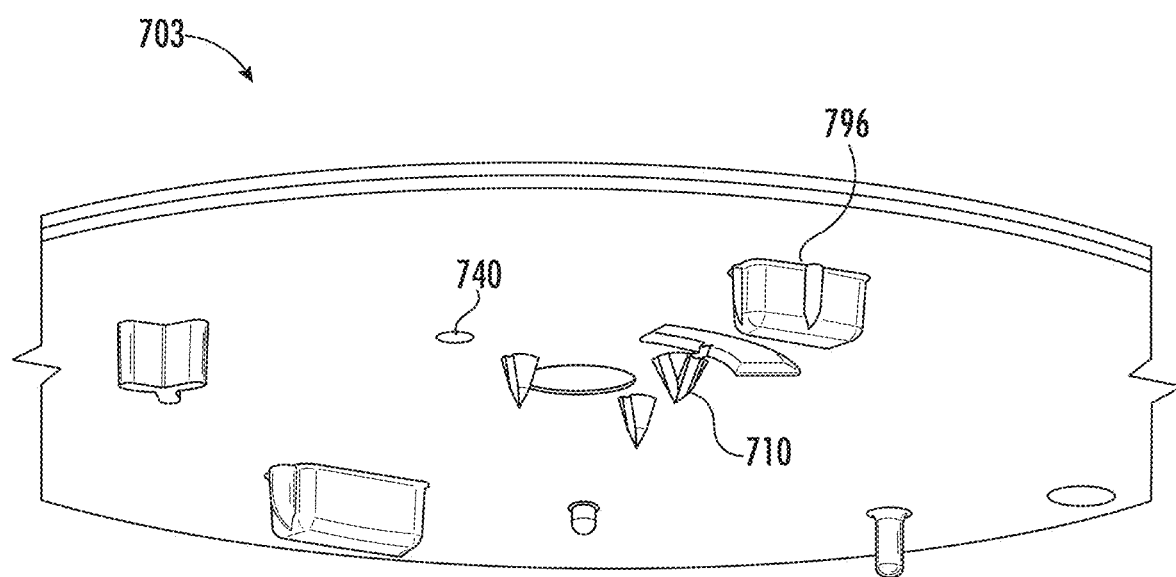
FIG. 7B is a detailed perspective view of a layer of the rotor assembly depicted in FIG. 7A.

FIG. 7A is an illustrative exploded view of a rotor assembly (700) and FIG. 7B is a detailed perspective view of a third layer (703) of the rotor assembly (700). The rotor assembly (700) may include a rotor structurally and/or functionally similar to the rotors (100, 200, 300, 400, 500, 600) as described herein. The rotor assembly (700) may include a first layer (701) coupled to a first side (e.g., underside) of a second layer (702). The first layer (701) and the second layer (702) may collectively define a set of wells (730). The rotor assembly (700) may include a third layer (703) that may be coupled to a second side (e.g., top side) of the second layer (702). The third layer (703) may define an opening (740) configured to receive a fluid such as blood. The third layer (703) may include a set of protrusions (710) extending toward the second layer (702). The set of protrusions (710) may take include any number and shape suitable for puncturing a container (750) disposed within a cavity (752) of the second layer (702) of the rotor assembly (700). The cavity (752) may define a hole (e.g., receptacle) configured to receive, for example, a spindle of a centrifuge. For example, the cavity (752) may receive a post of a spindle which may be configured to engage the container (750) and advance the container toward the set of protrusions (710) of the third layer (703). The container (750) may be sized and positioned to be held in the cavity (752) and disposed over the hole.

In some embodiments, the rotor assembly (700) may include a fourth layer (704) that may be coupled to an external surface of a third layer (703). The fourth layer (704) may include a set of protrusions (794) configured to fit within corresponding holes (796) of the third layer (703). The fourth layer (704) may define a set of openings (792) configured to allow unimpeded light transmission through the set of wells (730) and/or reduce weight.

In some embodiments, the rotor (700) may be configured to release fluid (e.g., diluent) held in a container (750) in response to the container being advanced toward the third layer (703) and away from the second layer (702). The container (750) may be held in a cavity (752) of the rotor (700). A portion of the container (750) may be sealed with a membrane (e.g., foil seal) on a first side and a rigid surface on a second side opposite the first side. In some embodiments, the membrane may be configured to be punctured by the set of protrusions (710) of the third layer (703) of the rotor assembly (700) when the container (750) is advanced toward the third layer (703) such as, for example, when the rotor (700) is mounted to a centrifuge (not shown) and a portion of the centrifuge pushes the container (750) into the protrusions (710). In some embodiments, when a rotor is placed on a spindle, the spindle contacts and pushes up on a bottom surface of the container (750).

Container

Figure 15A:
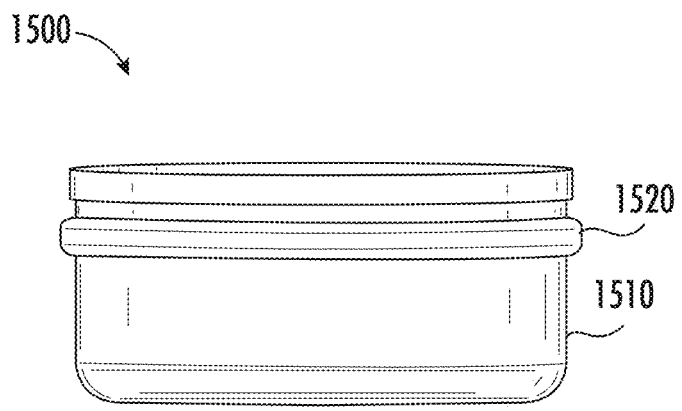
FIG. 15A is an illustrative side view of a container, according to embodiments.

In some embodiments, a container may be configured to hold diluent, form a liquid-tight seal against the cavity its disposed in, and slide within the cavity when pushed by an external force. In some embodiments, the container may be cylindrical. FIG. 15A is an illustrative side view of a container (1500) including a body (1510) and a seal (1520) (e.g., elastomeric seal). FIGS. 15D and 15E are perspective views of a rotor assembly and the container. One or more portions of a circumference of a container (1500) may include an elastomeric (e.g., rubber) seal (1520) that may be configured to engage with a wall in a cavity (1530) of rotor (1550) through an interference fit. For example, the elastomeric seal (1520) may be configured such that the container (1510) at rest remains at a fixed position within the rotor (1550) and forms a watertight seal. However, when engaged by a spindle or other protrusion, the container (1500) may be advanced upward towards a third layer (not shown) of the rotor (1550) while maintaining a seal with the rotor (1550). When the container (1500) is punctured by protrusions, the elastomeric seal (1520) may be configured to prevent liquid from flowing along the sides of the container (1500) and over a bottom surface of the cavity (1530). Thus, an elastomeric seal (1520) of a container (1500) may ensure fluid flow from the container (750) to an adjacent metering chamber without loss of fluid. The fluid within a container (1500) may flow out of the container (1500) by one or more of centrifugal force and gravity.

In some embodiments, a container (1500) may be composed of a fluid barrier material including plastics and other polymeric materials such as high density polyethylene. The container (1500) may be manufactured by one or more of molding, pressure forming, vacuum forming, and machining. For example, the container may be formed using a two-shot injection molding process. FIG. 15C is an exploded perspective view of a body (1510) and seal (1520) of the container (1500).

Figure 15B:
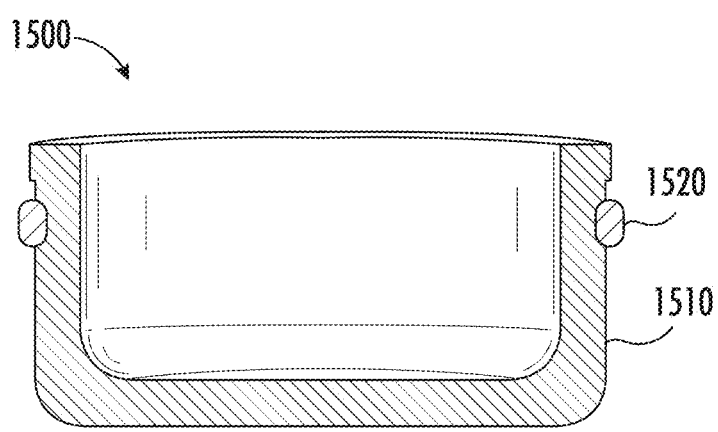
FIG. 15B is an illustrative cross-sectional view of the container depicted in FIG. 15A.
Figure 15C:
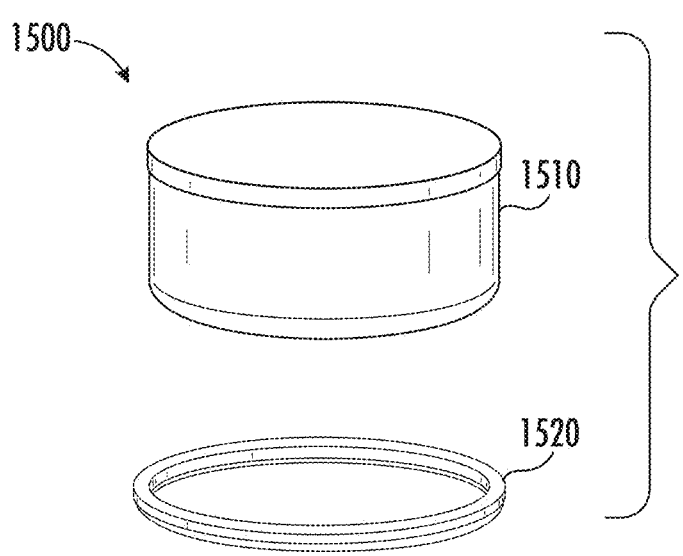
FIG. 15C is an exploded view of the container depicted in FIG. 15A.
Figure 15D:
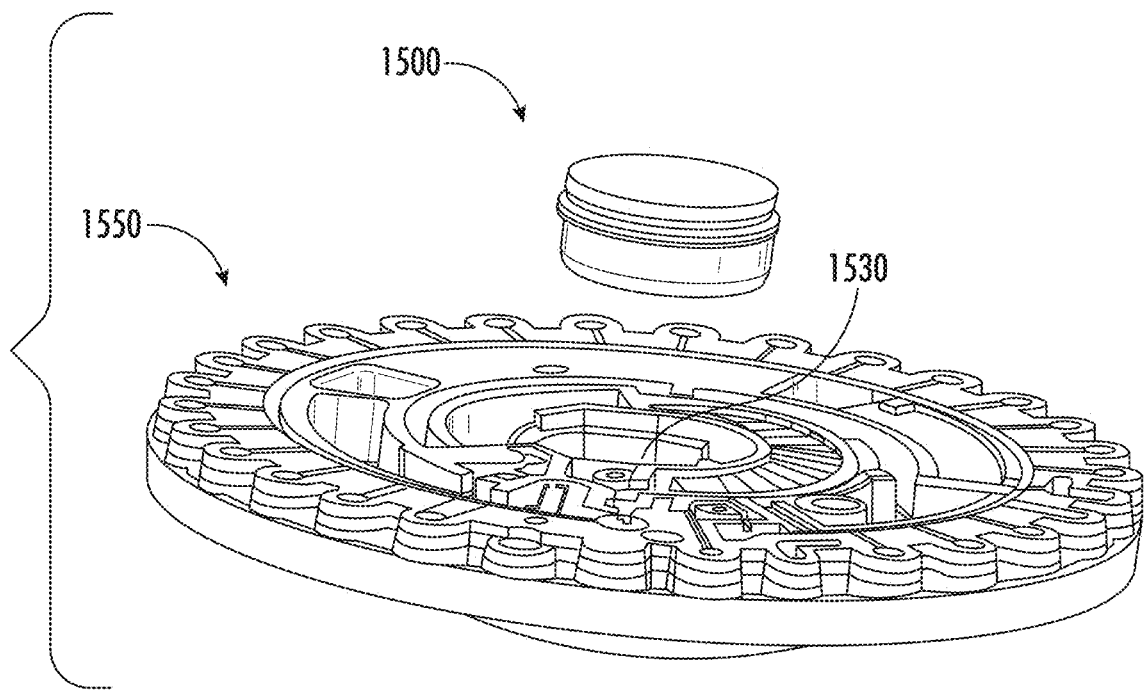
FIG. 15D is a perspective view of a rotor assembly including the container depicted in FIG. 15A.
Figure 15E:
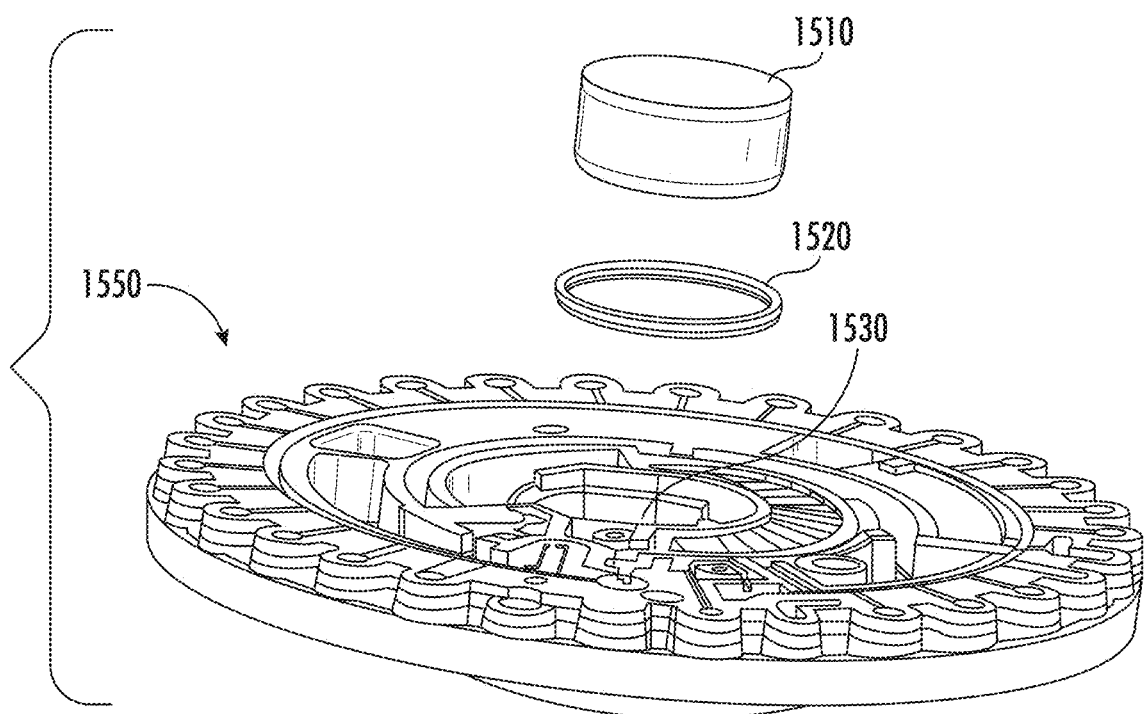
FIG. 15E is an exploded view of the rotor assembly depicted in FIG. 15D.

The container body (1510) may define one or more cavities (e.g., compartments, chambers), as shown with one cavity in FIG. 15B. Each cavity of the container (1500) may have the same or different contents. For example, a first cavity may have a fluid (e.g., diluent) while a second cavity may have a lyophilized reagent. Each cavity may contain the same or different fluid. For example, two cavities of a container (750) may be coupled to an arcuate cavity of the second layer (702) in which a set of fluids (e.g., diluent, sample, and a marker compound) are mixed.

The membrane (e.g., foil seal) may be laminated with polyethylene or another plastic. Each cavity of the container (1500) may have its own membrane. The container (1500) may be manufactured by filling the container (1500) with a predetermined volume of fluid (e.g., diluent, reagent) and closing the container (1500) by, for example, one or more of heat sealing and ultrasonic welding.

Diluent

The rotors as described herein may include a diluent to be mixed with a sample (e.g., fluid, plasma). A diluent may be disposed within the rotor as described herein with respect to a diluent container or input into an arcuate cavity of the rotor. In some embodiments, a diluent may include an isotonic concentration of a compound which does not interfere with the analysis of a sample. The diluent may include one or more of a saline solution (e.g., 0.5% NaCl in water), phosphate buffered solution, Ringer's lactate solution, tetramethylammonium acetate, inositol, marker compounds, combinations thereof, and the like. For example, a diluent may have substantially no buffer capacity at the pH of a particular assay.

Reagent

A reagent may be prepared by forming an aqueous solution that is dispensed uniformly as drops into a cryogenic liquid, and lyophilizing the frozen drops. The cryogenic liquid may be, for example, non-agitated liquid nitrogen. The reagent may include one or more of diluents, aqueous solutions, buffers, organic compounds, dehydrated chemicals, crystals, proteins, solvents, and marking compounds. Marking compounds may include a dye, fluorescent and phosphorescent substances, radioactive labelling materials, enzymes, biotin, and immunologic compounds.

In some embodiments, a reagent may have a generally spherical shape having a diameter between about 1.0 mm and about 2.3 mm and have a coefficient of weight variation less than about 3%. In some embodiments, a lyophilized reagent may include one or more of a surfactant in a concentration sufficient to inhibit bubble formation when the reagent dissolves, and a filler in a concentration sufficient to facilitate formation of a chemical lattice capable of conducting water into the reagent. For example, the surfactant may be a non-ionic detergent such as octoxynol 9 or polyoxyethylene 9 lauryl ether. The concentration of a surfactant in the reagent may be configured such that the concentration in the reconstituted reagent is between about 0.08 g and about 3.1 g per 100 ml. The chemical lattice formed by the filler may allow the reagent to quickly and completely dissolve in a sample solution or diluent. In some embodiments, a filler may include one or more of polyethylene glycol, myoinositol, polyvinylpyrrolidone, bovine serum albumin, dextran, mannitol, sodium cholate, combinations thereof, and the like. The filler may have a concentration between about 10% and about 50% by dry weight.

In some embodiments, photometrically detectable marker compounds may be configured to generate a color reaction and may include 1,1',3,3,3',3'-hexamethylindotricarbocyanine iodide and 1,1'-bis (sulfoalkyl)-3,3,3',3'-tetramethylindotricarbocyanine salts. Marker compounds may be used, for example, to determine dilution in situ and may include photometrically detectable compounds. A concentration of the marker may be photometrically determined by comparing the absorbance of the diluted sample at a predetermined wavelength to a reference solution of known concentration. The ratio of the concentrations of the marker before and after mixing with a sample may be used to calculate dilution of the sample.

Marker compounds may also include enzyme substrates such as p-nitrophenyl phosphate, glucose-6-phosphate dehydrogenase, and D-lactate. The compound p-nitrophenylphosphate is a substrate for alkaline phosphatase and may be configured to generate a colored p-nitrophenol reaction product.

It is noted that the microfluidic improvements to the rotor described herein (e.g., inlets, wells, arcuate cavity reflectors, conduit, container puncture mechanism, container, diluent, reagent, and the like) is not limited by a manufacturing process of the rotor. For example, the rotor may be ultrasonically welded and/or laser welded.

II. Systems

Fluid Analysis System

Described herein are fluid analysis systems that may include one or more of the components necessary to perform fluid analysis using the devices according to various embodiments described herein. For example, the fluid analysis systems described herein may automatically process and analyze a sample applied to a rotor device to identify and/or analyze one or more analytes. Generally, the fluid analysis systems described herein may include one or more of a rotor assembly, a radiation source, a detector, and a controller (including memory, a processor, and computer instructions). The radiation source may be configured to emit a light signal (e.g., light beam) and to illuminate a set of wells of the rotor. A detector may be configured to receive the light beam passed through the rotor. A controller coupled to the detector may be configured to receive signal data corresponding to the light beam received by the detector and generate analyte data using the signal data. One or more analytes of the fluid may be identified by the controller using the analyte data. The sample may include at least one or more of whole blood, serum, plasma, urine, sputum, semen, saliva, ocular lens fluid, cerebral fluid, spinal fluid, amniotic fluid, and tissue culture media, as well as food and industrial chemicals, combinations thereof, and the like.

Rotor Manufacturing System

Described herein are rotor manufacturing systems that may include one or more of the components necessary to manufacture the rotor devices described herein. For example, the manufacturing systems described herein may couple (e.g., attach, weld) one or more layers of a rotor assembly together. Generally, the manufacturing systems described herein may include one or more of a platform configured to hold one or more rotor components, a radiation source, a photomask, and a controller (including memory, a processor, and computer instructions). In some embodiments, the platform may be a "floating" platform configured to hold a rotor and provide precise alignment and coupling with a photomask housed in a photomask housing. The radiation source may be configured to emit a light signal (e.g., light beam) for laser welding one or more layers of a rotor assembly together. Any of the rotor devices (100, 200, 300, 400, 500, 600, 700) as described herein may be manufactured using the rotor manufacturing systems as described herein.

Platform

In some embodiments, a photomask may be aligned to a platform configured to hold a rotor for laser welding. Due to the size of microfluidic channels, the photomask and rotor need to be aligned precisely in order to properly laser weld a rotor using a photomask. To ensure consistent and proper alignment between the photomask and each rotor part to be welded, a platform may be configured to move in a plane parallel to the photomask to aid alignment of the rotor to the photomask. For example, a photomask may be held at a fixed position and the rotor base may be held on a platform (e.g., nest, stage) that may "float" relative to the photomask to aid positioning and clamping of the photomask to the rotor.

Figure 16:
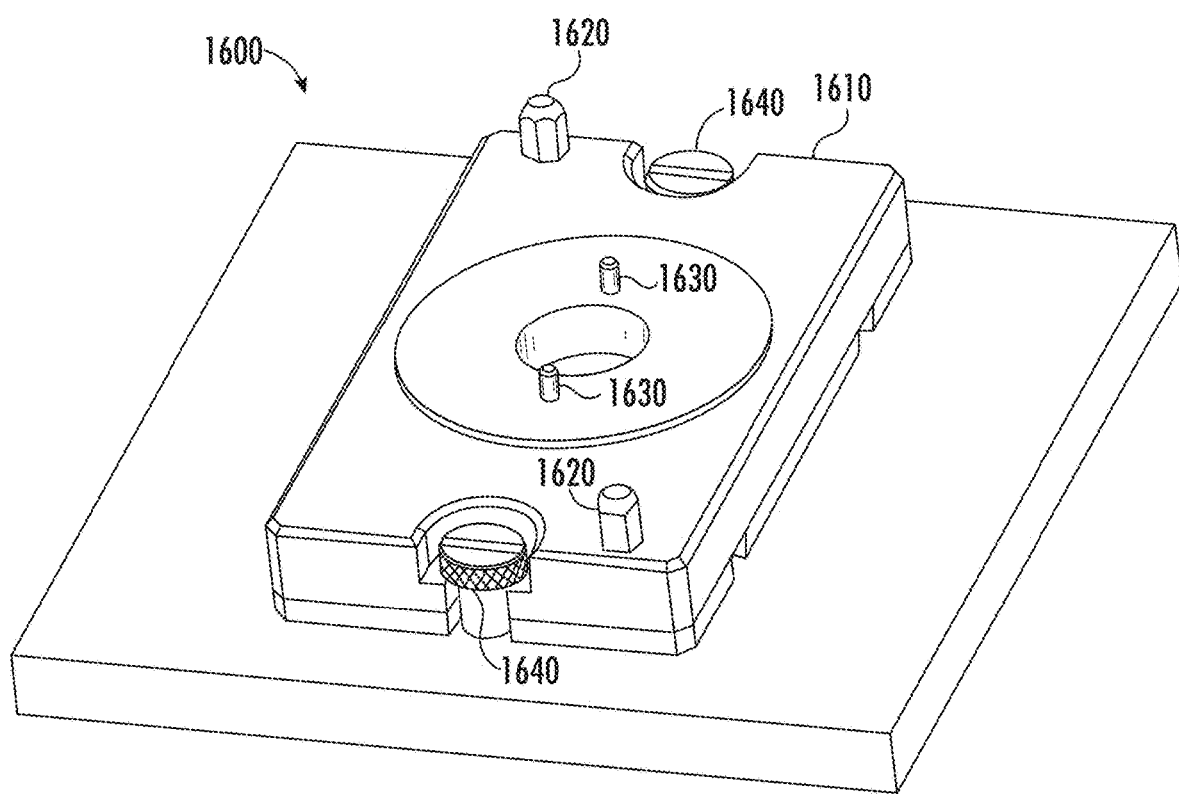
FIG. 16 is an illustrative perspective view of a weld nest, according to embodiments.
Figure 18:
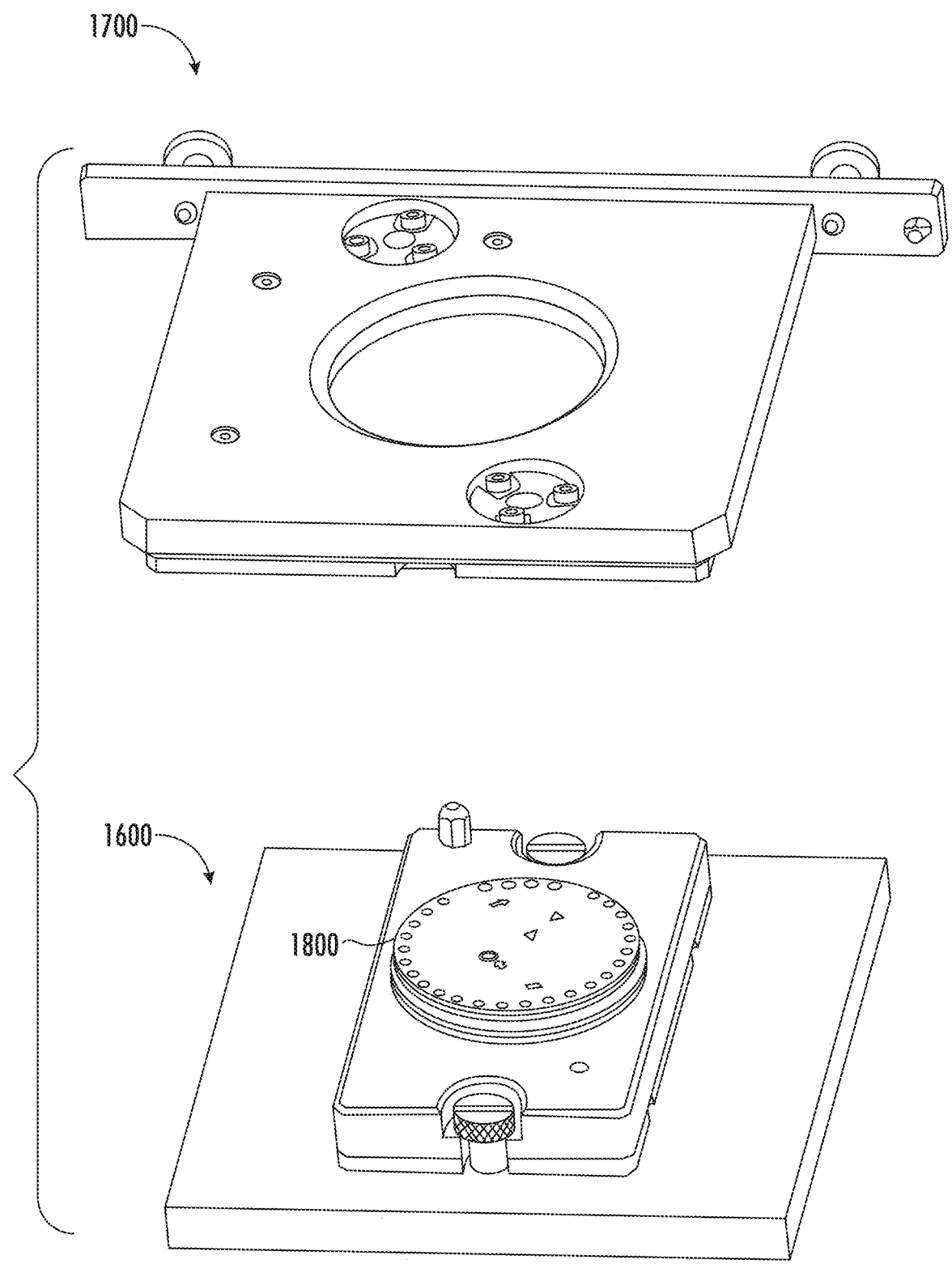
FIG. 18 is an illustrative perspective view of a rotor manufacturing system, according to embodiments.

FIG. 16 is a perspective view of a platform (1600) (e.g., "floating platform") that may include a weld nest (1610) having a first set of protrusions (1620) and a second set of protrusions (1630) disposed thereon on a side facing a photomask housing (see FIG. 18). The first set of protrusions (1620) (e.g., guide pins) may be configured to be received in corresponding holes in a photomask housing. The second set of protrusions (1630) (e.g., rotor alignment pins) may be configured to be received in corresponding holes (e.g., recesses) in a rotor (1600) such that the rotor is held on the platform (1600). The first and second set of protrusions may each include at least two protrusions. The platform may further include one or more alignment mechanisms (1640) (e.g., adjustment screws) that may be configured to move the weld nest (1610) along a plane of the platform (1600), thereby allowing the first set of protrusions (1620) to mate with a photomask coupling. The alignment mechanism (1640) may be manually operated or automatically controlled by an actuation mechanism (e.g., operated by a control device).

Figure 17:
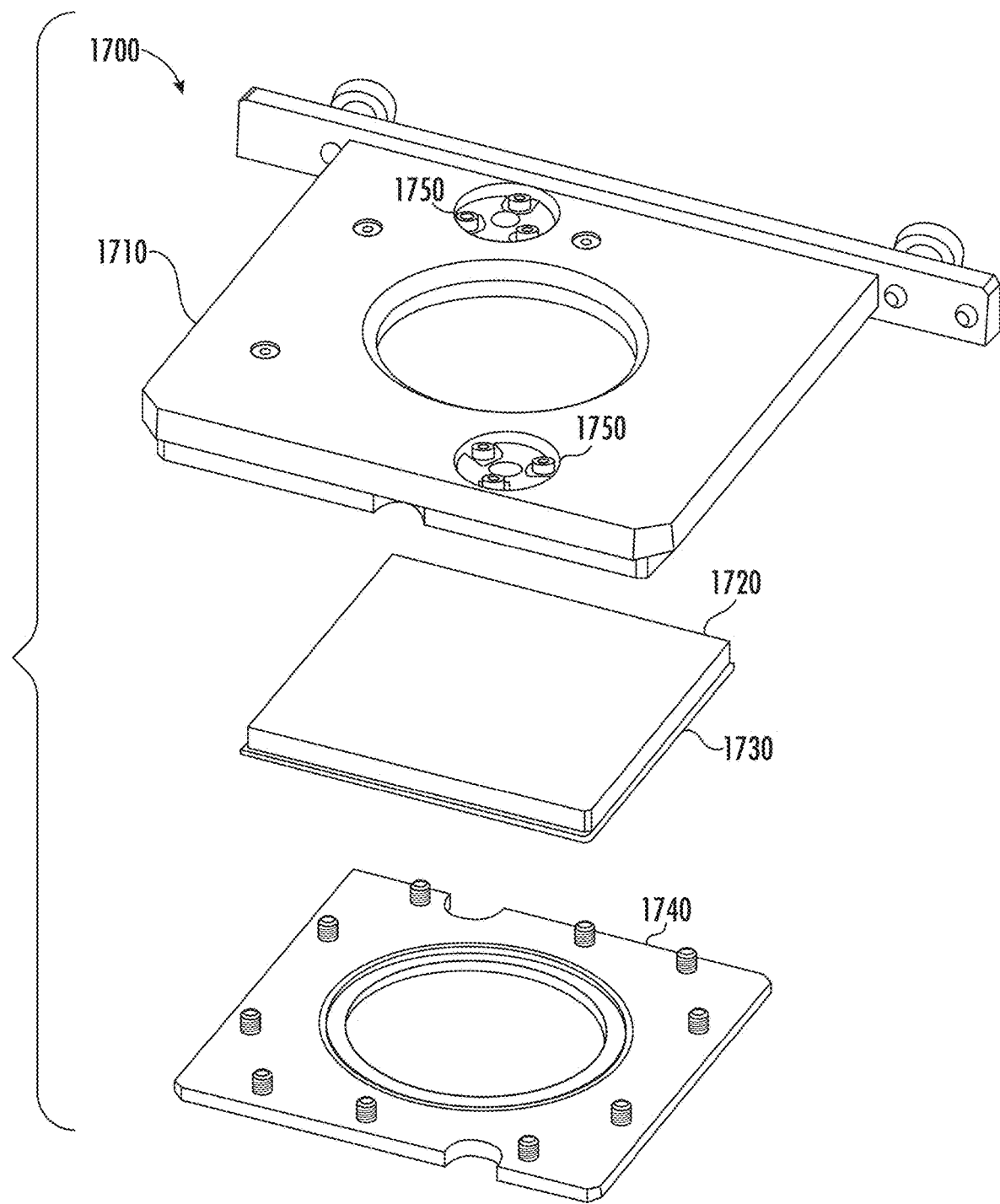
FIG. 17 is an illustrative exploded perspective view of a photomask housing, according to embodiments.

FIG. 17 is an exploded perspective view of a photomask housing (1700) including a first layer (1710) (e.g., first housing), a second layer (1720) (e.g., glass plate), a photomask (1730), and a third layer (1740) (e.g., second housing). The first layer (1710) may include a set of bushings (1750) (e.g., guide bushings) corresponding to the first set of protrusions (1620) of the platform (1600). In some embodiments, the photomask housing (1700) may be fixed relative to the platform (1600). In this configuration, the floating platform allows the bushings and protrusions (e.g., bushing guide pins, rotor alignment pins) to move relative to each other and to fit into each other such that the photomask may be releasably clamped to the rotor. FIG. 18 illustrates a rotor (1800) held on the platform (1600) and in position to be advanced toward and releasably clamped to the photomask housing (1700). The platform (1600) may be actuated along an axis perpendicular to the photomask housing (1700). In some embodiments, the photomask may be configured to block infrared radiation to one or more portions of the rotor coupled to the platform.

Rotor Inspection System

Described herein are rotor inspection systems that may include one or more of the components necessary to perform weld analysis of rotor devices according to various embodiments described herein. For example, the inspection systems described herein may optically image, process, and analyze a rotor to generate rotor data corresponding to one or more structures/structural features of the rotor. For example, the rotor data may correspond to one or more of a set of welds, structures (e.g., cavities, channels, wells), and reagents of the rotor. Generally, the inspection systems described herein may include one or more of a radiation source (e.g., illumination source), a detector, and a controller (including memory, a processor, and computer instructions). The radiation source may be configured to emit a light signal (e.g., light beam) and to illuminate one or more structures of the rotor. A detector may be configured to receive the light beam reflected by the rotor. A controller coupled to the detector may be configured to receive signal data corresponding to the light beam received by the detector and generate rotor data using the signal data. One or more structures of the rotor may be identified and characterized using the rotor data. For example, a rotor exceeding a predetermined number of low-quality welds may be marked as rejected by the rotor inspection system. As another example, a rotor having a predetermined number of broken lyophilized reagent spheres may be flagged for manual inspection. Any of the rotor devices (100, 200, 300, 400, 500, 600, 700) as described herein may be inspected using the rotor inspection systems as described herein.

Rotor Assembly

Any of the centrifugal rotors (100, 200, 300, 400, 500, 600, 700) as described herein may be used with the fluid analysis systems as described herein. In some embodiments, a rotor may include a fourth layer to aid in handling, processing, and identification of a sample applied to the rotor. The fourth layer holding the rotor may be placed by a user into a fluid analysis system for automated processing of the sample. The fourth layer may be useful in providing physical support and protection to the rotor. For example, the fourth layer may form a seal around an opening of the rotor. In some embodiments, the rotor case may include one or more identifiers such as a barcode, QR code, and one or more fiducials (e.g., colored/opaque points, ruler, slits, landmarks, markers), combinations thereof, and the like.

Radiation Source

The fluid analysis systems as described herein may include a radiation source configured to emit a first light signal (e.g., illumination) directed at the centrifugal rotor. The radiation source may be configured to generate the light beam in the UV, visible, and/or near-IR wavelengths. A detector as described herein may be configured to receive a second light beam from the centrifugal rotor. The second light signal may be generated in response to the illumination of the microfluidic channel using the first light signal. The second light signal may be used to generate analyte data for analysis. In some embodiments, the radiation source may include one or more of a light emitting diode, laser, microscope, optical sensor, lens, and flash lamp. For example, the radiation source may generate light that may be carried by fiber optic cables or one or more LEDs may be configured to provide illumination. In another example, a fiberscope including a bundle of flexible optical fibers may be configured to receive and propagate light from an external light source.

Detector

Generally, the fluid analysis systems described herein may include a detector used to receive light signals (e.g., light beams) that pass through a sample within a well of a centrifugal rotor. The received light may be used to generate signal data that may be processed by a processor and memory to generate analyte data. The detector may be disposed on a side of the centrifugal rotor opposite that of a radiation source such that the detector receives a light beam (e.g., second light signal) from the radiation source that has passed through one or more wells of the centrifugal rotor. The detector may further be configured to image one or more identifiers (e.g., barcode) and identifiers of the centrifugal rotor. In some embodiments, the detector may include one or more of a lens, camera, and measurement optics. For example, the detector may include an optical sensor (e.g., a charged coupled device (CCD) or complementary metal-oxide semiconductor (CMOS) optical sensor) and may be configured to generate an image signal that is transmitted to a display. For example, the detector may include a camera with an image sensor (e.g., a CMOS or CCD array with or without a color filter array and associated processing circuitry).

Control Device

The fluid analysis systems, rotor manufacturing systems, and rotor inspection systems as described herein may couple to one or more control devices (e.g., computer systems) and/or networks. FIG. 8B is a block diagram of the control device (820). The control device (820) may include a controller (822) having a processor (824) and a memory (826). In some embodiments, the control device (820) may further include a communication interface (830). The controller (822) may be coupled to the communication interface (830) to permit a user to remotely control the control device (820), radiation source (810), centrifugal rotor assembly (812), detector (814), and any other component of the system (800). The communication interface (830) may include a network interface (832) configured to connect the control device (820) to another system (e.g., Internet, remote server, database) over a wired and/or wireless network. The communication interface (830) may further include a user interface (834) configured to permit a user to directly control the control device (820).

Controller

Generally, the fluid analysis systems described herein may include a centrifugal rotor and corresponding control device coupled to a radiation source and detector. In some embodiments, a detector may be configured to generate signal data. The signal data may be received by a controller and used to generate analyte data corresponding to one or more analytes of a sample. The control device may accordingly identify and/or characterize one or more analytes of a sample. As described in more detail herein, the controller (822) may be coupled to one or more networks using a network interface (832). The controller (822) may include a processor (824) and memory (826) coupled to a communication interface (830) including a user interface (834). The controller (822) may automatically perform one or more steps of centrifugal rotor identification, processing, image analysis, and analyte analysis, and thus improve one or more of specificity, sensitivity, and speed of fluid analysis.

The controller (822) may include computer instructions for operation thereon to cause the processor (824) to perform one or more of the steps described herein. In some embodiments, the computer instructions may be configured to cause the processor to receive signal data from the detector, generate analyte data using the signal data, and identify one or more analytes of the fluid using the analyte data. In some embodiments, the computer instructions may be configured to cause the controller to set imaging data parameters. The computer instructions may be configured to cause the controller to generate the analyte data. Signal data and analysis may be saved for each well of each centrifugal rotor.

A control device (820), as depicted in FIG. 8B, may include a controller (822) in communication with the fluid analysis system (800) (e.g., radiation source (810), centrifugal rotor assembly (812), and detector (814)). The controller (822) may include one or more processors (824) and one or more machine-readable memories (826) in communication with the one or more processors (824). The processor (824) may incorporate data received from memory (826) and user input to control the system (800). The memory (826) may further store instructions to cause the processor (824) to execute modules, processes, and/or functions associated with the system (800). The controller (822) may be connected to and control one or more of a radiation source (810), centrifugal rotor assembly (812), detector (814), communication interface (830), and the like by wired and/or wireless communication channels.

The controller (822) may be implemented consistent with numerous general purpose or special purpose computing systems or configurations. Various example computing systems, environments, and/or configurations that may be suitable for use with the systems and devices disclosed herein may include, but are not limited to software or other components within or embodied on a server or server computing devices such as routing/connectivity components, multiprocessor systems, microprocessor-based systems, distributed computing networks, personal computing devices, network appliances, portable (e.g., hand-held) or laptop devices. Examples of portable computing devices include smartphones, personal digital assistants (PDAs), cell phones, tablet PCs, wearable computers taking the form of smartwatches and the like, and portable or wearable augmented reality devices that interface with the patient's environment through sensors and may use head-mounted displays for visualization, eye gaze tracking, and user input.

Processor

The processor (824) may be any suitable processing device configured to run and/or execute a set of instructions or code and may include one or more data processors, image processors, graphics processing units, physics processing units, digital signal processors, and/or central processing units. The processor (824) may be, for example, a general purpose processor, Field Programmable Gate Array (FPGA), an Application Specific Integrated Circuit (ASIC), combinations thereof, and the like. The processor (824) may be configured to run and/or execute application processes and/or or other modules, processes and/or functions associated with the system and/or a network associated therewith. The underlying device technologies may be provided in a variety of component types including metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, combinations thereof, and the like.

Memory

In some embodiments, the memory (826) may include a database (not shown) and may be, for example, a random access memory (RAM), a memory buffer, a hard drive, an erasable programmable read-only memory (EPROM), an electrically erasable read-only memory (EEPROM), a read-only memory (ROM), Flash memory, combinations thereof, and the like. As used herein, database refers to a data storage resource. The memory (826) may store instructions to cause the processor (824) to execute modules, processes, and/or functions associated with the control device (820), such as calibration, indexing, centrifugal rotor signal processing, image analysis, analyte analysis, notification, communication, authentication, user settings, combinations thereof, and the like. In some embodiments, storage may be network-based and accessible for one or more authorized users. Network-based storage may be referred to as remote data storage or cloud data storage. Signal data and analysis stored in cloud data storage (e.g., database) may be accessible to authorized users via a network, such as the Internet. In some embodiments, database (840) may be a cloud-based FPGA.

Some embodiments described herein relate to a computer storage product with a non-transitory computer-readable medium (also may be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also may be referred to as code or algorithm) may be those designed and constructed for a specific purpose or purposes.

Examples of non-transitory computer-readable media include, but are not limited to, magnetic storage media such as hard disks, floppy disks, and magnetic tape; optical storage media such as Compact Disc/Digital Video Discs (CD/DVDs); Compact Disc-Read Only Memories (CD-ROMs); holographic devices; magneto-optical storage media such as optical disks; solid state storage devices such as a solid state drive (SSD) and a solid state hybrid drive (SSHD); carrier wave signal processing modules; and hardware devices that are specially configured to store and execute program code, such as Application-Specific Integrated Circuits (ASICs), Programmable Logic Devices (PLDs), Read-Only Memory (ROM), and Random-Access Memory (RAM) devices. Other embodiments described herein relate to a computer program product, which may include, for example, the instructions and/or computer code disclosed herein.

The systems, devices, and methods described herein may be performed by software (executed on hardware), hardware, or a combination thereof. Hardware modules may include, for example, a general-purpose processor (or microprocessor or microcontroller), a field programmable gate array (FPGA), an application specific integrated circuit (ASIC), combinations thereof, and the like. Software modules (executed on hardware) may be expressed in a variety of software languages (e.g., computer code), including C, C++, Java®, Python, Ruby, Visual Basic®, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Communication Interface

The communication interface (830) may permit a user to interact with and/or control the system (800) directly and/or remotely. For example, a user interface (834) of the system (800) may include an input device for a user to input commands and an output device for a user and/or other users (e.g., technicians) to receive output (e.g., view sample data on a display device) related to operation of the system (800). In some embodiments, a network interface (832) may permit the control device (820) to communicate with one or more of a network (870) (e.g., Internet), remote server (850), and database (840) as described in more detail herein.

User Interface

User interface (834) may serve as a communication interface between a user (e.g., operator) and the control device (820). In some embodiments, the user interface (834) may include an input device and output device (e.g., touch screen and display) and be configured to receive input data and output data from one or more sensors, input device, output device, network (870), database (840), and server (850). For example, signal data generated by a detector may be processed by processor (824) and memory (826), and output visually by one or more output devices (e.g., display). Signal data, image data, and/or analyte data may be received by user interface (834) and output visually, audibly, and/or through haptic feedback through one or more output devices. As another example, user control of an input device (e.g., joystick, keyboard, touch screen) may be received by user interface (834) and then processed by processor (824) and memory (826) for user interface (834) to output a control signal to one or more components of the fluid analysis system (800). In some embodiments, the user interface (834) may function as both an input and output device (e.g., a handheld controller configured to generate a control signal while also providing haptic feedback to a user).

Output Device

An output device of a user interface (834) may output image data and/or analyte data corresponding to a sample and/or system (800), and may include one or more of a display device, audio device, and haptic device. The display device may be configured to display a graphical user interface (GUI). The user console (860) may include an integrated display and/or video output that may be connected to output to one or more generic displays, including remote displays accessible via the internet or network. The output data may also be encrypted to ensure privacy and all or portions of the output data may be saved to a server or electronic healthcare record system. A display device may permit a user to view signal data, calibration data, functionalization data, image data, analyte data, system data, fluid data, patient data, and/or other data processed by the controller (822). In some embodiments, an output device may include a display device including at least one of a light emitting diode (LED), liquid crystal display (LCD), electroluminescent display (ELD), plasma display panel (PDP), thin film transistor (TFT), organic light emitting diodes (OLED), electronic paper/e-ink display, laser display, holographic display, combinations thereof, and the like.

An audio device may audibly output patient data, fluid data, image data, analyte data, system data, alarms and/or warnings. For example, the audio device may output an audible warning when improper insertion of the centrifugal rotor into the centrifugal rotor assembly occurs. In some embodiments, an audio device may include at least one of a speaker, piezoelectric audio device, magnetostrictive speaker, and/or digital speaker. In some embodiments, a user may communicate with other users using the audio device and a communication channel.

A haptic device may be incorporated into one or more of the input and output devices to provide additional sensory output (e.g., force feedback) to the user. For example, a haptic device may generate a tactile response (e.g., vibration) to confirm user input to an input device (e.g., joystick, keyboard, touch surface). In some embodiments, the haptic device may include a vibrational motor configured to provide haptic tactile feedback to a user. Haptic feedback may in some embodiments confirm initiation and completion of centrifugal rotor processing. Additionally or alternatively, haptic feedback may notify a user of an error such as improper placement and/or insertion of the centrifugal rotor into a centrifugal rotor assembly. This may prevent potential harm to the system.

Input Device

Some embodiments of an input device may include at least one switch configured to generate a control signal. For example, the input device may be configured to control movement of the centrifugal rotor assembly. In some embodiments, the input device may include a wired and/or wireless transmitter configured to transmit a control signal to a wired and/or wireless receiver of a controller (822). For example, an input device may include a touch surface for a user to provide input (e.g., finger contact to the touch surface) corresponding to a control signal. An input device including a touch surface may be configured to detect contact and movement on the touch surface using any of a plurality of touch sensitivity technologies including capacitive, resistive, infrared, optical imaging, dispersive signal, acoustic pulse recognition, and surface acoustic wave technologies. In embodiments of an input device including at least one switch, a switch may include, for example, at least one of a button (e.g., hard key, soft key), touch surface, keyboard, analog stick (e.g., joystick), directional pad, pointing device (e.g., mouse), trackball, jog dial, step switch, rocker switch, pointer device (e.g., stylus), motion sensor, image sensor, and microphone. A motion sensor may receive user movement data from an optical sensor and classify a user gesture as a control signal. A microphone may receive audio and recognize a user voice as a control signal.

Network Interface

Figure 8A:
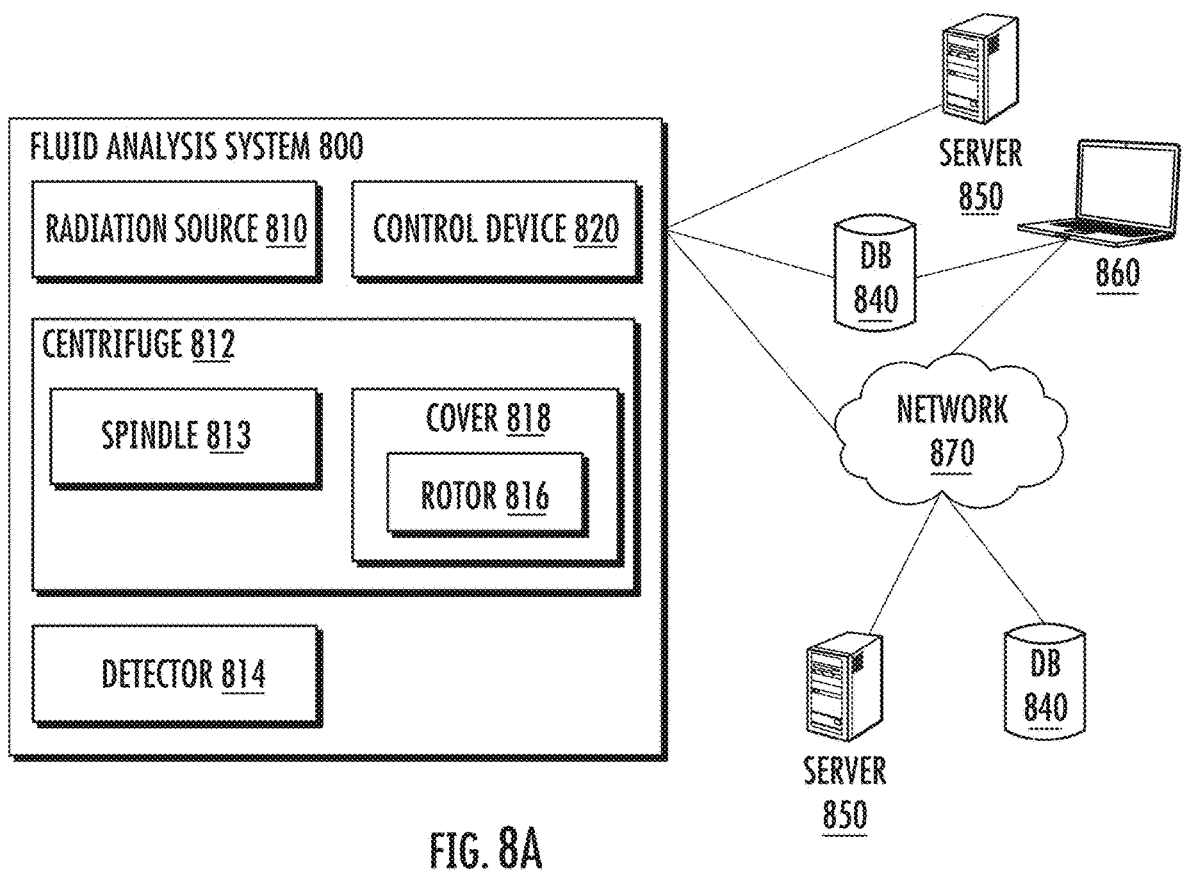
FIG. 8A is a block diagram of a fluid analysis system, according to other embodiments.
Figure 8B:
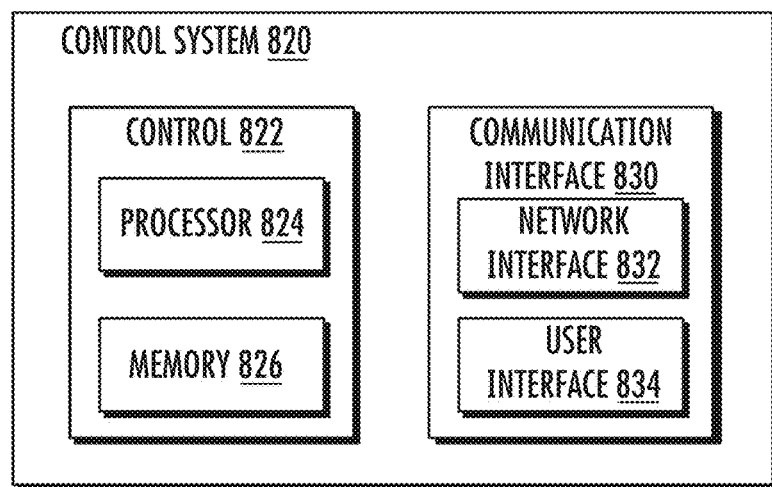
FIG. 8B is a block diagram of a control system of the fluid analysis system depicted in FIG. 8A.

As depicted in FIG. 8A, a control device (820) described herein may communicate with one or more networks (870) and computer systems (850) through a network interface (832). In some embodiments, the control device (820) may be in communication with other devices via one or more wired and/or wireless networks. The network interface (832) may facilitate communication with other devices over one or more external ports (e.g., Universal Serial Bus (USB), multi-pin connector) configured to couple directly to other devices or indirectly over a network (e.g., the Internet, wireless LAN).

In some embodiments, the network interface (832) may include a radiofrequency receiver, transmitter, and/or optical (e.g., infrared) receiver and transmitter configured to communicate with one or more devices and/or networks. The network interface (832) may communicate by wires and/or wirelessly with one or more of the sensors, user interface (834), network (870), database (840), and server (850).

In some embodiments, the network interface (832) may include radiofrequency (RF) circuitry (e.g., RF transceiver) including one or more of a receiver, transmitter, and/or optical (e.g., infrared) receiver and transmitter configured to communicate with one or more devices and/or networks. RF circuitry may receive and transmit RF signals (e.g., electromagnetic signals). The RF circuitry converts electrical signals to/from electromagnetic signals and communicates with communications networks and other communications devices via the electromagnetic signals. The RF circuitry may include one or more of an antenna system, an RF transceiver, one or more amplifiers, a tuner, one or more oscillators, a digital signal processor, a CODEC chipset, a subscriber identity module (SIM) card, memory, and the like. A wireless network may refer to any type of digital network that is not connected by cables of any kind.

Examples of wireless communication in a wireless network include, but are not limited to cellular, radio, satellite, and microwave communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, near-field communication (NFC), radio-frequency identification (RFID), Wireless Fidelity (Wi-Fi) (e.g., IEEE 802.11a, IEEE 802.11b, IEEE 802.11g, IEEE 802.11n), Voice over Internet Protocol (VoIP), Wi-MAX, a protocol for email (e.g., Internet Message Access Protocol (IMAP), Post Office Protocol (POP)), instant messaging (e.g., eXtensible Messaging and Presence Protocol (XMPP), Session Initiation Protocol for Instant Messaging, Presence Leveraging Extensions (SIMPLE), Instant Messaging and Presence Service (IMPS)), Short Message Service (SMS), or any other suitable communication protocol. Some wireless network deployments combine networks from multiple cellular networks or use a mix of cellular, Wi-Fi, and satellite communication.

In some embodiments, a wireless network may connect to a wired network in order to interface with the Internet, other carrier voice and data networks, business networks, and personal networks. A wired network is typically carried over copper twisted pair, coaxial cable, and/or fiber optic cables. There are many different types of wired networks including wide area networks (WAN), metropolitan area networks (MAN), local area networks (LAN), Internet area networks (IAN), campus area networks (CAN), global area networks (GAN), like the Internet, wireless personal area networks (PAN) (e.g., Bluetooth, Bluetooth Low Energy), and virtual private networks (VPN). As used herein, network refers to any combination of wireless, wired, public, and private data networks that are typically interconnected through the Internet, to provide a unified networking and information access system.

III. Methods

Described herein are embodiments corresponding to methods of using a rotor for analyzing a fluid such as whole blood, manufacturing a rotor, and inspecting a rotor. These methods may identify and/or characterize a sample and in some embodiments, may be used with the systems and devices described. For example, a fluid analysis system may analyze and characterize a blood sample placed on a rotor and identify one or more analytes. Generally, a biological sample may be input to a rotor, and the rotor placed into a fluid analysis system. The system may then spin the rotor by centrifugal force such that the sample is distributed into a set of wells. The set of wells may be optically analyzed by the system and further analysis may be performed to characterize the sample.

Some conventional rotors manufactured using ultrasonic welding techniques may generate reagent dust that may contribute to undesirable reagent contamination between cuvettes of the rotor. For example, when portions of a rotor are ultrasonically welded, a reagent bead within a cuvette may ultrasonically vibrate and generate reagent dust. In some cases, reagent dust may migrate out of a cuvette into a channel or other cavity of the rotor. By contrast, methods of manufacturing as described herein may weld a plurality of rotor layers to form a rotor device address these deficiencies and that may be used with the fluid analysis system. An inspection method may characterize one or more aspects of the rotor and allow the rotor to be classified, such as based on manufacturing quality.

Fluid Analysis

Figure 9:
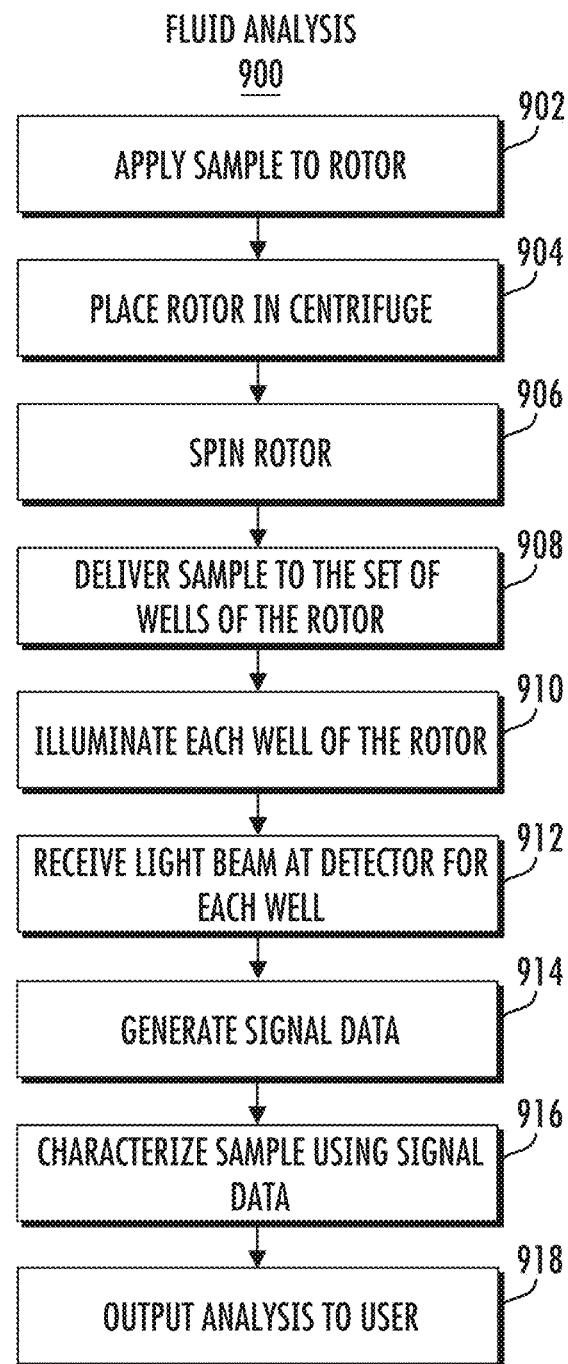
FIG. 9 is an illustrative flowchart of a method of using a rotor, according to embodiments.

Methods for analyzing a fluid in some embodiments may use a fluid analysis system and/or rotor as described herein. The methods described herein may quickly and easily identify analytes from a sample based on optical analysis techniques. FIG. 9 is a flowchart that generally illustrates a method of analyzing a fluid (900). A rotor structurally and/or functionally similar to the rotors (100, 200, 300, 400, 500, 600, 700) as described herein may be used in one or more of the fluid analysis steps described herein. The process may include, at step 902, applying a sample to a rotor. In some embodiments, the sample may include a blood sample from a subject such as a human or animal. For example, the blood sample may be taken from a vein or from a finger stick. A volume of the sample/fluid may be, for example, between about 40 microliters and about 100 microliters. In some embodiments, the rotor may be packaged in an impermeable foil pouch, and may further include a package of desiccant. Desiccant may minimize the impact of moisture on a reagent disposed within the rotor. The sample may be input into a sample port or opening of the rotor.

At step 904, the rotor having the sample may be placed (e.g., inserted) into a fluid analysis system. For example, the rotor may be configured to be mounted on a centrifuge of the fluid analysis system (800). The rotor may include a receptacle or other coupling mechanism suitable for mounting, for example, on a vertical drive shaft of the centrifuge. For example, the rotor may be placed onto a sliding platform configured to retract into the fluid analysis system and to allow a spindle (e.g., shaft) to releasably engage with the rotor. In some embodiments, the spindle may engage a slidable diluent container within a cavity of the rotor such that the container may be configured to open and direct diluent from the container into other cavities of the rotor for mixing with the sample. For example, a container disposed within the rotor may be pushed upward by a shaft towards a set of protrusions configured to puncture the container.

At step 906, the rotor may spin at one or more predetermined rates using the centrifuge. In embodiments where the sample includes blood, the blood cells may be separated from the diluted plasma by centrifugal force at step 906. In other embodiments, separation of blood cells from plasma may occur before dilution. In some embodiments, the sample may mix with the diluent to form a substantially homogenous mixture. For example, the rotor (100) illustrated in FIG. 1A may be spun at a suitable RPM such as, for example, at about 1,000 RPMs, at about 2,000 RPMs, at about 3,000 RPMs, at about 4,000 RPMs, at about 5,000 RPMs, at about 6,000 RPMs, including all values and sub-ranges in-between.

As the rotor spins, a sample may exit the arcuate cavity (110) while diluent enters into metering chamber (112). The sample may begin to fill the well (152) (e.g., red blood cell well) as the diluent flows from the metering chamber (112) to the mix chamber (114). The centrifugal force of the spinning rotor prevents liquid from passing a U-shaped portion of one or more conduits. When the rotor is at rest (e.g., not spinning), capillary forces allow the sample (e.g., plasma) to flow through one or more conduits. One or more spin cycles may be used to deliver and mix the sample and diluent in the mix chamber (114) as well deliver the mixed diluent and sample into the channel (120) for distribution into the set of wells (130).

After separation and mixing, at step 908, the sample fluid may be distributed through the internal channels of the rotor into a set of wells through centrifugal force. In some embodiments, the set of wells may include a set of assay wells, each well including one more reagents (e.g., lyophilized reagent, reagent beads), and a set of reference wells. Chemical reactions may occur between the fluid and reagent in the assay wells while plasma may enter the set of reference wells without undergoing a reaction with a reagent.

The fluid within the set of wells may be optically analyzed while the rotor spins. For example, the chemical reactions occurring in the assay wells may be photometrically analyzed. At step 910, a radiation source (e.g., light source, illumination source) may be used to direct a light beam through one or more of the wells of the rotor. The radiation source may include an arc lamp and/or other high intensity light source including a pulsed laser, wavelength tunable sources, combinations thereof, and the like. For example, an arc lamp may discharge approximately 0.1 joules of energy during a flash of approximately 5 microseconds in duration. The fluid within the set of wells may partially absorb the light beam received from the radiation source. The degree to which the light is absorbed may depend on the wavelength of the light beam and the contents of the well being analyzed. In some embodiments, the radiation source may be activated based on a light signal received from a reflector of the rotor. For example, a reflector may receive a light beam emitted in a plane of the rotor, which may be redirected perpendicularly toward a detector. The detector may receive the light beam and a control device may process the signal data to control the radiation source to emit a light beam at a predetermined time through a well of the rotor.

At step 912, a detector (e.g., optical sensor) may be used to receive the light passed through one or more wells of the rotor. In some embodiments, the detector may be coupled to one or more optical components including one or more of a beam splitter, interference filter, and photodetector. The optical components may form an optical detection pathway (not shown). The detector at step 914 may be configured to generate signal data for one or more of the wells. At step 916, the signal data may be processed by the control device to characterize (e.g., quantify) one or more analytes of the sample. In some embodiments, a plurality of tests may be performed (e.g., up to 50 different tests). For example, analysis may include an endpoint test and a rate test. Additionally or alternatively, immunoassays and other specific binding assays may be performed in the test wells. Generally, however, such assay procedures are homogeneous. In some cases, heterogeneous assay systems may be used when blood is separated from plasma in the test wells after an immunological reaction step has occurred. Blood assays may include one or more of glucose, lactate dehydrogenase, serum glutamicoxaloacetic transaminase (SGOT), serum glutamic-pyruvic transaminase (SGPT), blood urea (nitrogen) (BUN), total protein, alkalinity, phosphatase, bilirubin, calcium, and chloride. Some of these assays may use blood plasma combined with one or more reagents to generate a visually detectable (e.g., photometrically detectable) change in the plasma. At step 918, the analysis performed may be output by the fluid analysis system.

Rotor Manufacturing

Also described herein are embodiments corresponding to methods for manufacturing a rotor that may be used in some embodiments with the fluid analysis system embodiments as described herein. A rotor structurally and/or functionally similar to the rotors (100, 200, 300, 400, 500, 600, 700) as described herein may be manufactured using one or more of the manufacturing steps described herein. For example, the methods described here may manufacture a rotor device using injection molding and laser welding techniques. The rotors manufactured using these methods may have numerous benefits, such as rotors having a reduced risk of reagent contamination (e.g., generation of bead dust within a well) as well as improvements to one or more of quality, consistency, throughput, and manufacturing automation.

Generally, the methods described herein include forming and bonding a set of layers of a rotor. For example, a base of the rotor may include a first layer and a second layer that are bonded together such as through a two-shot injection molding process. The first layer may be substantially transparent. The second layer may be substantially absorbent to infrared radiation. The first layer and the second layer may define a set of wells. Furthermore, the second layer may define a set of channels and cavities as described in more detail herein. The rotor may include a third layer aligned to the base. The third layer may define an opening configured to receive a fluid where the third layer may be substantially transparent. The base may be bonded (e.g., welded) to the third layer using infrared radiation such that the channel establishes a fluid communication path between the opening and the set of wells. In some embodiments, one or more additional layers may be formed and bonded to the third layer.

Figure 10A:
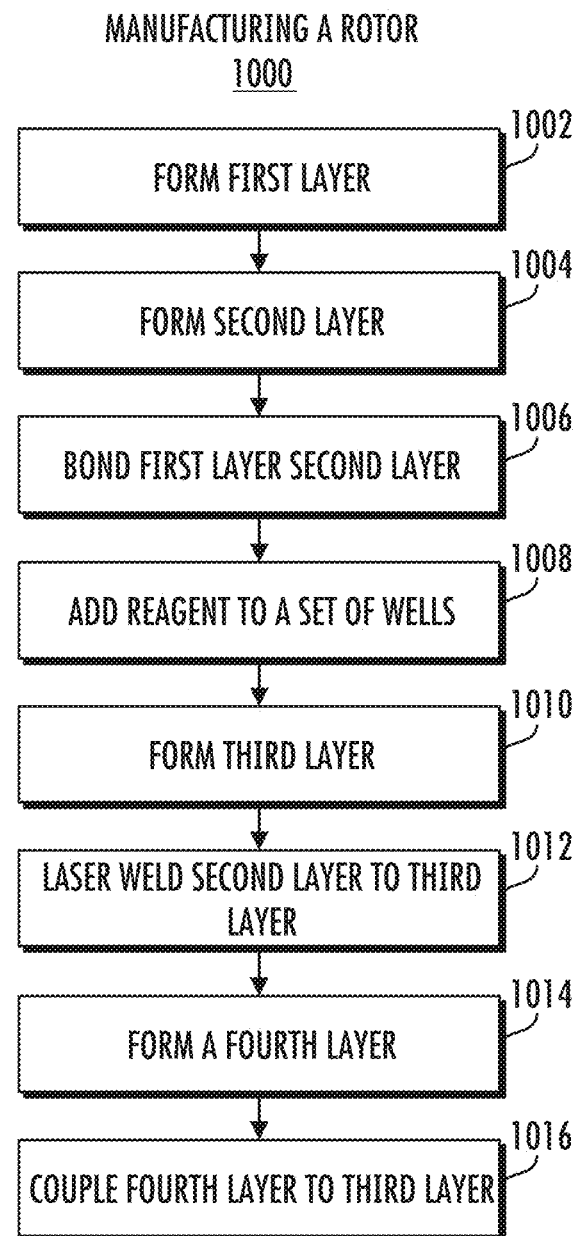
FIG. 10A is an illustrative flowchart of a method of manufacturing a rotor, according to embodiments.

FIG. 10A is a flowchart that generally describes a method (1000) of manufacturing a rotor. The method may include, at step 1002, forming a first layer and, at step 1004, forming a second layer. At step 1006, the first layer and the second layer may be bonded together to form a base of the rotor. For example, the first layer and the second layer may be formed and bonded together (steps 1002, 1004, 1006) using multi-shot injection molding (e.g., sequential injection molding) as described in more detail with respect to FIGS. 10B and 11A-11F. In some embodiments, the first layer bonded to the second layer may define a set of wells.

In some embodiments, the first layer and the second layer may be composed of one or more of acrylic, polycarbonate, cyclic olefin copolymers (COC), polystyrene, and acrylonitrile butadiene styrene (ABS). The first layer may be substantially transparent. For example, the first layer may be substantially transparent to at least one of ultraviolet light, visible light, and infrared radiation. The second layer may include at least about 0.1% by weight of carbon black. For example, the second layer may include about 0.2% of carbon black. For example, the second layer may include about 0.4% of carbon black. For example, the second layer may include about 0.8% of carbon black. The second layer may be substantially absorbent to at least one of mid-infrared radiation and near-infrared radiation. In some embodiments, the second layer may be substantially absorbent to at least 940 nm wavelength radiation.

Figure 10B:
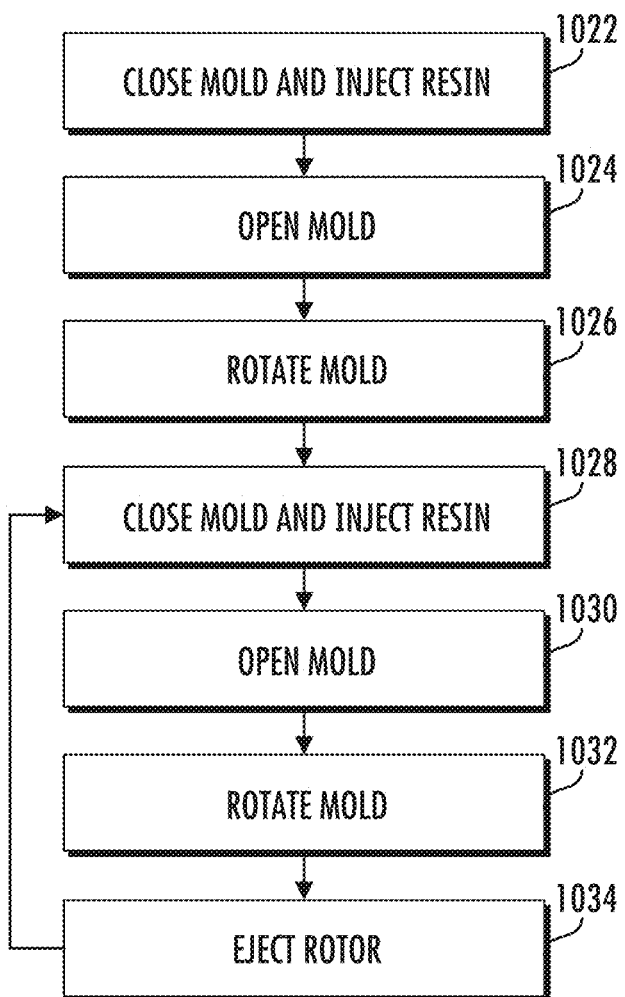
FIG. 10B is an illustrative flowchart of a method of multi-shot injection molding a rotor.
Figure 11A:
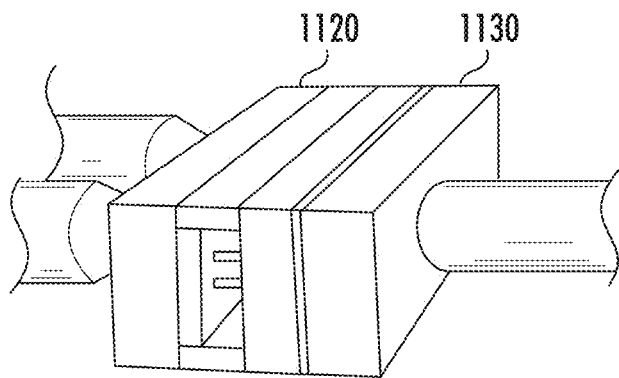
FIGS. 11A-11F are illustrative perspective views of the steps depicted in the method of FIG. 10B.
Figure 11B:
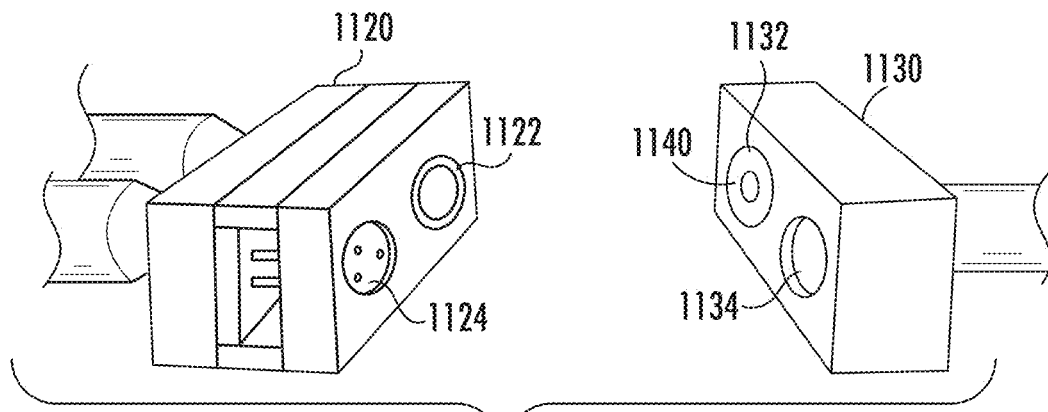
Figure 11C:
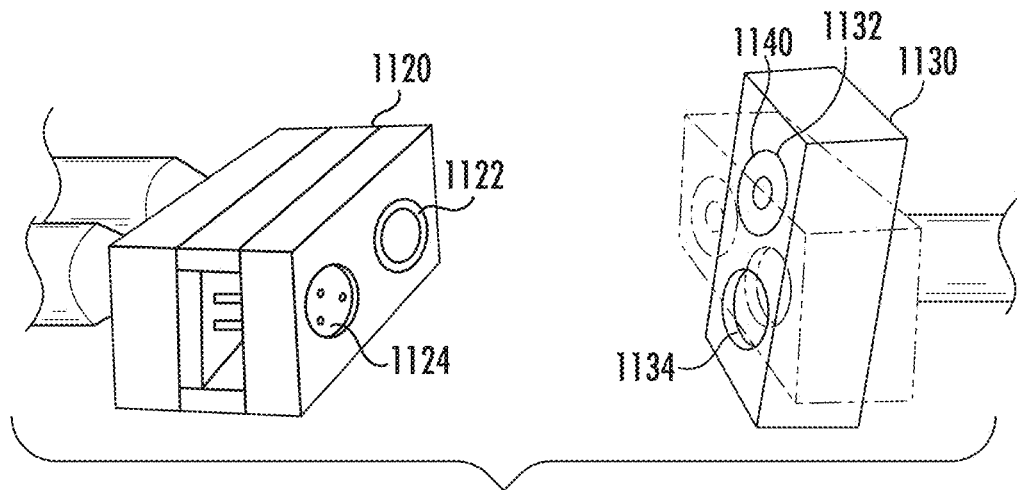
Figure 11D:
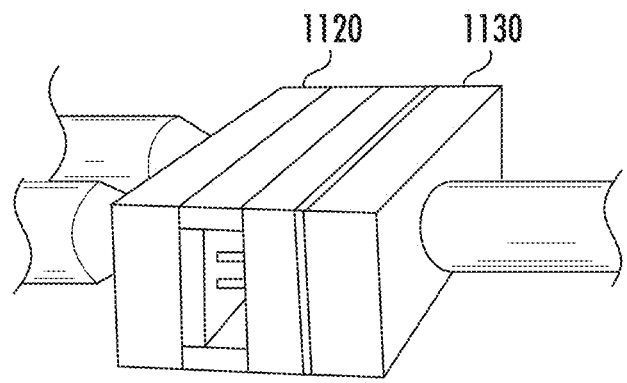

In some embodiments, the first layer and the second layer of a rotor may be formed and bonded using the two-shot molding process (1020) described in the flowchart of FIG. 10B and illustrated in FIGS. 11A-11F. As illustrated in FIG. 11B, a two-shot molding system/approach may include a first half of a mold (1120) and a corresponding second half of a mold (1130). The first half of a mold (1120) may include a first cavity (1122) and a second cavity (1124). The second half of a mold (1130) may include a first core (1132) and a second core (1134). The shape of the first cavity (1122) and the second cavity (1124) may differ while the shape of the first core (1132) and the second core (1134) may be the same. The different shapes between the first cavity (1122) and the second cavity (1124) allow different structures to be formed with each injection (e.g., shot) of material. Having the same shape between the first core (1132) and the second core (1134) allows the first layer to have a consistent shape. The first half of a mold (1120) and the second half of a mold (1130) may be formed of steel, for example. In some embodiments, either one of the first half of a mold (1120) and the second half of a mold (1130) may be configured to move axially and rotate relative to the other. For example, the second half of a mold (1130) in FIGS. 11A-11F may be configured to move axially and roll relative to a stationary first half of a mold (1120).

A two-shot molding process may include the step 1022 of closing a pair of mold halves (1120, 1130) and injecting (e.g., shooting) a first material (e.g., transparent resin material) into a first core (1132). The first layer of a first rotor (1140) will form between the molds (1120, 1130) and be defined by the shape of the first core (1132) and the first cavity (1122).

At step 1024, the second half of a mold (1130) may move axially away from the first half of a mold (1120) to open the mold. The first layer of the first rotor (1140) may be disposed within the first core (1132) of the second half of a mold (1130). At step 1026, the second half of a mold (1130) may be rotated (e.g., rolled) 180 degrees such that the first cavity (1122) is aligned with the second core (1134) and the second cavity (1124) is aligned with the first core (1132) having the first layer of the first rotor (1140). This rotation of the second half of a mold (1130) allows the first layer of the first rotor (1140) to receive an injection of a second material (e.g., carbon-filled resin material) over the first layer. That is, the second layer may be aligned with the first layer. Concurrently, a first layer of a separate rotor may be injected in the adjacent second core (1134).

At step 1028, the pair of molds (1120, 1130) may be closed and a first material may be injected into the second core (1134). The first layer of a second rotor (1142) may be formed between the molds (1120, 1130) and be defined by the shape of the second core (1134) and the first cavity (1122). In parallel, a second material (e.g., carbon-filled resin material) may be injected into the first core (1132). A second layer of the first rotor (1140) may be formed between the molds (1120, 1130) and be defined by the shape of the first layer, the first core (1132), and the second cavity (1124). That is, the second layer may be formed and bonded to the first layer using multi-shot injection molding.

As described in more detail herein, the second cavity (1124) and second half of a mold (1130) may be configured to form a set of shut offs that may create a seal between the first and second materials and aid formation of structural features of a rotor (e.g., a set of wells). For example, a metal surface of the second cavity (1124) may engage with the first layer of a rotor to define a shut off configured to prevent injection of material and/or to create support. In particular, each well of a set of wells may include a tapered sidewall surface (e.g., FIG. 3B) of a first layer that the second cavity (1124) may engage with to create a barrier configured to prevent the second material from flashing or bleeding. In this manner, one or more voids (e.g., wells) may be formed in the rotor.

Figure 11E:
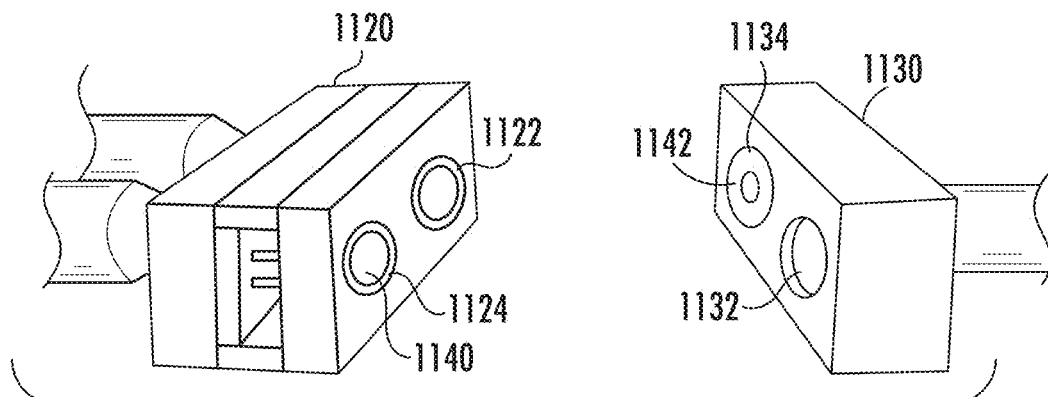
Figure 11F:
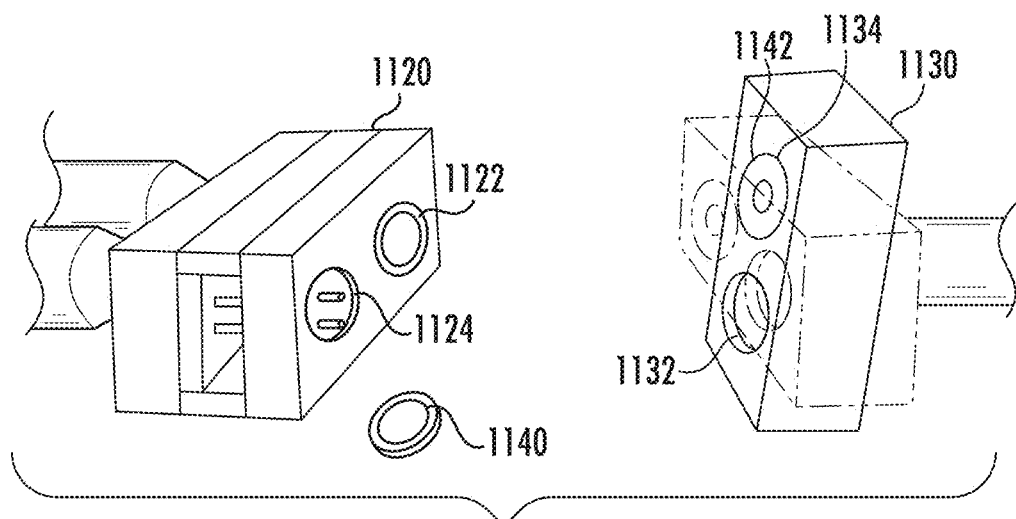

At step 1030, the second half of a mold (1130) may move axially away from the first half of a mold (1120) to open the mold. As shown in FIG. 11E, the first layer of the second rotor (1142) may be disposed within the second core (1134) of the second half of a mold (1130). The first rotor (1140) having the first layer and the second layer may be disposed within the second cavity (1124). At step 1032, the second half of a mold (1130) may be rotated (e.g., rolled) 180 degrees such that the first cavity (1122) is aligned with the first core (1132) and the second cavity (1124) is aligned with the second core (1134) having the first layer of the second rotor (1142). At step 1034, the first rotor (1140) having the first layer and the second layer bonded together (e.g., rotor base) may be ejected from the second cavity (1124). The process may return to step 1028 (e.g., FIG. 11D) for manufacturing additional rotors. In other embodiments, second material (e.g., carbon-filled resin) may be shot before shooting the first material (e.g., transparent resin material).

Referring again to FIG. 10A, at step 1008, a set of lyophilized reagents may be placed into a set of the wells. For example, a first set of wells may be empty, a second set of wells may include different lyophilized reagents, and each well of a third set of wells may include a plurality of lyophilized reagents.

At step 1010, a third layer may be formed. For example, the third layer may be formed by injection molding. The third layer may be composed of one or more of acrylic, polycarbonate, cyclic olefin copolymers (COC), polystyrene, and acrylonitrile butadiene styrene (ABS). The third layer may be substantially transparent. For example, the third layer may be substantially transparent to at least one of ultraviolet light, visible light, and infrared radiation.

At step 1012, the first layer and the second layer may be bonded to the third layer using infrared radiation such that a channel of the rotor establishes a fluid communication path between the opening and the set of wells. For example, the first layer and the third layer may be laser welded to the second layer. Laser welding may be performed using one or more of a semiconductor diode laser, solid-state Nd:YAG laser, and fiber laser. In some embodiments, a diode laser may generate a light beam with a wavelength of about 940 nm.

Step 1012 may include aligning the rotor base (e.g., first layer bonded to the second layer) to the third layer. In some embodiments, a photomask may be aligned to the rotor base and the third layer. In some embodiments, the photomask may be held at a fixed position and the rotor base may be held on a platform (e.g., nest, stage). For example, the photomask may be clamped to the rotor base using the platform (e.g., floating platform). The platform may be configured to move the rotor base towards the photomask and align the photomask to the rotor base. In some embodiments, the photomask may be configured to block infrared radiation to one or more portions of the rotor base and the third layer. Due to the precise tolerances needed between the rotor and photomask to ensure proper welding, a platform may be configured to move in a plane parallel to the photomask to aid alignments of the rotor to the photomask. A floating platform allows the bushings and protrusions (e.g., bushing guide pins, rotor alignment pins) to move relative to each other and fit into each other such that the photomask may be releasably clamped to the rotor. For example, as described in detail herein with respect to FIGS. 16-18, one of the photomask and platform may include a set of bushings configured to fit into a corresponding set of protrusions of the other of the photomask and platform.

In some embodiments, the infrared radiation may be configured as a laser beam. In some embodiments, the laser beam may be one or more of a line beam, point-wise (e.g., spot) beam, field (e.g., planar) beam, and the like. The laser beam may be output over the photomask, rotor base and the third layer. For example, a line beam may be passed over the photomask. The photomask may be configured to define a pattern of the rotor weld. In portions of the rotor that receive the infrared radiation passed through the photomask, a surface of the second layer may absorb the infrared radiation and form a weld with a surface of the third layer in contact with the second layer. The line beam having a predetermined wavelength (e.g., 940 nm) may be passed over the photomask to form a laser weld in the rotor in between about 1 second and about 2 seconds at a predetermined power output. In some portions of the rotor adjacent to a laser weld, a gap may be formed between about 1 µm and about 10 µm between the second layer and the third layer due to thermal expansion.

In some embodiments, the photomask may be configured to block the laser beam over at least one lyophilized reagents of the set of lyophilized reagents. This may aid structural and chemical integrity of a reagent. Additionally or alternatively, the laser beam may be output over at least one other lyophilized reagent of the set of lyophilized reagents. Some of the lyophilized reagents disposed in the rotor may be configured to receive infrared radiation at a predetermined wavelength, power, and time while maintaining physical and chemical integrity of the reagent. For example, some reagents may function substantially identically to a photomasked reagent when exposed to infrared radiation at about 940 nm for between 1 second to about 2 seconds.

In other embodiments, the first layer and the second layer may be bonded using one or more of ultrasonic welding, adhesives (e.g., adhesive tape), and/or solvent bonding.

At step 1014, a fourth layer may be formed. For example, the fourth layer may be formed by injection molding. For example, a fourth layer may be structurally and/or functionally similar to the fourth layer (204, 704) as described herein. At step 1016, the fourth layer may be coupled to the third layer. For example, a fourth layer may be ultrasonically welded to the third layer.

Rotor Inspection

Also described herein are embodiments corresponding to methods for inspecting a rotor that may be used in some embodiments with the fluid analysis system embodiments as described herein. The methods described here may inspect a rotor device (e.g., laser welded rotor) using optical imaging and analysis techniques. This may have numerous benefits, such as quantifying one or more characteristics of a rotor. For example, one or more rotor welds, reagent spheres, and wells may be analyzed and verified as part of a consistent, repeatable, and automated quality control process. This may be useful in categorizing a rotor such as by quality.

Figure 12:
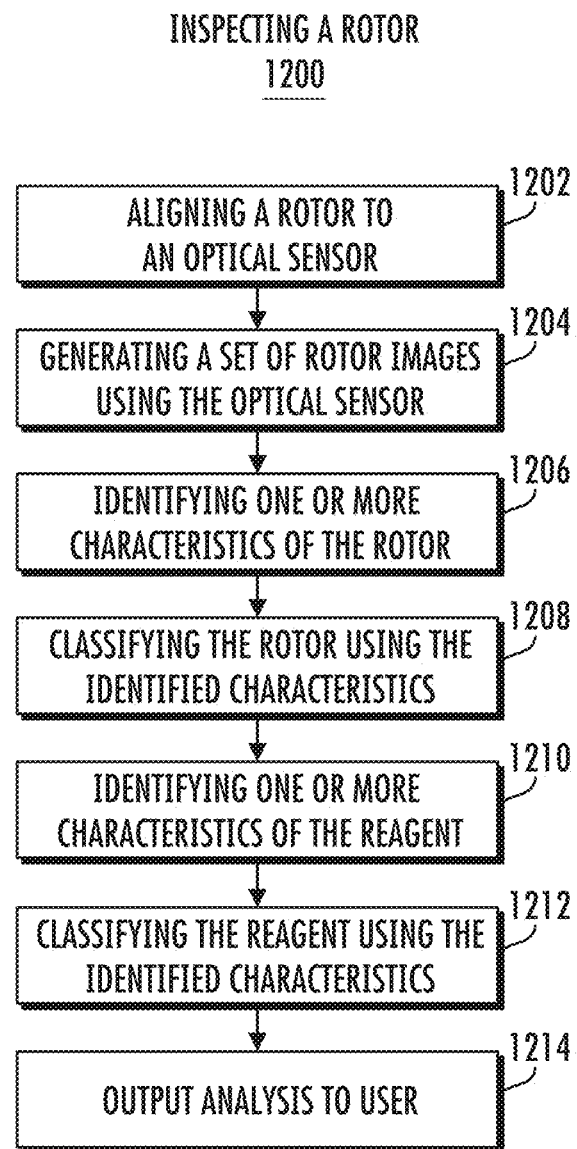
FIG. 12 is an illustrative flowchart of a method of inspecting a rotor, according to embodiments.

FIG. 12 is a flowchart that generally describes a method of inspecting a rotor (1200). A rotor structurally and/or functionally similar to the rotors (100, 200, 300, 400, 500, 600, 700) as described herein may be inspected using one or more of the inspection steps described herein. For example, the rotor may include a first layer (101, 201, 301, 501) coupled to a second layer (102, 202, 302, 402, 502, 702), such as through two-shot injection molding, to collectively define a set of wells. The first layer may be substantially transparent. The second layer may define a channel. The second layer may be substantially absorbent to infrared radiation. A third layer may define an opening configured to receive a fluid. The third layer may be substantially transparent and coupled to the second layer such as through laser welding.

At step 1202, a rotor may be aligned to one or more optical sensors. In some embodiments, one or more optical sensors may be configured to generate a plan view, bottom view, skew view, and/or side view of the rotor. In some embodiments, one or more radiation sources may be configured to illuminate the portions of the rotor to be imaged. For example, the rotor may be illuminated using diffuse axial illumination. In some embodiments, the rotor may be spinning while imaged.

Figure 13A:
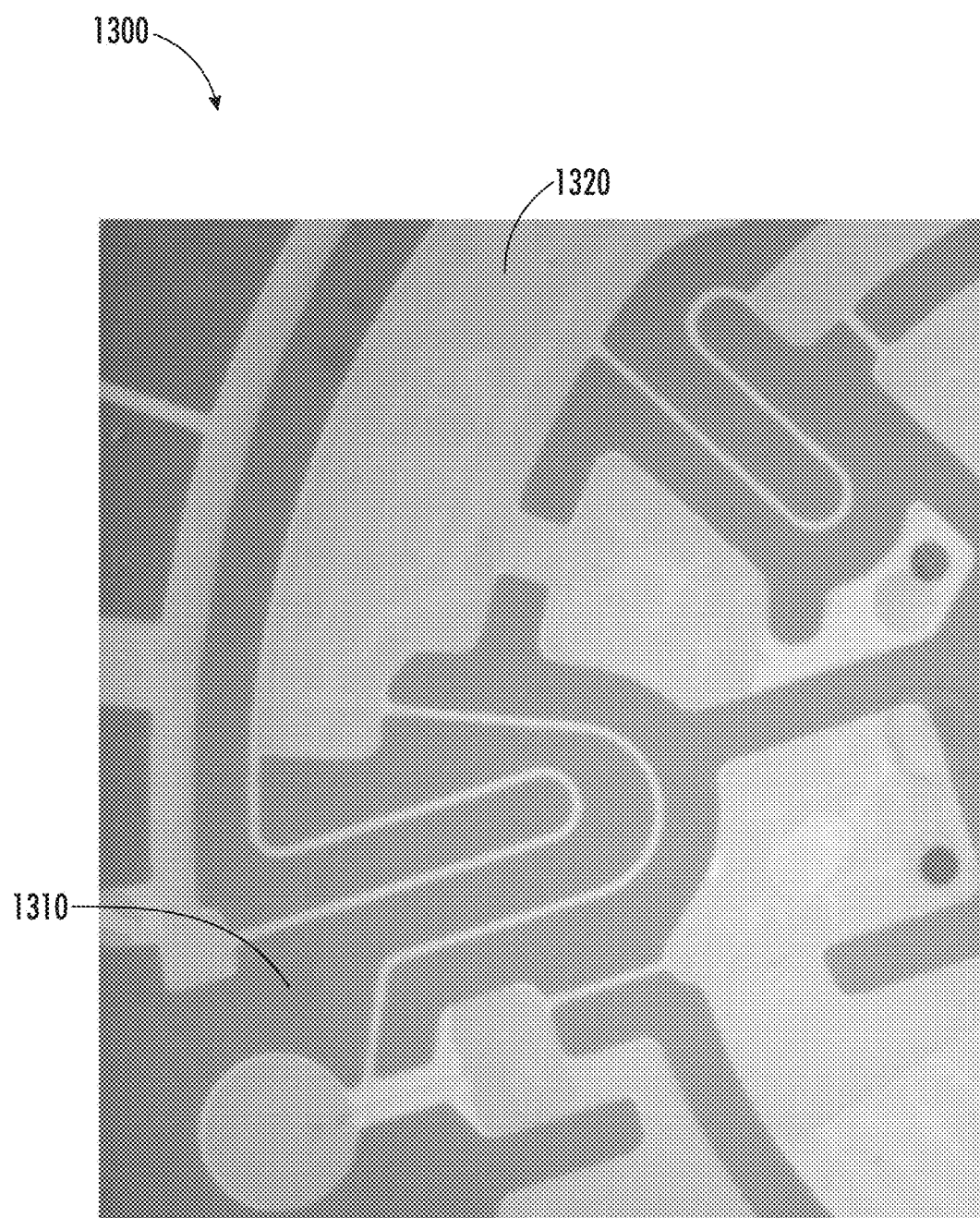
FIG. 13A is an illustrative image of a rotor, according to embodiments.
Figure 13B:
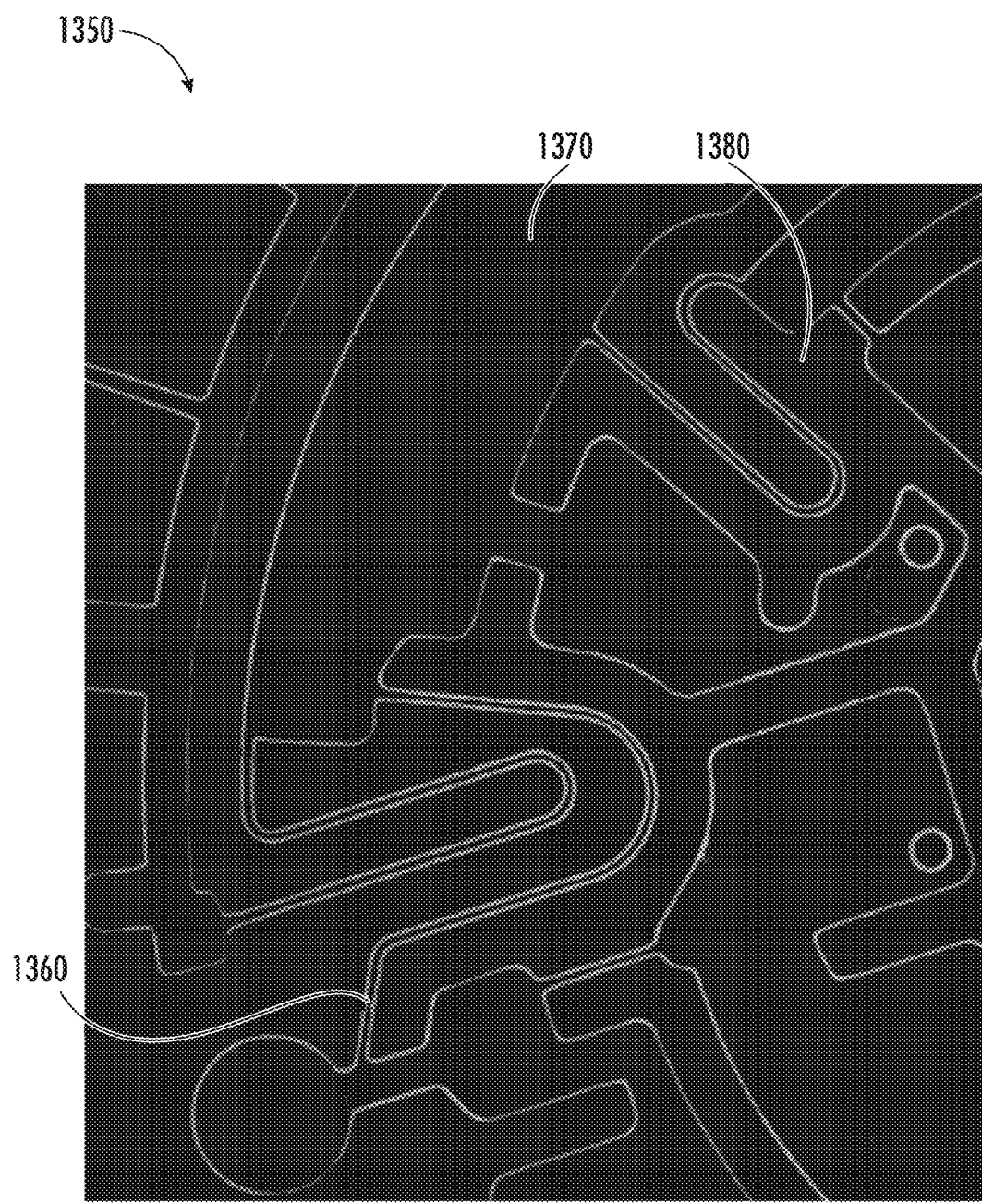
FIG. 13B is a high contrast image of the rotor depicted in FIG. 13A.

At step 1204, a set of rotor images may be generated using one or more of the optical sensors. For example, FIGS. 13A and 13B are illustrative images (1300, 1350) of portions of a rotor illustrating the structural features of the rotor from a plan view perspective. The images may be of the entire rotor or a portion of the rotor. In some embodiments, images may be taken from any of a side and bottom perspective. At step 1206, one or more rotor characteristics may be identified from the set of rotor images. Image analysis of the rotor images may be performed to generate bonding information (e.g., data). In some embodiments, bonding information may include the results of a comparison performed between the acquired image data and a set of reference data. The bonding information may include a set of edges formed between the second layer and the third layer. For example, an unexpected discontinuity in an edge may indicate an incomplete weld. As shown in FIG. 13A, first portions (1310) of the rotor may have higher intensity values than second portions (1320) of the rotor. For example, first portions (1310) of the rotor may have a first pixel intensity range (e.g., 40-80 in a grayscale range of 0-255) and second portions (1320) of the rotor may have a second pixel intensity range (e.g., 100-140 in grayscale). The difference in contrast between the first portions (1310) and second portions (1320) may be due to air within the second portions (1320). The first portions (1310) may correspond to welded portions of the rotor while the second portions (1320) may correspond to unwelded portions of the rotor including one or more of the channels, wells, cavities, inlets, and manufacturing defects. Completely transparent rotors may not generate rotor images having such a visible contrast.

In FIG. 13B, first portions (1360) of the rotor have lower intensity values than second portions (1370, 1380) of the rotor. The first portions (1360) may correspond to edges of a weld while the second portions may correspond to structures of the rotor such as cavities (1370) and welded portions (1380). The bonding information may include one or more gaps in the set of edges. For example, differences in intensity values between the acquired images (1300, 1350) and a set of reference images for each location within the rotor may be used to identify one or more gaps. Each of these differences may be identified as defects and included in the bonding information.

At step 1208, the rotor may be classified using the identified rotor characteristics. The number, size, shape, and location of the defects may be quantified and may be compared to a predetermined set of thresholds. For example, some defects may have one or more of a size below a predetermined threshold, location in an area that has minimal impact on rotor integrity and/or functionality. Other defects may result in categorization as one or more of rejected, restricted use (e.g., approved for animal use but not human use), acceptable, limited release, requiring secondary inspection, manual inspection, and so forth. That is, there may a plurality of quality classifications. For example, incomplete welds that are isolated from a cavity, well, channel, inlet, and the like may be classified as cosmetic defects. In some cases, an incomplete weld that changes a shape of a channel, well, cavity, and inlet may be classified as a cosmetic or minor defect. In other cases, an incomplete weld that connects different structures together may be classified as a critical defect. For example, an incomplete weld that directly connects two conduits together or that directly connects two wells together may alter the microfluidic performance of the rotor such that the rotor may be classified as critically defective. In some embodiments, a combination of the number, size, shape, and location of the defects may be used to classify the rotor. High quality rotors are free of incomplete welds that create new fluid flow paths between different chambers.

Figure 14A:
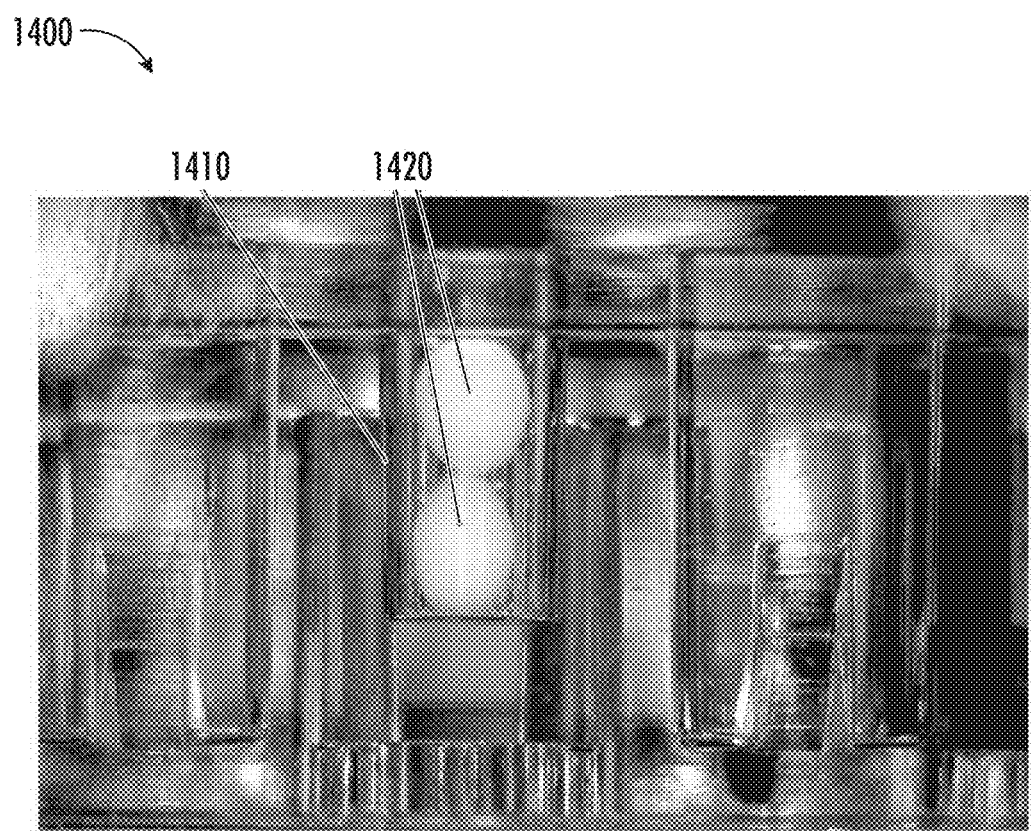
FIG. 14A is an illustrative side view image of a reagent in a well of a rotor, according to embodiments.
Figure 14B:
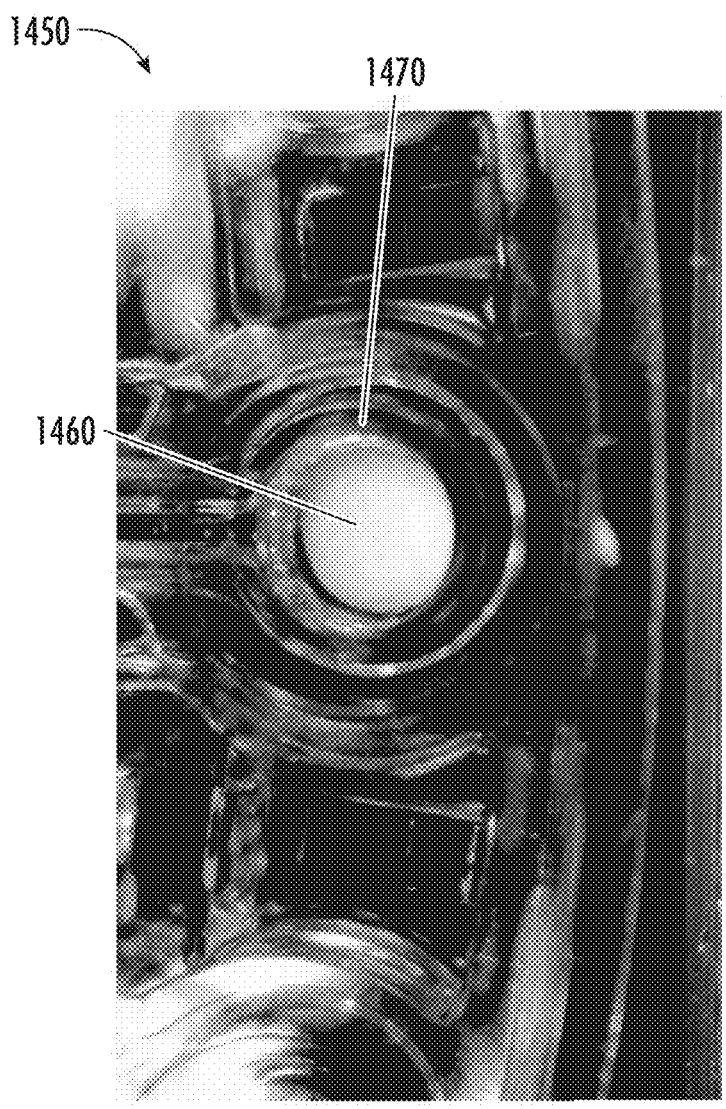
FIG. 14B is an illustrative plan view image of a reagent in a well of a rotor, according to embodiments.

Additionally or alternatively, at step 1210, one or more reagent characteristics may be identified. For example, a set of reagent images may be generated using one or more of the optical sensors. FIGS. 14A and 14B are illustrative images (1400, 1450) of a well of a rotor having a reagent. FIG. 14A is a side view of a well (1410) having two lyophilized reagents (1420) disposed therein. FIG. 14B is a plan view of a well (1470) having at least one lyophilized reagent (1470) disposed therein.

Image analysis of the well images may be performed to generate reagent information (e.g., data). In some embodiments, reagent information may include the results of a comparison performed between the acquired image data and a set of reference data. The reagent information may include color data and a set of edges defining a size and shape of the reagent. For example, the reagent information may be used to identify a reagent sphere broken up into multiple pieces and/or a lyophilized reagent sphere having one or more cleaved off portions.

At step 1212, the reagent may be classified using the reagent information. The number, size, shape, and location of the defects may be quantified and may be compared to a predetermined set of thresholds. For example, some defects may have one or more of a size and/or shape outside a predetermined boundary. The defects may result in categorization as one or more of rejected, acceptable, limited release, requiring secondary inspection, restricted use (e.g., approved for animal use but not human use), cosmetic, manual inspection, and so forth. That is, there may a plurality of quality classifications. In some embodiments, a combination of the number, size, shape, and location of the defects may be used to classify the reagent and/or rotor.

At step 1214, the rotor and/or reagent analysis may be output by the inspection system. In some embodiments, a display may list the rotor and the inspection result. Additionally or alternatively, a set of auditory tones (e.g., beeps) may be output to indicate a result of the rotor and/or reagent inspection. The analysis may also be stored in a remote database as described herein.

As used herein, the terms "about" and/or "approximately" when used in conjunction with numerical values and/or ranges generally refer to those numerical values and/or ranges near to a recited numerical value and/or range. In some instances, the terms "about" and "approximately" may mean within ±10% of the recited value. For example, in some instances, "about 100 [units]" may mean within ±10% of 100 (e.g., from 90 to 110). The terms "about" and "approximately" may be used interchangeably.

The foregoing description, for purposes of explanation, used specific nomenclature to provide a thorough understanding of various inventions and embodiments disclosed herein. However, it will be apparent to one skilled in the art that specific details are not required in order to practice the disclosed inventions and embodiments. Thus, the foregoing descriptions of specific embodiments of the inventions and corresponding embodiments thereof are presented for purposes of illustration and description. They are not intended to be exhaustive or to limit the invention to the precise forms disclosed; obviously, many modifications and embodiments are possible in view of the above teachings. The embodiments were chosen and described in order to best explain the principles of the inventions, the corresponding embodiments thereof, and practical applications, so as to enable others skilled in the art to best utilize the invention and various implementations with various modifications as are suited to the particular use contemplated. It is intended that the following claims and their equivalents define the scope of the invention.

In addition, any combination of two or more such features, structure, systems, articles, materials, kits, steps and/or methods, disclosed herein, if such features, structure, systems, articles, materials, kits, steps and/or methods are not mutually inconsistent, is included within the inventive scope of the present disclosure. Moreover, some embodiments of the various inventions disclosed herein may be distinguishable from the prior art for specifically lacking one or more features/elements/functionality found in a reference or combination of references (i.e., claims directed to such embodiments may include negative limitations).

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The invention claimed is:

1. A method, comprising:
manufacturing a microfluidic rotor device by bonding a first layer and a second layer using two-shot injection molding, wherein the first layer coupled to the second layer collectively defines a set of wells, the first layer being substantially transparent, and the second layer defining a channel, the second layer being substantially absorbent to infrared radiation;
disposing a lyophilized reagent in one or more wells of the set of wells;
aligning the second layer to a third layer after the bonding of the first layer and the second layer;
aligning a photomask to the third layer after the bonding of the first layer and the second layer, the photomask configured to block the infrared radiation to one or more portions of the second layer; and bonding the third layer to the second layer using infrared radiation via an infrared laser beam, the photomask configured to block the infrared laser beam over the lyophilized reagent, and the third layer defining an opening configured to receive a fluid, the third layer being substantially transparent, wherein the channel establishes a fluid communication path between the opening and the set of wells.

2. The method of claim 1, further comprising bonding a fourth layer to the third layer, the fourth layer being at least partially opaque.

3. The method of claim 2, wherein bonding the fourth layer to the third layer comprises ultrasonically welding the fourth layer to the third layer.

4. The method of claim 2, wherein bonding the fourth layer to the third layer may include one or more of laser welding, adhesive bonding, and solvent bonding.

5. The method of claim 1, wherein the second layer includes at least about 0.1% by weight of carbon black.

6. The method of claim 5, wherein the second layer includes a laser absorbing dye substantially absorbent to radiation between about 750 nm to about 3,000 nm.

7. The method of claim 1, wherein the infrared radiation includes a wavelength of about 940 nm.

8. The method of claim 1, wherein the first layer and the third layer are each independently transparent.

9. The method of claim 1, wherein substantially transparent includes light transmission of at least one of ultraviolet light, visible light, and infrared radiation.

10. The method of claim 1, wherein the second layer is substantially absorbent to at least one of mid-infrared radiation and near-infrared radiation.

11. The method of claim 1, wherein substantially absorbent to infrared radiation includes absorbing infrared radiation in a sufficient amount within a predetermined period of time to transition the second layer from a solid phase to a molten phase.

12. The method of claim 1, wherein the second layer is substantially absorbent to at least 940 nm wavelength radiation.

13. The method of claim 1, wherein the first layer, the second layer, and the third layer are independently composed of one or more of acrylic, polycarbonate, cyclic olefin copolymers (COC), and acrylonitrile butadiene styrene (ABS).

14. The method of claim 1, wherein the second layer includes between about 0.2% to about 0.4% by weight of carbon black.

15. The method of claim 1, further comprising bonding the third layer to the second layer including using a line beam of infrared radiation.

16. The method of claim 1, further comprising forming a set of shut offs by engaging a first half of a mold with the first layer disposed in a second half of the mold.

17. The method of claim 1, further comprising forming the third layer using injection molding.

* * * * *